United States Patent
Harris et al.

(10) Patent No.: US 11,093,215 B2
(45) Date of Patent: Aug. 17, 2021

(54) LINEAR PHOTONIC PROCESSORS AND RELATED METHODS

(71) Applicant: Lightmatter, Inc., Boston, MA (US)

(72) Inventors: Nicholas C. Harris, Jamaica Plain, MA (US); Darius Bunandar, Boston, MA (US); Michael Gould, Boston, MA (US); Carl Ramey, Westborough, MA (US); Shashank Gupta, Newton, MA (US); Carlos Dorta-Quinones, Medford, MA (US)

(73) Assignee: Lightmatter, Inc., Boston, MA (US)

( * ) Notice: Subject to any disclaimer, the term of this patent is extended or adjusted under 35 U.S.C. 154(b) by 0 days.

(21) Appl. No.: 17/100,158

(22) Filed: Nov. 20, 2020

(65) Prior Publication Data

US 2021/0157547 A1   May 27, 2021

Related U.S. Application Data

(60) Provisional application No. 62/978,181, filed on Feb. 18, 2020, provisional application No. 62/970,360, filed on Feb. 5, 2020, provisional application No. 62/963,315, filed on Jan. 20, 2020, provisional application No. 62/962,759, filed on Jan. 17, 2020, provisional application No. 62/939,480, filed on Nov. 22, 2019.

(51) Int. Cl.
    *G06F 7/523*   (2006.01)
    *G01D 5/34*   (2006.01)
    *G06F 17/16*   (2006.01)

(52) U.S. Cl.
    CPC .............. *G06F 7/523* (2013.01); *G01D 5/345* (2013.01); *G06F 17/16* (2013.01)

(58) Field of Classification Search
    CPC .......... G06F 7/523; G06F 17/16; G01D 5/345
    (Continued)

(56) References Cited

U.S. PATENT DOCUMENTS

| 3,872,293 A | 3/1975 | Green |
| 4,183,623 A | 1/1980 | Haines |

(Continued)

FOREIGN PATENT DOCUMENTS

| CN | 101630178 A | 1/2010 |
| EP | 0251062 A2 | 1/1988 |

(Continued)

OTHER PUBLICATIONS

International Preliminary Report on Patentability dated Nov. 26, 2020 in connection with International Application No. PCT/US2019/032181.

(Continued)

*Primary Examiner* — Tan V Mai
(74) *Attorney, Agent, or Firm* — Wolf, Greenfield & Sacks, P.C.

(57) ABSTRACT

Photonic processors are described. The photonic processors described herein are configured to perform matrix-matrix (e.g., matrix-vector) multiplication. Some embodiments relate to photonic processors arranged according to a dual-rail architecture, in which numeric values are encoded in the difference between a pair optical signals (e.g., in the difference between the powers of the optical signals). Relative to other architectures, these photonic processors exhibit increased immunity to noise. Some embodiments relate to photonic processors including modulatable detector-based multipliers. Modulatable detectors are detectors designed so that the photocurrent can be modulated according to an electrical control signal. Photonic processors designed using modulatable detector-based multipliers are significantly more compact than other types of photonic processors.

14 Claims, 33 Drawing Sheets

(58) Field of Classification Search
USPC .................................................. 708/191
See application file for complete search history.

(56) References Cited

U.S. PATENT DOCUMENTS

| | | |
|---|---|---|
| 4,567,569 A | 1/1986 | Caulfield et al. |
| 4,592,004 A | 5/1986 | Backer et al. |
| 4,607,344 A | 8/1986 | Athale et al. |
| 4,633,428 A | 12/1986 | Byron |
| 4,686,646 A | 8/1987 | Goutzoulis |
| 4,739,520 A | 4/1988 | Collins, Jr. et al. |
| 4,809,204 A | 2/1989 | Dagenais et al. |
| 4,849,940 A | 7/1989 | Marks, II et al. |
| 4,868,803 A | 9/1989 | Sunagawa et al. |
| 4,877,297 A | 10/1989 | Yeh |
| 4,948,212 A | 8/1990 | Cheng et al. |
| 5,004,309 A | 4/1991 | Caulfield et al. |
| 5,077,619 A | 12/1991 | Toms |
| 5,095,459 A | 3/1992 | Ohta et al. |
| 5,117,099 A | 5/1992 | Schmidt |
| 5,254,957 A | 10/1993 | Lauffenburger |
| 5,333,117 A | 7/1994 | Ha et al. |
| 5,383,042 A | 1/1995 | Robinson |
| 5,394,257 A | 2/1995 | Horan et al. |
| 5,410,145 A | 4/1995 | Coroy |
| 5,428,711 A | 6/1995 | Akiyama et al. |
| 5,448,749 A | 9/1995 | Kyuma et al. |
| 5,495,356 A | 2/1996 | Sharony et al. |
| 5,576,873 A | 11/1996 | Crossland et al. |
| 5,621,227 A | 4/1997 | Joshi |
| 5,640,261 A | 6/1997 | Ono |
| 5,699,449 A | 12/1997 | Javidi |
| 5,784,309 A | 7/1998 | Budil |
| 5,953,143 A | 9/1999 | Sharony et al. |
| 6,005,998 A | 12/1999 | Lee |
| 6,060,710 A | 5/2000 | Carrieri et al. |
| 6,178,020 B1 | 1/2001 | Schultz et al. |
| 6,525,858 B1 | 2/2003 | Nagahori |
| 6,590,197 B2 | 7/2003 | Wadsworth et al. |
| 6,728,434 B2 | 4/2004 | Flanders |
| 7,050,116 B2 | 5/2006 | Van Zanten et al. |
| 7,136,587 B1 | 11/2006 | Davis et al. |
| 7,173,272 B2 | 2/2007 | Ralph |
| 7,230,227 B2 | 6/2007 | Wilcken et al. |
| 7,515,753 B2 | 4/2009 | Goldenberg et al. |
| 7,536,431 B2 | 5/2009 | Goren et al. |
| 7,660,533 B1 | 2/2010 | Meyers et al. |
| 7,876,248 B2 | 1/2011 | Berkley et al. |
| 7,985,965 B2 | 7/2011 | Barker et al. |
| 8,018,244 B2 | 9/2011 | Berkley |
| 8,023,828 B2 | 9/2011 | Beausoleil et al. |
| 8,026,837 B1 | 9/2011 | Valley et al. |
| 8,027,587 B1 | 9/2011 | Watts |
| 8,035,540 B2 | 10/2011 | Berkley et al. |
| 8,129,670 B2 | 3/2012 | Laycock et al. |
| 8,190,553 B2 | 5/2012 | Routt |
| 8,223,414 B2 | 7/2012 | Goto |
| 8,247,780 B2 | 8/2012 | Zhang et al. |
| 8,324,670 B2 | 12/2012 | Bui et al. |
| 8,386,899 B2 | 2/2013 | Goto et al. |
| 8,478,138 B2 | 7/2013 | Sugawara et al. |
| 8,560,282 B2 | 10/2013 | Macready et al. |
| 8,576,677 B2 | 11/2013 | Kurokawa et al. |
| 8,604,944 B2 | 12/2013 | Berkley et al. |
| 8,620,855 B2 | 12/2013 | Bonderson |
| 8,837,544 B2 | 9/2014 | Santori |
| 9,009,560 B1 | 4/2015 | Matache et al. |
| 9,250,391 B2 | 2/2016 | McLaughlin et al. |
| 9,354,039 B2 | 5/2016 | Mower et al. |
| 9,513,276 B2 | 12/2016 | Tearney et al. |
| 9,791,258 B2 | 10/2017 | Mower |
| 10,009,135 B2 | 6/2018 | Tait et al. |
| 10,095,262 B2 | 10/2018 | Valley et al. |
| 10,197,971 B1 | 2/2019 | Horst |
| 10,268,232 B2 | 4/2019 | Harris et al. |
| 10,359,272 B2 | 7/2019 | Mower et al. |
| 10,382,139 B2 | 8/2019 | Rosenhouse et al. |
| 10,483,922 B2 | 11/2019 | Shibata et al. |
| 10,670,860 B2 | 6/2020 | Tait et al. |
| 10,763,974 B2 | 9/2020 | Bunandar et al. |
| 2003/0025562 A1 | 2/2003 | Andreou et al. |
| 2003/0086138 A1 | 5/2003 | Pittman et al. |
| 2003/0235363 A1 | 12/2003 | Pfeiffer |
| 2003/0235413 A1 | 12/2003 | Cohen et al. |
| 2004/0243657 A1 | 12/2004 | Goren et al. |
| 2005/0036786 A1 | 2/2005 | Ramachandran et al. |
| 2006/0215949 A1 | 9/2006 | Lipson et al. |
| 2007/0180586 A1 | 8/2007 | Amin |
| 2008/0002993 A1 | 1/2008 | Kirkpatrick et al. |
| 2008/0031566 A1 | 2/2008 | Matsubara et al. |
| 2008/0212186 A1 | 9/2008 | Zoller et al. |
| 2008/0212980 A1 | 9/2008 | Weiner |
| 2008/0273835 A1 | 11/2008 | Popovic |
| 2009/0028554 A1 | 1/2009 | Anderson et al. |
| 2009/0238579 A1 | 9/2009 | Rahn et al. |
| 2010/0165432 A1 | 7/2010 | Laycock et al. |
| 2010/0215365 A1 | 8/2010 | Fukuchi |
| 2010/0284703 A1 | 11/2010 | Suzuki |
| 2011/0248150 A1 | 10/2011 | Bureau et al. |
| 2011/0299555 A1 | 12/2011 | Cronie et al. |
| 2012/0163815 A1 | 6/2012 | Mori et al. |
| 2013/0011093 A1 | 1/2013 | Goh et al. |
| 2013/0121706 A1 | 5/2013 | Yang et al. |
| 2014/0003761 A1 | 1/2014 | Doing |
| 2014/0056585 A1 | 2/2014 | Qian et al. |
| 2014/0241657 A1 | 8/2014 | Manouvrier |
| 2014/0299743 A1 | 10/2014 | Miller |
| 2015/0063823 A1* | 3/2015 | Eiselt ............... H04B 10/5167 |
| | | 398/140 |
| 2015/0249505 A1 | 9/2015 | Provost et al. |
| 2015/0354938 A1 | 12/2015 | Mower et al. |
| 2015/0382089 A1 | 12/2015 | Mazed |
| 2016/0103281 A1 | 4/2016 | Matsumoto |
| 2016/0112129 A1 | 4/2016 | Chang |
| 2016/0118106 A1 | 4/2016 | Yoshimura et al. |
| 2016/0162781 A1 | 6/2016 | Lillicrap et al. |
| 2016/0162798 A1 | 6/2016 | Marandi et al. |
| 2016/0182155 A1 | 6/2016 | Taylor et al. |
| 2016/0245639 A1 | 8/2016 | Mower et al. |
| 2016/0261346 A1 | 9/2016 | Li et al. |
| 2016/0301478 A1 | 10/2016 | Luo et al. |
| 2016/0352515 A1 | 12/2016 | Bunandar et al. |
| 2017/0031101 A1 | 2/2017 | Miller |
| 2017/0201813 A1 | 7/2017 | Sahni |
| 2017/0237505 A1 | 8/2017 | Lucamarini et al. |
| 2017/0285373 A1 | 10/2017 | Zhang et al. |
| 2017/0351293 A1 | 12/2017 | Carolan et al. |
| 2018/0094971 A1 | 4/2018 | Rutter et al. |
| 2018/0107237 A1 | 4/2018 | Andregg et al. |
| 2018/0124348 A1 | 5/2018 | Verdant et al. |
| 2018/0274900 A1 | 9/2018 | Mower et al. |
| 2018/0323825 A1 | 11/2018 | Cioffi et al. |
| 2018/0335574 A1 | 11/2018 | Steinbrecher et al. |
| 2019/0110084 A1 | 4/2019 | Jia et al. |
| 2019/0173503 A1 | 6/2019 | Kolodziej et al. |
| 2019/0289237 A1 | 9/2019 | Verbugt et al. |
| 2019/0331912 A1 | 10/2019 | Tait et al. |
| 2019/0346685 A1 | 11/2019 | Miller |
| 2019/0354894 A1 | 11/2019 | Lazovich et al. |
| 2019/0356394 A1 | 11/2019 | Bunandar et al. |
| 2019/0370644 A1 | 12/2019 | Kenney et al. |
| 2019/0372589 A1 | 12/2019 | Gould et al. |
| 2020/0228077 A1 | 7/2020 | Harris et al. |
| 2020/0272794 A1* | 8/2020 | Kenney ............... G06J 1/005 |
| 2020/0396007 A1 | 12/2020 | Bunandar et al. |

FOREIGN PATENT DOCUMENTS

| | | |
|---|---|---|
| WO | WO 2005/029404 A2 | 3/2005 |
| WO | WO 2006/023067 A2 | 3/2006 |
| WO | WO 2008/069490 A1 | 6/2008 |
| WO | WO 2011/116196 A1 | 9/2011 |

(56) References Cited

FOREIGN PATENT DOCUMENTS

| WO | WO 2018/098230 A1 | 5/2018 |
|----|-------------------|--------|
| WO | WO 2019/115517 A1 | 6/2019 |
| WO | WO 2019/217835 A1 | 11/2019 |

OTHER PUBLICATIONS

International Search Report and Written Opinion for International Application No. PCT/US19/32111 dated Aug. 2, 2019.
International Search Report and Written Opinion for International Application No. PCT/US19/32181 dated Sep. 23, 2019.
International Search Report and Written Opinion for International Application No. PCT/US2019/032272 dated Sep. 4, 2019.
International Search Report and Written Opinion from International Application No. PCT/US2015/034500, dated Mar. 15, 2016, 7 pages.
International Search Report and Written Opinion dated Dec. 18, 2020 in connection with International Application No. PCT/US2020/043841.
Invitation to Pay Additional Fees for International Application No. PCT/US19/32181 dated Jul. 23, 2019.
Invitation to Pay Additional Fees for International Application No. PCT/US2019/032272 dated Jun. 27, 2019.
Invitation to Pay Additional Fees for International Application No. PCT/US2020/043841 dated Oct. 13, 2020.
Invitation to Pay Additional Fees for International Application No. PCT/US2020/061642, dated Jan. 27, 2021.
[No Author Listed], Optical Coherent Receiver Analysis. 2009 Optiwave Systems, Inc. 16 pages. URL:https://dru5cjyjifvrg.cloudfront.net/wp-content/uploads/2017/03/OptiSystem-Applications-Coherent-Receiver-Analysis.pdf [retrieved on Aug. 17, 2019].
Aaronson et al., Computational complexity of linear optics. Proceedings of the 43rd Annual ACM Symposium on Theory of Computing. 2011. 101 pages. ISBN 978-1-4503-0691-1.
Abu-Mostafa et al., Optical neural computers. Scientific American. 1987:88-95.
Albert et al., Statistical mechanics of com-plex networks. Reviews of Modern Physics. 2002;(74):47-97.
Almeida et al., All-optical control of light on a silicon chip. Nature. 2004;431:1081-1084.
Amir et al., Classical diffusion of a quantum particle in a noisy environment. Physical Review E. 2009;79. 5 pages. DOI: 10.1103/PhysRevE.79.050105.
Amit et al., Spin-glass models of neural networks. Physical Review A. 1985;32(2):1007-1018.
Anitha et al., Comparative Study of High performance Braun's multiplier using FPGAs. IOSR Journal of Electrontrics and Communication Engineering (IOSRJECE). 2012;1:33-37.
Appeltant et al., Information processing using a single dynamical node as complex system. Nature Communications. 2011. 6 pages. DOI: 10.1038/ncomms1476.
Arjovsky et al., Unitary Evolution Recurrent Neural Networks. arXiv:1511.06464. 2016. 9 pages.
Aspuru-Guzik et al., Photonic quantum simulators. Nature Physics. 2012;8:285-291. DOI: 10.1038/NPHYS2253.
Aspuru-Guzik et al., Simulated Quantum Computation of Molecular Energies. Science. 2005;309:1704-7.
Atabaki et al., Integrating photonics with silicon nanoelectronics for the next generation of systems on a chip. Nature. 2018;556(7701):349-354. 10 pages. DOI: 10.1038/s41586-018-0028-z.
Baehr-Jones et al., A 25 Gb/s Silicon Photonics Platform. arXiv:1203.0767. 2012. 11 pages.
Bao et al., Atomic-Layer Graphene as a Saturable Absorber for Ultrafast Pulsed Lasers. 24 pages. 2009.
Bao et al., Monolayer graphene as a saturable absorber in a mode-locked laser. Nano Research. 2011;4:297-307. DOI: 10.1007/s12274-010-0082-9.
Barahona, On the computational complexity of Ising spin glass models. Journal of Physics A: Mathematical and General. 1982;15:3241-3253.
Bertsimas et al., Robust optimization with simulated annealing. Journal of Global Optimization. 2010;48:323-334. DOI 10.1007/s10898-009-9496-x.
Bewick, Fast multiplication: algorithms and implementation. Ph.D. thesis, Stanford University (1994). 170 pages.
Bonneau et al., Quantum interference and manipulation of entanglement in silicon wire waveguide quantum circuits. New Journal of Physics. 2012;14:045003. 13 pages. DOI: 10.1088/1367-2630/14/4/045003.
Brilliantov, Effective magnetic Hamiltonian and Ginzburg criterion for fluids. Physical Review E. 1998;58:2628-2631.
Bromberg et al., Bloch oscillations of path-entangled photons. Physical Review Letters. 2010;105:263604-1-2633604-4. 4 pages. DOI: 10.1103/PhysRevLett.105.263604.
Bromberg et al., Quantum and Classical Correlations in Waveguide Lattices. Physical Review Letters. 2009;102:253904-1-253904-4. 4 pages. DOI: 10.1103/PhysRevLett.102.253904.
Broome et al., Photonic Boson Sampling in a Tunable Circuit. Science. 2012;339:794-8.
Bruck et al., On the power of neural networks for solving hard problems. American Institute of Physics. 1988. pp. 137-143. 7 pages.
Canziani et al., Evaluation of neural network architectures for embedded systems. Circuits and Systems (ISCAS). 2017 IEEE International Symposium. 4 pages.
Cardenas et al., Low loss etchless silicon photonic waveguides. Optics Express. 2009;17(6):4752-4757.
Carolan et al., Universal linear optics. Science. 2015;349:711-716.
Caves, Quantum-mechanical noise in an interferometer. Physical Review D. 1981;23(8):1693-1708. 16 pages.
Centeno et al., Optical bistability in finite-size nonlinear bidimensional photonic crystals doped by a microcavity. Physical Review B. 2000;62(12):R7683-R7686.
Chan, Optical flow switching networks. Proceedings of the IEEE. 2012;100(5):1079-1091.
Chen et al., Compact, low-loss and low-power 8×8 broadband silicon optical switch. Optics Express. 2012;20(17):18977-18985.
Chen et al., DianNao: A small-footprint high-throughput accelerator for ubiquitous machine-learning. ACM Sigplan Notices. 2014;49:269-283.
Chen et al., Efficient photon pair sources based on silicon-on-insulator microresonators. Proc. of SPIE. 2010;7815. 10 pages.
Chen et al., Frequency-bin entangled comb of photon pairs from a Silicon-on-Insulator micro-resonator. Optics Express. 2011;19(2):1470-1483.
Chen et al., Universal method for constructing N-port nonblocking optical router based on 2×2 optical switch for photonic networks-on-chip. Optics Express. 2014;22(10);12614-12627. DOI: 10.1364/OE.22.012614.
Cheng et al., In-Plane Optical Absorption and Free Carrier Absorption in Graphene-on-Silicon Waveguides. IEEE Journal of Selected Topics in Quantum Electronics. 2014;20(1). 6 pages.
Chetlur et al., cuDNN: Efficient primitives for deep learning. arXiv preprint arXiv:1410.0759. 2014. 9 pages.
Childs et al., Spatial search by quantum walk. Physical Review A. 2004;70(2):022314. 11 pages.
Chung et al., A monolithically integrated large-scale optical phased array in silicon-on-insulator cmos. IEEE Journal of Solid-State Circuits. 2018;53:275-296.
Cincotti, Prospects on planar quantum computing. Journal of Lightwave Technology. 2009;27(24):5755-5766.
Clements et al., Optimal design for universal multiport interferometers. Optica. 2016;3(12):1460-1465.
Crespi et al., Integrated multimode interferometers with arbitrary designs for photonic boson sampling. Nature Photonics. 2013;7:545-549. DOI: 10.1038/NPHOTON.2013.112.
Crespi, et al., Anderson localization of entangled photons in an integrated quantum walk. Nature Photonics. 2013;7:322-328. DOI: 10.1038/NPHOTON.2013.26.

(56) References Cited

OTHER PUBLICATIONS

Dai et al., Novel concept for ultracompact polarization splitter-rotator based on silicon nanowires. Optics Express. 2011;19(11):10940-9.

Di Giuseppe et al., Einstein-Podolsky-Rosen Spatial Entanglement in Ordered and Anderson Photonic Lattices. Physical Review Letters. 2013;110:150503-1-150503-5. DOI: 10.1103/PhysRevLett.110.150503.

Dunningham et al., Efficient comparison of path-lengths using Fourier multiport devices. Journal of Physics B: Atomic, Molecular and Optical Physics. 2006;39:1579-1586. DOI:10.1088/0953-4075/39/7/002.

Esser et al., Convolutional networks for fast, energy-efficient neuromorphic computing. Proceedings of the National Academy of Sciences. 2016;113(41):11441-11446.

Farhat et al., Optical implementation of the Hopfield model. Applied Optics. 1985;24(10):1469-1475.

Feinberg et al., Making memristive neural network accelerators reliable. IEEE International Symposium on High Performance Computer Architecture (HPCA). 2018. pp. 52-65. DOI 10.1109/HPCA.2018.00015.

Fushman et al., Controlled Phase Shifts with a Single Quantum Dot. Science. 2008;320:769-772. DOI: 10.1126/science.1154643.

George et al., A programmable and configurable mixed-mode FPAA SoC. IEEE Transactions on Very Large Scale Integration (VLSI) Systems. 2016;24:2253-2261.

Gilmer et al., Neural message passing for quantum chemistry. arXiv preprint arXiv:1704.01212. Jun. 2017. 14 pages.

Golub et al., Calculating the singular values and pseudo-inverse of a matrix. Journal of the Society for Industrial and Applied Mathematics Series B Numerical Analysis. 1965;2(2):205-224.

Graves et al., Hybrid computing using a neural network with dynamic external memory. Nature. 2016;538. 21 pages. DOI:10.1038/nature20101.

Grote et al., First long-term application of squeezed states of light in a gravitational-wave observatory. Physical Review Letter. 2013;110:181101. 5 pages. DOI: 10.1103/PhysRevLett.110.181101.

Gruber et al., Planar-integrated optical vector-matrix multiplier. Applied Optics. 2000;39(29):5367-5373.

Gullans et al., Single-Photon Nonlinear Optics with Graphene Plasmons. Physical Review Letter. 2013;111:247401-1-247401-5. DOI: 10.1103/PhysRevLett.111.247401.

Gunn, CMOS photonics for high-speed interconnects. IEEE Micro. 2006;26:58-66.

Haffner et al., Low-loss plasmon-assisted electro-optic modulator. Nature. 2018;556:483-486. 17 pages. DOI: 10.1038/s41586-018-0031-4.

Halasz et al., Phase diagram of QCD. Physical Review D. 1998;58:096007. 11 pages.

Hamerly et al., Scaling advantages of all-to-all connectivity in physical annealers: the Coherent Ising Machine vs. D-Wave 2000Q. arXiv preprints, May 2018. 17 pages.

Harris et al. Efficient, Compact and Low Loss Thermo-Optic Phase Shifter in Silicon. Optics Express. 2014;22(9);10487-93. DOI:10.1364/OE.22.010487.

Harris et al., Bosonic transport simulations in a large-scale programmable nanophotonic processor. arXiv:1507.03406. 2015. 8 pages.

Harris et al., Integrated source of spectrally filtered correlated photons for large-scale quantum photonic systems. Physical Review X. 2014;4:041047. 10 pages. DOI: 10.1103/PhysRevX.4.041047.

Harris et al., Quantum transport simulations in a programmable nanophotonic processor. Nature Photonics. 2017;11:447-452. DOI: 10.1038/NPHOTON.2017.95.

Hinton et al., Reducing the dimensionality of data with neural networks. Science. 2006;313:504-507.

Hochberg et al., Silicon Photonics: The Next Fabless Semiconductor Industry. IEEE Solid-State Circuits Magazine. 2013. pp. 48-58. DOI: 10.1109/MSSC.2012.2232791.

Honerkamp-Smith et al., An introduction to critical points for biophysicists; observations of compositional heterogeneity in lipid membranes. Biochimica et Biophysica Acta (BBA). 2009;1788:53-63. DOI: 10.1016/j.bbamem.2008.09.010.

Hong et al., Measurement of subpicosecond time intervals between two photons by interference. Physical Review Letters. 1987;59(18):2044-2046.

Hopfield et al., Neural computation of decisions in optimization problems. Biological Cybernetics. 1985;52;141-152.

Hopfield, Neural networks and physical systems with emergent collective computational abilities. PNAS. 1982;79:2554-2558. DOI: 10.1073/pnas.79.8.2554.

Horowitz, Computing's energy problem (and what we can do about it). Solid-State Circuits Conference Digest of Technical Papers (ISSCC), 2014 IEEE International. 5 pages.

Horst et al., Cascaded Mach-Zehnder wavelength filters in silicon photonics for low loss and flat pass-band WDM (de-)multiplexing. Optics Express. 2013;21(10):11652-8. DOI:10.1364/OE.21.011652.

Humphreys et al., Linear Optical Quantum Computing in a Single Spatial Mode. Physical Review Letters. 2013;111:150501. 5 pages. DOI: 10.1103/PhysRevLett.111.150501.

Inagaki et al., Large-scale ising spin network based on degenerate optical parametric oscillators. Nature Photonics. 2016;10:415-419. 6 pages. DOI: 10.1038/NPHOTON.2016.68.

Isichenko, Percolation, statistical topography, and trans-port in random media. Reviews of Modern Physics. 1992;64(4):961-1043.

Jaekel et al., Quantum limits in interferometric measurements. Europhysics Letters. 1990;13(4):301-306.

Jalali et al., Silicon Photonics. Journal of Lightwave Technology. 2006;24(12):4600-15. DOI: 10.1109/JLT.2006.885782.

Jia et al., Caffe: Convolutional architecture for fast feature embedding. Proceedings of the 22nd ACM International Conference on Multimedia. Nov. 2014. 4 pages. URL:http://doi.acm.org/10.1145/2647868.2654889.

Jiang et al., A planar ion trapping microdevice with integrated wavegu des for optical detection. Optics Express. 2011;19(4):3037-43.

Jonsson, An empirical approach to finding energy efficient ADC architectures. 2011 International Workshop on ADC Modelling, Testing and Data Converter Analysis and Design and IEEE 2011 ADC Forum. 6 pages.

Jouppi et al., In-datacenter performance analysis of a tensor processing unit. Proceeding of Computer Architecture (ISCA). Jun. 2017. 12 pages. URL:https://doi.org/10.1145/3079856.3080246.

Kahn et al., Communications expands its space. Nature Photonics. 2017;11:5-8.

Kardar et al., Dynamic Scaling of Growing Interfaces. Physical Review Letters. 1986;56(9):889-892.

Karpathy, CS231n Convolutional Neural Networks for Visual Recognition. Class notes. 2019. URL:http://cs231n.githubio/ 2 pages. [last accessed Sep. 24, 2019].

Kartalopoulos, Part III Coding Optical Information. Introduction to DWDM Technology. IEEE Press. 2000. pp. 165-166.

Keckler et al., GPUs and the future of parallel computing. IEEE Micro. 2011;31:7-17. DOI: 10.1109/MM.2011.89.

Kieling et al., On photonic Controlled Phase Gates. New Journal of Physics. 2010;12:0133003. 17 pages. DOI: 10.1088/1367-2630/12/1/013003.

Kilper et al., Optical networks come of age. Optics Photonics News. 2014;25:50-57. DOI: 10.1364/OPN.25.9.000050.

Kim et al., A functional hybrid memristor crossbar-array/cmos system for data storage and neuromorphic applications. Nano Letters. 2011;12:389-395.

Kirkpatrick et al., Optimization by simulated annealing. Science. 1983;220(4598):671-680.

Knill et al., A scheme for efficient quantum computation with linear optics. Nature. 2001;409(4652):46-52.

Knill et al., The Bayesian brain: the role of uncertainty in neural coding and computation. Trends in Neurosciences. 2004;27(12):712-719.

Knill, Quantum computing with realistically noisy devices. Nature. 2005;434:39-44.

(56) References Cited

OTHER PUBLICATIONS

Kok et al., Linear optical quantum computing with photonic qubits. Reviews of Modern Physics. 2007;79(1):135-174.

Koos et al., Silicon-organic hybrid (SOH) and plasmonic-organic hybrid (POH) integration. Journal of Lightwave Technology. 2016;34(2):256-268.

Krizhevsky et al., ImageNet classification with deep convolutional neural networks. Advances in Neural Information Processing Systems (NIPS). 2012. 9 pages.

Kucherenko et al., Application of Deterministic Low-Discrepancy Sequences in Global Optimization. Computational Optimization and Applications. 2005;30:297-318.

Kwack et al., Monolithic InP strictly non-blocking 8×8 switch for high-speed WDM optical interconnection. Optics Express. 2012;20(27):28734-41.

Lahini et al., Anderson Localization and Nonlinearity in One-Dimensional Disordered Photonic Lattices. Physical Review Letters. 2008;100:013906. 4 pages. DOI: 10.1103/PhysRevLett.100.013906.

Lahini et al., Quantum Correlations in Two-Particle Anderson Localization. Physical Review Letters. 2010;105:163905. 4 pages. DOI: 10.1103/PhysRevLett.105.163905.

Laing et al., High-fidelity operation of quantum photonic circuits. Applied Physics Letters. 2010;97:211109. 5 pages. DOI: 10.1063/1.3497087.

Landauer, Irreversibility and heat generation in the computing process. IBM Journal of Research and Development. 1961. pp. 183-191.

Lanyon et al., Towards quantum chemistry on a quantum computer. Nature Chemistry. 2010;2:106-10. DOI: 10.1038/NCHEM.483.

Lawson et al., Basic linear algebra subprograms for Fortran usage. ACM Transactions on Mathematical Software (TOMS). 1979;5(3):308-323.

Lecun et al., Deep learning. Nature. 2015;521:436-444. DOI:10.1038/nature14539.

Lecun et al., Gradient-based learning applied to document recognition. Proceedings of the IEEE. Nov. 1998. 46 pages.

Levi et al., Hyper-transport of light and stochastic acceleration by evolving disorder. Nature Physics. 2012;8:912-7. DOI: 10.1038/NPHYS2463.

Li et al., Efficient and self-adaptive in-situ learning in multilayer memristor neural networks. Nature Communications. 2018;9:2385. 8 pages. doi: 10.1038/s41467-018-04484-2.

Lin et al., All-optical machine learning using diffractive deep neural networks. Science. 2018;361:1004-1008. 6 pages. doi: 10.1126/science.aat8084.

Little, The existence of persistent states in the brain. Mathematical Biosciences. 1974;19:101-120.

Liu et al., Towards 1-Tb/s Per-Channel Optical Transmission Based on Multi-Carrier Modulation. 19th Annual Wireless and Optical Communications Conference. May 2010. 4 pages. DOI: 10.1109/WOCC.2010.5510630.

Lu et al., 16×16 non-blocking silicon optical switch based on electro-optic Mach-Zehnder interferometers. Optics Express. 2016;24(9):9295-9307. doi: 10.1364/OE.24.009295.

Ma et al., Optical switching technology comparison: Optical mems vs. Other technologies. IEEE Optical Communications. 2003;41(11):S16-S23.

MacReady et al., Criticality and Parallelism in Combinatorial Optimization. Science. 1996;271:56-59.

Marandi et al., Network of time-multiplexed optical parametric oscillators as a coherent Ising machine. Nature Photonics. 2014;8:937-942. doi: 10.1038/NPHOTON.2014.249.

Martin-Lopez et al., Experimental realization of Shor's quantum factoring algorithm using qubit recycling. Nature Photonics. 2012;6:773-6. DOI: 10.1038/NPHOTON.2012.259.

McMahon et al., A fully programmable 100-spin coherent Ising machine with all-to-all connections. Science. 2016;354(6312):614-7. DOI: 10.1126/science.aah5178.

Mead, Neuromorphic electronic systems. Proceedings of the IEEE. 1990;78(10):1629-1636.

Migdall et al., Tailoring single-photon and multiphoton probabilities of a single-photon on-demand source. Physical Review A. 2002;66:053805. 4 pages. DOI: 10.1103/PhysRevA.66.053805.

Mikkelsen et al., Dimensional variation tolerant silicon-on-insulator directional couplers. Optics Express. 2014;22(3):3145-50. DOI:10.1364/OE.22.003145.

Miller, Are optical transistors the logical next step? Nature Photonics. 2010;4:3-5.

Miller, Attojoule optoelectronics for low-energy information processing and communications. Journal of Lightwave Technology. 2017;35(3):346-96. DOI: 10.1109/JLT.2017.2647779.

Miller Energy consumption in optical modulators for interconnects. Optics Express. 2012;20(S2):A293-A308.

Miller, Perfect optics with imperfect components. Optica. 2015;2(8):747-750.

Miller Reconfigurable add-drop multiplexer for spatial modes. Optics Express. 2013;21(17):20220-9. DOI:10.1364/OE.21.020220.

Miller, Self-aligning universal beam coupler, Optics Express. 2013;21(5):6360-70.

Miller, Self-configuring universal linear optical component [Invited]. Photonics Research. 2013;1(1):1-15. URL:http://dx.doi.org/10.1364/PRJ.1.000001.

Misra et al., Artificial neural networks in hardware: A survey of two decades of progress. Neurocomputing. 2010;74:239-255.

Mohseni et al., Environment-assisted quantum walks in photosynthetic complexes. The Journal of Chemical Physics. 2008;129:174106. 10 pages. DOI: 10.1063/1.3002335.

Moore, Cramming more components onto integrated circuits. Proceeding of the IEEE. 1998;86(1):82-5.

Mower et al., Efficient generation of single and entangled photons on a silicon photonic integrated chip. Physical Review A. 2011;84:052326. 7 pages. DOI: 10.1103/PhysRevA.84.052326.

Mower et al., High-fidelity quantum state evolution in imperfect photonic integrated circuits. Physical Review A. 2015;92(3):032322. 7 pages. doi: 10.1103/PhysRevA.92.032322.

Nagamatsu et al., A 15 NS 32×32-bit CMOS multiplier with an improved parallel structure. IEEE Custom Integrated Circuits Conference. 1989. 4 pages.

Najafi et al., On-Chip Detection of Entangled Photons by Scalable Integration of Single-Photon Detectors. arXiv:1405.4244. May 16, 2014. 27 pages.

Najafi et al., On-Chip detection of non-classical light by scalable integration of single-photon detectors. Nature Communications. 2015;6:5873. 8 pages. DOI: 10.1038/ncomms6873.

Naruse, Nanophotonic Information Physics. Nanointelligence and Nanophotonic Computing. Springer. 2014. 261 pages. DOI 10.1007/978-3-642-40224-1.

Nozaki et al., Sub-femtojoule all-optical switching using a photonic-crystal nanocavity. Nature Photonics. 2010;4:477-483. doi: 10.1038/NPHOTON.2010.89.

O'Brien et al., Demonstration of an all-optical quantum controlled-NOT gate. Nature. 2003;426:264-7.

Onsager, Crystal Statistics. I. A Two-Dimensional Model with an Order-Disorder Transition. Physical Review. 1944;65(3,4):117-149.

Orcutt et al., Nanophotonic integration in state-of-the-art CMOS foundries. Optics Express. 2011;19(3):2335-46.

Pelissetto et al., Critical phenomena and renormalization-group theory. Physics Reports. Apr. 2002. 150 pages.

Peng, Implementation of AlexNet with Tensorflow. https://github.com/ykpengba/AlexNet-A-Practical-Implementation. 2018. 2 pages. [last accessed Sep. 24, 2019].

Peretto, Collective properties of neural networks: A statistical physics approach. Biological Cybernetics. 1984;50:51-62.

Pernice et al., High-speed and high-efficiency travelling wave single-photon detectors embedded in nanophotonic circuits. Nature Communications 2012;3:1325. 10 pages. DOI: 10.1038/ncomms2307.

Peruzzo et al., Quantum walk of correlated photons. Science. 2010;329;1500-3. DOI: 10.1126/science.1193515.

(56) References Cited

OTHER PUBLICATIONS

Politi et al., Integrated Quantum Photonics, IEEE Journal of Selected Topics in Quantum Electronics, 2009;5(6):1-12. DOI: 10.1109/JSTQE.2009.2026060.
Politi et al., Silica-on-Silicon Waveguide Quantum Circuits. Science. 2008;320:646-9. DOI: 10.1126/science.1155441.
Poon et al., Neuromorphic silicon neurons and large-scale neural networks: challenges and opportunities. Frontiers in Neuroscience. 2011;5:1-3. doi: 10.3389/fnins.2011.00108.
Prucnal et al., Recent progress in semiconductor excitable lasers for photonic spike processing. Advances in Optics and Photonics. 2016;8(2):228-299.
Psaltis et al., Holography in artificial neural networks. Nature. 1990;343:325-330.
Qiao et al., 16×16 non-blocking silicon electro-optic switch based on mach zehnder interferometers. Optical Fiber Communication Conference. Optical Society of America. 2016. 3 pages.
Ralph et al., Linear optical controlled-NOT gate in the coincidence basis. Physical Review A. 2002;65:062324-1-062324-5. DOI: 10.1103/PhysRevA.65.062324.
Ramanitra et al., Scalable and multi-service passive optical access infrastructure using variable optical splitters. Optical Fiber Communication Conference. Optical Society of America. 2005. 3 pages.
Raussendorf et al., A one-way quantum computer. Physical Review Letter. 2001;86(22):5188-91. DOI: 10.1103/PhysRevLett.86.5188.
Rechtsman et al., Photonic floquet topological insulators. Nature. 2013;496:196-200. doi: 10.1038/nature12066.
Reck et al., Experimental realization of any discrete unitary operator. Physical review letters. 1994;73(1):58-61. 6 pages.
Reed et al., Silicon optical modulators. Nature Photonics. 2010;4:518-26. DOI: 10.1038/NPHOTON.2010.179.
Rendl et al., Solving Max-Cut to optimality by intersecting semidefinite and polyhedral relaxations. Mathematical Programming. 2010;121:307-335. doi: 10.1007/s10107-008-0235-8.
Rios et al., Integrated all-photonic non-volatile multilevel memory. Nature Photonics. 2015;9:725-732. doi: 10.1038/NPHOTON.2015.182.
Rogalski, Progress in focal plane array technologies. Progress in Quantum Electronics. 2012;36:342-473.
Rohit et al., 8×8 space and wavelength selective cross-connect for simultaneous dynamic multi-wavelength routing. Optical Fiber Communication Conference. OFC/NFOEC Technical Digest. 2013. 3 pages.
Rosenblatt, The perceptron: a probabilistic model for information storage and organization in the brain. Psychological Review. 1958;65(6):386-408.
Russakovsky et al., ImageNet Large Scale Visual Recognition Challenge. arXiv:1409.0575v3. Jan. 2015. 43 pages.
Saade et al., Random projections through multiple optical scattering: Approximating Kernels at the speed of light. arXiv:1510.06664v2. Oct. 25, 2015. 6 pages.
Salandrino et al., Analysis of a three-core adiabatic directional coupler. Optics Communications. 2009;282:4524-6. doi:10.1016/j.optcom.2009.08.025.
Schaeff et al., Scalable fiber integrated source for higher-dimensional path-entangled photonic quNits. Optics Express. 2012;20(15):16145-153.
Schirmer et al., Nonlinear mirror based on two-photon absorption. Journal of the Optical Society of America B. 1997;14(11):2865-8.
Schmidhuber, Deep learning in neural networks: An overview. Neural Networks. 2015;61:85-117.
Schreiber et al., Decoherence and Disorder in Quantum Walks: From Ballistic Spread to Localization. Physical Review Letters. 2011;106:180403.4 pages. DOI: 10.1103/PhysRevLett.106.180403.
Schwartz et al., Transport and Anderson localization in disordered two-dimensional photonic lattices. Nature. 2007;446:52-5. doi:10.1038/nature05623.
Selden, Pulse transmission through a saturable absorber. British Journal of Applied Physics. 1967;18:743-8.
Shafiee et al., ISAAC: A convolutional neural network accelerator with in-situ analog arithmetic in crossbars. ACM/IEEE 43rd Annual International Symposium on Computer Architecture. Oct. 2016. 13 pages.
Shen et al., Deep learning with coherent nanophotonic circuits. Nature Photonics. 2017;11:441-6. DOI: 10.1038/NPHOTON.2017.93.
Shoji et al., Low-crosstalk 2×2 thermo-optic switch with silicon wire waveguides. Optics Express.2010;18(9):9071-5.
Silver et al. Mastering chess and shogi by self-play with a general reinforcement learning algorithm. arXiv preprint arXiv:1712.01815. 19 pages. 2017.
Silver et al., Mastering the game of go with deep neural networks and tree search. Nature. 2016;529:484-9. 20 pages. doi:10.1038/nature16961.
Silver et al., Mastering the game of Go without human knowledge. Nature. 2017;550:354-9. 18 pages. doi:10.1038/nature24270.
Silverstone et al., On-chip quantum interference between silicon photon-pair sources. Nature Photonics. 2014;8:104-8. DOI: 10.1038/NPHOTON.2013.339.
Smith et al., Phase-controlled integrated photonic quantum circuits. Optics Express. 2009;17(16):13516-25.
Soljacic et al., Optimal bistable switching in nonlinear photonic crystals. Physical Review E. 2002;66:055601. 4 pages.
Solli et al., Analog optical computing. Nature Photonics. 2015;9:704-6.
Spring et al., Boson sampling on a photonic chip. Science. 2013;339:798-801. DOI: 10.1126/science.1231692.
Srinivasan et al., 56 Gb/s germanium waveguide electro-absorption modulator. Journal of Lightwave Technology. 2016;34(2):419-24. DOI: 10.1109/JLT.2015.2478601.
Steinkraus et al., Using GPUs for machine learning algorithms. Proceedings of the 2005 Eight International Conference on Document Analysis and Recognition. 2005. 6 pages.
Suda et al., Quantum interference of photons in simple networks. Quantum Information Process. 2013;12:1915-45. DOI 10.1007/s11128-012-0479-3.
Sun et al., Large-scale nanophotonic phased array. Nature. 2013;493:195-9. doi:10.1038/nature11727.
Sun et al., Single-chip microprocessor that communicates directly using light. Nature. 2015;528:534-8. doi:10.1038/nature16454.
Suzuki et al., Ultra-compact 8×8 strictly-non-blocking Si-wire PILOSS switch. Optics Express. 2014;22(4):3887-94. DOI:10.1364/OE.22.003887.
Sze et al., Efficient processing of deep neural networks: a tutorial and survey. Proceedings of the IEEE. 2017;105(12):2295-2329. DOI: 10.1109/JPROC.2017.276174.
Tabia, Experimental scheme for qubit and qutrit symmetric informationally complete positive operator-valued measurements using multiport devices. Physical Review A. 2012;86:062107. 8 pages. DOI: 10.1103/PhysRevA.86.062107.
Tait et al., Broadcast and weight: An integrated network for scalable photonic spike processing. Journal of Lightwave Technology. 2014;32(21):3427-39. DOI: 10.1109/JLT.2014.2345652.
Tait et al., Chapter 8 Photonic Neuromorphic Signal Processing and Computing. Springer, Berlin, Heidelberg. 2014. pp. 183-222.
Tait et al., Neuromorphic photonic networks using silicon photonic weight banks. Scientific Reports. 2017;7:7430. 10 pages.
Tanabe et al., Fast bistable all-optical switch and memory on a silicon photonic crystal on-chip. Optics Letters. 2005;30(19):2575-7.
Tanizawa et al., Ultra-compact 32×32 strictly-non-blocking Si-wire optical switch with fan-out LGA interposer. Optics Express. 2015;23(13):17599-606. DOI:10.1364/OE.23.017599.
Thompson et al., Integrated waveguide circuits for optical quantum computing. IET Circuits, Devices, & Systems. 2011;5(2):94-102. doi: 10.1049/iet-cds.2010.0108.
Timurdogan et al., An ultralow power athermal silicon modulator. Nature Communications. 2014;5:4008. 11 pages. DOI: 10.1038/ncomms5008.
Vandoorne et al., Experimental demonstration of reservoir computing on a silicon photonics chip. Nature Communications. 2014;5:3541. 6 pages. DOI: 10.1038/ncomms4541.

(56) References Cited

OTHER PUBLICATIONS

Vazquez et al., Optical NP problem solver on laser-written waveguide plat-form. Optics Express. 2018;26(2):702-10.

Vivien et al., Zero-bias 40gbit/s germanium waveguide photodetector on silicon. Optics Express. 2012;20(2):1096-1101.

Wang et al., Coherent Ising machine based on degenerate optical parametric oscillators. Physical Review A. 2013;88:063853. 9 pages. DOI: 10.1103/PhysRevA.88.063853.

Wang et al., Deep learning for identifying metastatic breast cancer. arXiv preprint arXiv:1606.05718. Jun. 18, 2016. 6 pages.

Werbos, Beyond regression: New tools for prediction and analysis in the behavioral sciences. Ph.D. dissertation, Harvard University. Aug. 1974. 454 pages.

Whitfield et al., Simulation of electronic structure Hamiltonians using quantum computers. Molecular Physics. 2010;109(5,10):735-50. DOI: 10.1080/00268976.2011.552441.

Wu et al., An optical fiber network oracle for NP-complete problems. Light: Science & Applications. 2014;3: e147. 5 pages. doi:10.1038/lsa.2014.28.

Xia et al., Mode conversion losses in silicon-on-insulator photonic wire based racetrack resonators. Optics Express. 2006;14(9):3872-86.

Xu et al., Experimental observations of bistability and instability in a two-dimensional nonlinear optical superlattice. Physical Review Letters. 1993;71(24):3959-62.

Yang et al., Non-Blocking 4×4 Electro-Optic Silicon Switch for On-Chip Photonic Networks. Optics Express 2011;19(1):47-54.

Yao et al., Serial-parallel multipliers. Proceedings of 27th Asilomar Conference on Signals, Systems and Computers. 1993. pp. 359-363.

Young et al., Recent trends in deep learning based natural language processing. IEEE Computational Intelligence Magazine. arXiv:1708.02709v8. Nov. 2018. 32 pages.

Zhou et al., Calculating Unknown Eigenvalues with a Quantum Algorithm. Nature Photonics. 2013;7:223-8. DOI: 10.1038/NPHOTON.2012.360.

International Search Report and Written Opinion dated Mar. 24, 2021 in connection with International Application No. PCT/US2020/061642.

* cited by examiner

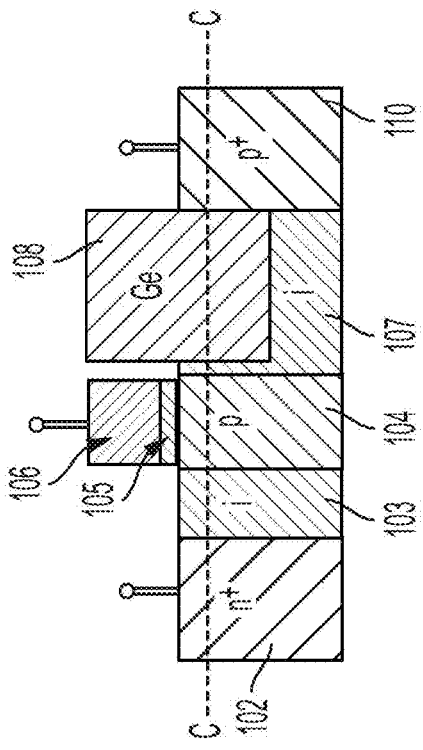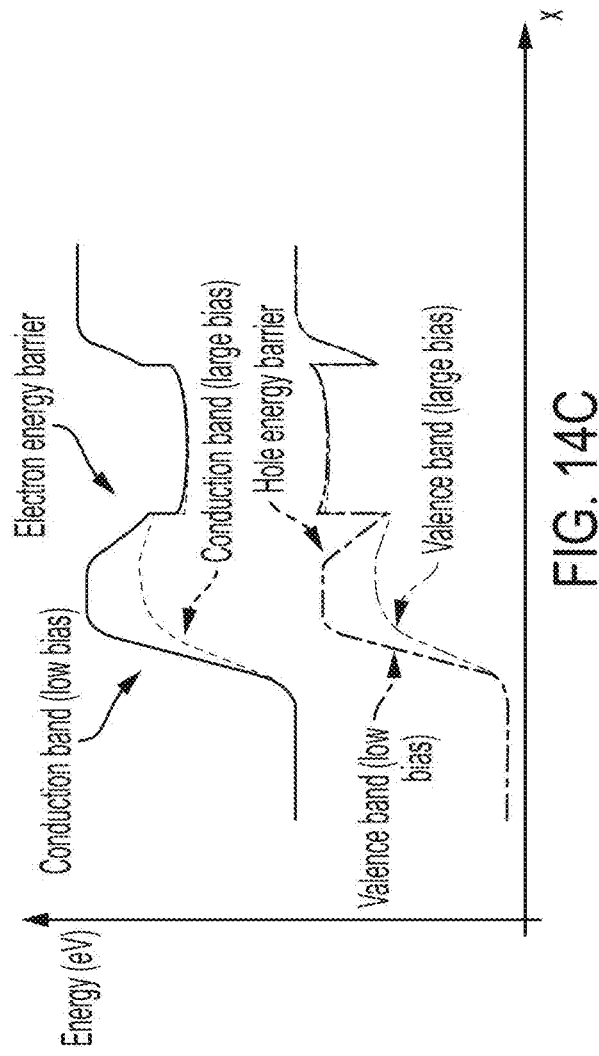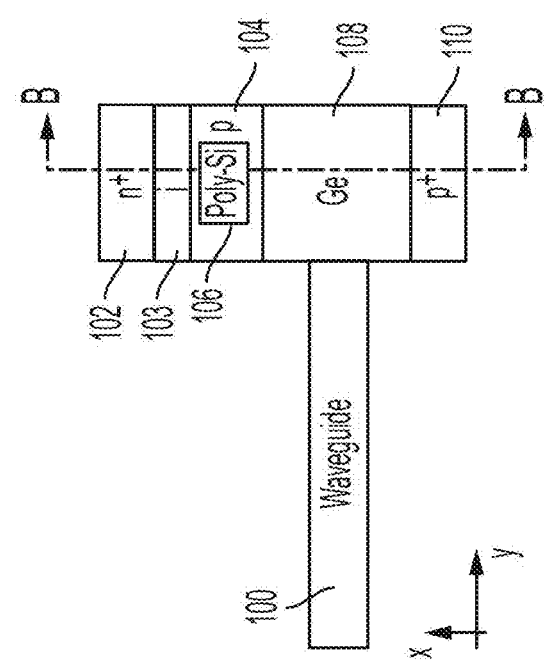
FIG. 14B
FIG. 14C
FIG. 14A

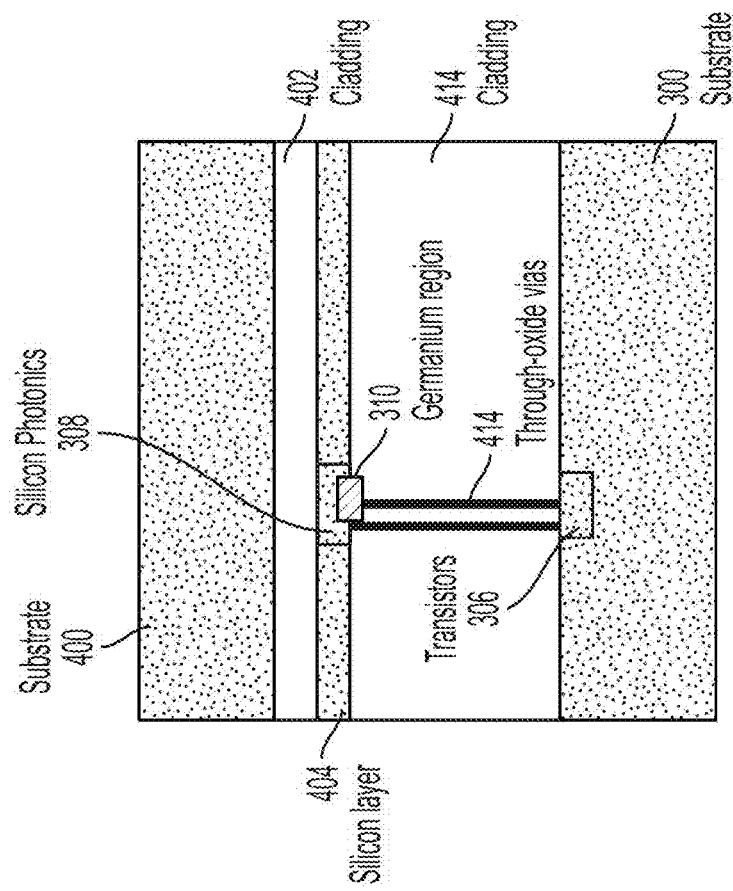
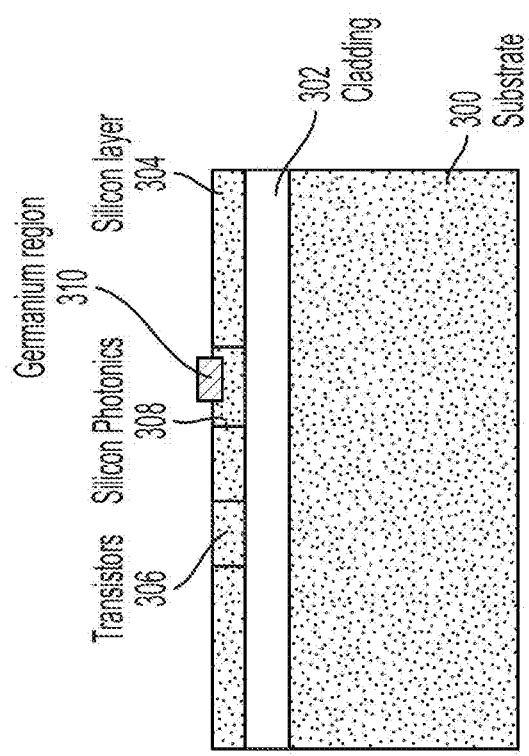
FIG. 20B
FIG. 20A

LINEAR PHOTONIC PROCESSORS AND RELATED METHODS

CROSS-REFERENCE TO RELATED APPLICATIONS

This application claims the benefit under 35 U.S.C. § 119(e) of U.S. Provisional Patent Application Ser. No. 62/939,480, entitled "SYSTEMS AND METHODS FOR ANALOG COMPUTING," filed on Nov. 22, 2019, which is hereby incorporated herein by reference in its entirety.

This application claims the benefit under 35 U.S.C. § 119(e) of U.S. Provisional Patent Application Ser. No. 62/962,759, entitled "MODULATABLE DETECTOR-BASED MULTIPLIERS," filed on Jan. 17, 2020, which is hereby incorporated herein by reference in its entirety.

This application claims the benefit under 35 U.S.C. § 119(e) of U.S. Provisional Patent Application Ser. No. 62/963,315, entitled "DUAL-RAIL PHOTONIC MULTIPLIER SYSTEM WITH APPLICATIONS TO LINEAR PHOTONIC PROCESSOR," filed on Jan. 20, 2020, which is hereby incorporated herein by reference in its entirety.

This application claims the benefit under 35 U.S.C. § 119(e) of U.S. Provisional Patent Application Ser. No. 62/970,360, entitled "MODULATABLE DETECTORS," filed on Feb. 5, 2020, which is hereby incorporated herein by reference in its entirety.

This application claims the benefit under 35 U.S.C. § 119(e) of U.S. Provisional Patent Application Ser. No. 62/978,181, entitled "MODULATABLE DETECTORS," filed on Feb. 18, 2020, which is hereby incorporated herein by reference in its entirety.

BACKGROUND

Deep learning, machine learning, latent-variable models, neural networks and other matrix-based differentiable programs are used to solve a variety of problems, including natural language processing and object recognition in images. Solving these problems with deep neural networks typically requires long processing times to perform the required computation. The most computationally intensive operations in solving these problems are often mathematical matrix operations, such as matrix multiplication.

SUMMARY OF THE DISCLOSURE

Some embodiments relate to a method for performing a mathematical operation comprising: receiving an input optical signal; obtaining a first numeric value and a second numeric value; generating first and second encoded optical signals by modifying the input optical signal using the first numeric value; generating first and second encoded output signals using the second numeric value and the first and second encoded optical signals; and obtaining a result of the mathematical operation using the first and second encoded output signals.

In some embodiments, the first and second encoded output signals are optical signals.

In some embodiments, a difference between the first and second encoded output signals is proportional to a difference between the first and second encoded optical signals.

In some embodiments, the difference between the first and second encoded output signals is proportional to the second numeric value.

In some embodiments, the difference between the first and second encoded optical signals is proportional to the first numeric value.

In some embodiments, the first and second encoded optical signals are orthogonal to each other.

In some embodiments, respective phases of the first and second encoded optical signals are uncorrelated.

In some embodiments, the first and second encoded optical signals have different carrier frequencies.

In some embodiments, the first and second encoded optical signals have a constant quadrature phase difference.

In some embodiments, wherein receiving the input optical signal comprises receiving the input optical signal from an incoherent light source.

In some embodiments, the first and second encoded optical signals have orthogonal polarizations.

In some embodiments, the first and second encoded optical signals are temporally non-overlapping.

In some embodiments, generating the first and second encoded optical signals comprises passing the input optical signal through an optical modulator.

In some embodiments, generating the first and second encoded optical signals comprises setting a characteristic of the optical modulator based on the first numeric value.

In some embodiments, obtaining the result comprises subtracting the first encoded output signal from the second encoded output signal or subtracting the second encoded output signal from the first encoded output signal.

In some embodiments, generating the first and second encoded output signals comprises detecting the first and second encoded optical signals using one or more modulatable detectors.

In some embodiments, generating the first and second encoded output signals comprises setting a characteristic of the one or more modulatable detectors based on the second numeric value.

In some embodiments, the first and second encoded optical signals are confined within different optical waveguides.

In some embodiments, obtaining the result comprises obtaining a product of the first numeric value times the second numeric value.

Some embodiments relate to a photonic processor comprising: a plurality of differential optical encoders including first and second differential optical encoders; a first set of differential multipliers coupled to the first differential optical encoder; a second set of differential multipliers coupled to the second differential optical encoder; a first receiver coupled to the first set of differential multipliers; and a second receiver coupled to the second set of differential multipliers.

In some embodiments, at least one of the plurality of differential encoders comprises an optical modulator having a pair of optical output ports.

In some embodiments, at least one differential multiplier of the first and second sets of differential multipliers comprises an optical modulator having a pair of optical output ports.

In some embodiments, the first and second sets of differential multipliers comprise modulatable detectors.

In some embodiments, the photonic processor further comprises an optical orthogonalization unit placed between the first differential optical encoder and the first set of differential multipliers.

In some embodiments, the optical orthogonalization unit comprises a serpentine-shaped optical waveguide.

In some embodiments, the optical orthogonalization unit comprises an optical polarization rotator.

In some embodiments, the photonic processor further comprises a light source and an optical splitter tree coupling the light source to the first set of differential multipliers.

In some embodiments, the optical splitter tree lacks waveguide crossings.

In some embodiments, the photonic processor further comprises a controller configured to control the plurality of differential optical encoders, wherein the controller comprises a plurality of transistors, and wherein the plurality of transistors and the plurality of differential optical encoders share at least one layer of a semiconductor substrate.

Some embodiments relate to a method for fabricating a photonic processor comprising: obtaining a semiconductor substrate; forming, on the semiconductor substrate: a plurality of differential optical encoders including first and second differential optical encoders; a first set of differential multipliers coupled to the first differential optical encoder; a second set of differential multipliers coupled to the second differential optical encoder; a first receiver coupled to the first set of differential multipliers; and a second receiver coupled to the second set of differential multipliers.

In some embodiments, forming the plurality of differential encoders comprises forming a plurality of optical modulators each having a pair of optical output ports.

In some embodiments, the method further comprises forming a plurality of transistors on the semiconductor substrate.

In some embodiments, the plurality of transistors and the plurality of differential optical encoders share at least one layer of the semiconductor substrate.

Some embodiments relate to a method for performing a mathematical operation comprising: receiving an input optical signal; obtaining a first numeric value and a second numeric value; generating an encoded optical signal by modifying the input optical signal using the first numeric value; generating a photocurrent at least in part by: detecting the encoded optical signal using a modulatable detector, and setting a characteristic of the modulatable detector based on the second value; and obtaining a result of the mathematical operation using the photocurrent.

In some embodiments, the modulatable detector comprises a photodetector, and wherein setting the characteristic of the modulatable detector based on the second value comprises setting a responsivity of the photodetector based on the second value.

In some embodiments, obtaining the result comprises obtaining a product of the first numeric value times the second numeric value.

In some embodiments, the modulatable detector comprises a control capacitor, and wherein setting the characteristic of the modulatable detector comprises setting a voltage applied to the control capacitor.

In some embodiments, the control capacitor comprises a metal-oxide-semiconductor capacitor (MOS cap), and wherein setting the voltage applied to the control capacitor comprises setting the voltage applied to the MOS cap.

In some embodiments, setting the characteristic of the modulatable detector comprises producing carrier avalanche.

In some embodiments, generating the encoded optical signal comprises passing the input optical signal through an optical modulator.

In some embodiments, the modulatable detector comprises a photodetector and a transistor, and wherein setting the characteristic of the modulatable detector comprises setting a voltage applied to the transistor.

In some embodiments, the modulatable detector comprises a photodetector and a gain stage, and wherein setting the characteristic of the modulatable detector based on the second value comprises setting a current gain of the gain stage based on the second value.

Some embodiments relate to a photonic device configured to perform a mathematical operation comprising: an optical encoder; a modulatable detector coupled to an output of the optical encoder; and a controller coupled to both the optical encoder and the modulatable detector, the controller being configured to: obtain a first numeric value and a second numeric value, control the optical encoder to generate an encoded optical signal by modifying an input optical signal using the first numeric value, control the modulatable detector to generate a photocurrent in response to receiving the encoded optical signal, wherein controlling the modulatable detector comprises setting a characteristic of the modulatable detector based on the second numeric value, and obtain a result of the mathematical operation using the photocurrent.

In some embodiments, the modulatable detector comprises a photodetector, and wherein setting the characteristic of the modulatable detector based on the second value comprises setting a responsivity of the photodetector based on the second value.

In some embodiments, the modulatable detector comprises a photo-absorption region and a control capacitor positioned adjacent to the photo-absorption region.

In some embodiments, the control capacitor comprises a metal-oxide-semiconductor capacitor (MOS cap).

In some embodiments, the modulatable detector further comprises an electron avalanche region positioned adjacent to the MOS cap.

In some embodiments, the modulatable detector comprises: a first photodetector and a second photodetector; first and second transistors both coupled to the first photodetector; and third and fourth transistors both coupled to the second photodetector.

In some embodiments, the first photodetector is coupled to respective sources of the first and second transistors, and wherein the first transistor and the third transistor have drains that are coupled to each other.

In some embodiments, the first and third transistors are arranged as an inverter, and wherein the first photodetector is coupled to respective sources of the first and second transistors.

In some embodiments, the first photodetector is further coupled to the third and fourth transistors and the second photodetector is further coupled to the first and second transistors, and wherein the first transistor and the second transistor have drains that are coupled to each other and sources that are coupled to each other.

In some embodiments, the modulatable detector comprises: a first photodetector and a second photodetector; first and second transistors both coupled to the first photodetector; and a node coupled to the first and second photodetectors and further coupled to the first and second transistors.

In some embodiments, the modulatable detector comprises a photodetector and a plurality of transistors, and wherein the photodetector and the plurality of transistors are formed on a common semiconductor substrate.

In some embodiments, the modulatable detector comprises a plurality of balanced photodetectors and a plurality of transistors arranged differentially.

Some embodiments relate to a photonic processor comprising: a plurality of differential optical encoders including first and second differential optical encoders; a first pair of modulatable detectors coupled to the first differential optical encoder; a second pair of modulatable detectors coupled to the second differential optical encoder; a first differential receiver coupled to the first pair of modulatable detectors; and a second differential receiver coupled to the second pair of modulatable detectors.

In some embodiments, at least one of the first pair of modulatable detectors comprises a photo-absorption region and a control capacitor positioned adjacent to the photo-absorption region.

In some embodiments, the control capacitor comprises a metal-oxide-semiconductor capacitor (MOS cap).

In some embodiments, at least one of the first pair of modulatable detectors comprises: a first photodetector and a second photodetector; first and second transistors both coupled to the first photodetector; and third and fourth transistors both coupled to the second photodetector.

In some embodiments, the first photodetector is coupled to respective sources of the first and second transistors, and wherein the first transistor and the third transistor have drains that are coupled to each other.

In some embodiments, at least one of the first pair of modulatable detectors comprises: a first photodetector and a second photodetector; first and second transistors both coupled to the first photodetector; and a node coupled to the first and second photodetectors and further coupled to the first and second transistors.

In some embodiments, at least one of the first pair of modulatable detector comprises a photodetector and a plurality of transistors, wherein the photodetector and the plurality of transistors are formed on a common semiconductor substrate.

Some embodiments relate to a method for fabricating a photonic processor comprising: obtaining a semiconductor substrate; forming, on the semiconductor substrate: a plurality of differential optical encoders including first and second differential optical encoders; a first pair of modulatable detectors coupled to the first differential optical encoder; a second pair of modulatable detectors coupled to the second differential optical encoder; a first differential receiver coupled to the first pair of modulatable detectors; and a second differential receiver coupled to the second pair of modulatable detectors.

In some embodiments, forming the plurality of differential encoders comprises forming a plurality of optical modulators each having a pair of optical output ports.

In some embodiments, forming the first pair of modulatable detectors comprising forming a plurality of transistors.

In some embodiments, the plurality of transistors and the plurality of differential optical encoders share at least one layer of the semiconductor substrate.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in the figures in which they appear.

FIG. 14A is a top view of a photodetector including a metal-oxide-semiconductor capacitor (MOS cap), in accordance with some embodiments.

FIG. 14B is a cross sectional view of the modulatable detector of FIG. 14A taken along the BB line, in accordance with some embodiments.

FIG. 14C is an energy band diagram plotted along the CC line of FIG. 14B, in accordance with some embodiments.

FIGS. 20A-20B are cross sectional views illustrating substrates including modulatable detectors, in accordance with some embodiments.

DETAILED DESCRIPTION

I. Overview

Figure 1A:
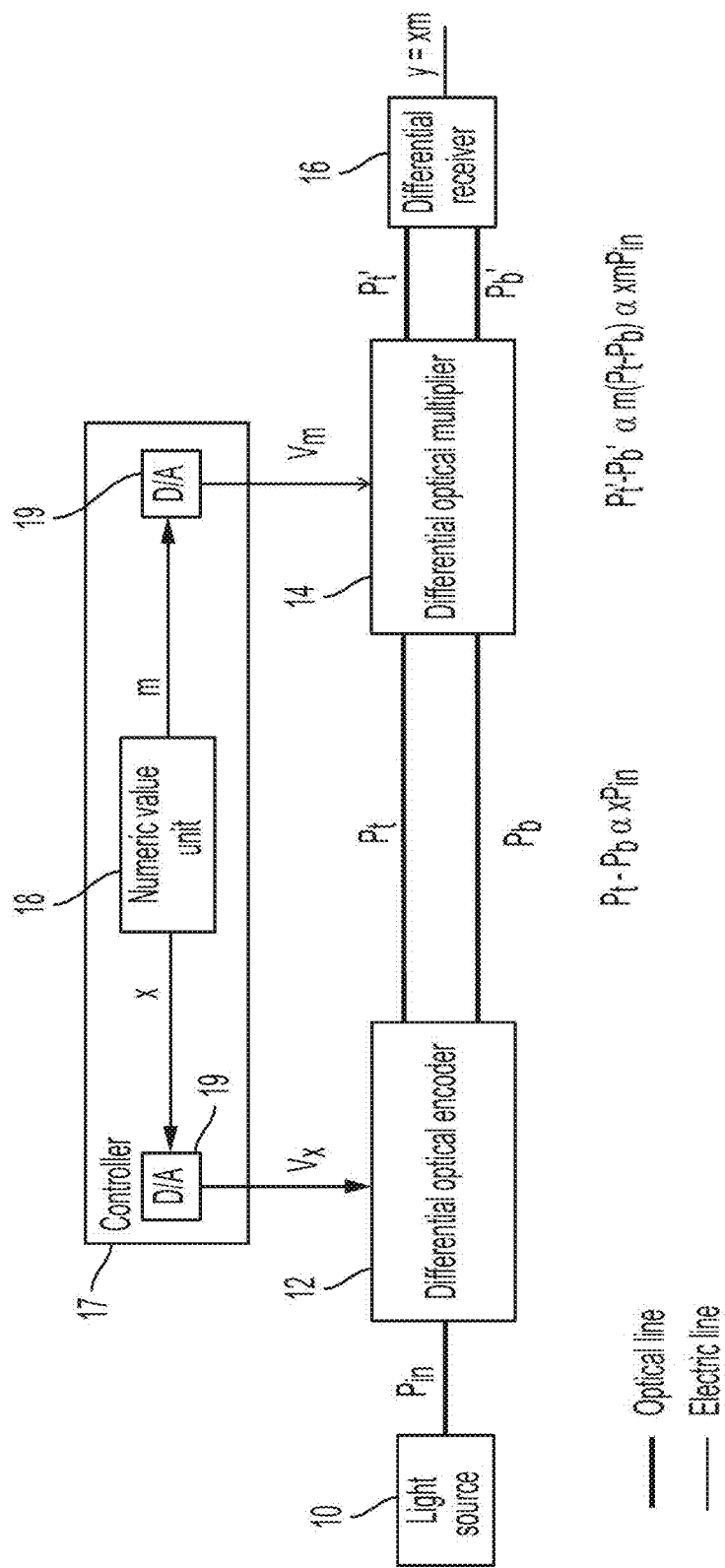
FIG. 1A is a block diagram illustrating a dual-rail optical multiplier, in accordance with some embodiments.

Conventional electronic processors face severe speed and efficiency limitations primarily to the inherent presence of impedance in electronic interconnects. Connecting multiple processor cores and/or connecting a processor core to a memory involves use of conductive traces. Large values of impedance limit the maximum rate at which data can be transferred through the trace with a negligible bit error rate. For processing that requires billions of operations, these delays can result in a significant loss of performance. In addition to electrical circuits' inefficiencies in speed, the heat generated by the dissipation of energy caused by the impedance of the circuits is also a barrier in developing electronic processors.

The inventors have recognized and appreciated that using optical signals (instead of, or in combination with, electrical signals) overcomes the aforementioned problems with electronic computing. Optical signals travel at the speed of light in the medium in which the light is traveling. Thus, the latency of optical signals is far less of a limitation than electrical propagation delay. Additionally, no power is dissipated by increasing the distance traveled by the light signals, opening up new topologies and processor layouts that would not be feasible using electrical signals. Thus, photonic processors offer far better speed and efficiency performance than conventional electronic processors.

The inventors have recognized and appreciated that photonic processors are well-suited for particular types of algorithms. For example, many machine learning algorithms (e.g. support vector machines, artificial neural networks and probabilistic graphical model learning) rely heavily on linear transformations on multi-dimensional arrays/tensors. The simplest linear transformation is a matrix-vector multiplication, which using conventional algorithms has a complexity on the order of $O(N^2)$, where N is the dimensionality of a square matrix being multiplied by a vector of the same dimension. The inventors have recognized and appreciated that a photonic processor can perform linear transformations, such as matrix multiplication, in a highly parallel manner by propagating a particular set of input optical signals through a configurable array of active optical components. Using such implementations, matrix-vector multiplication of dimension N=512 can be completed in hundreds of picoseconds, as opposed to the tens to hundreds of nanoseconds using conventional electronic circuit-based processing.

General matrix-matrix (GEMM) operations are ubiquitous in software algorithms, including those for graphics processing, artificial intelligence, neural networks and deep learning. GEMM calculations in today's computers are typically performed using transistor-based systems such as GPU systems or systolic array systems. Matrix-vector multiplication using photonics arrays can be highly power efficient when compared to their electronic counterparts as optical signals can propagate within a semiconductor substrate with a minimal amount of loss.

However, the inventors have recognized and appreciated a number of challenges associated with the use of such photonic arrays. First, just like electronic circuits, photonic arrays are susceptible to noise. Noise arises in photonic arrays due to a variety of mechanisms, including thermal noise and shot noise. The presence of noise reduces the ability of photonic arrays to accurately reproduce and process numeric values, thereby reducing their overall performance.

Second, photonic arrays are susceptible to optical loss. On the one hand, optical sources can produce only limited amounts of optical power. On the other hand, photodetectors are limited by shot noise, meaning that the minimum optical power that a photodetector can detect is limited to a floor level. The result is that the optical power budget is limited, and therefore, every decibel of optical power counts. Optical loss negatively affects the power budgets, and can arise due to a variety of reasons. For example, optical loss arises as a result of optical modulation. In conventional optical systems, optical power is intentionally attenuated-thereby increasing optical loss-to produce modulation. For example, in amplitude-based modulation schemes, a logical 0 is reproduced by suppressing the power of an optical signal.

Third, conventional photonic arrays occupy substantially more chip real estate than electronic components such as transistors, thereby limiting the amount of processing capabilities that may be integrated on a single chip. Consider for example Mach-Zehnder interferometers, which are conventionally used to perform optical modulation. To provide sufficient optical modulation, Mach-Zehnder interferometers are generally designed with large lengths, often in the order of several millimeters. One the other hand, a transistor, the core component of an electronic circuit, is several orders of magnitude smaller.

The inventors have developed a novel photonic processing architecture for performing matrix-matrix multiplication (including matrix-vector multiplication, a core component of GEMM operations), that avoids or mitigates the above-described challenges. According to an aspect of the present disclosure, the architecture described herein involves processing optical signals in a differential fashion. Instead of encoding data into a single-ended optical signal as is done for example in digital optical communication systems, data is encoded in the difference between a pair of optical signals (e.g., in the difference between the amplitudes of the optical signals or in the difference between the powers of the optical signals). This architecture is referred to herein as "dual-rail." One rail carries an optical signal, another rail carries another optical signal. Rails can be implemented in any of numerous ways, including for example using a pair of distinct optical waveguides, where each waveguide carries one optical signal. It should be appreciated, however, that the rails need not be physically separate channels. In some embodiments, for example, both rails are implemented on the same physical waveguide, and the optical signals are distinguishable from one another by virtue of their polarization, wavelength, or other optical characteristics.

The dual-rail architectures described herein reduce photonic processors' susceptibility to noise. Statistically, when noise is present on the first rail, there is a high likelihood that noise having substantially the same characteristics is also present on the second rail. This is especially true if the rails are defined on optical waveguides positioned in close proximity to one another. Decoding data encoded on the difference between the optical signals of the rails involves performing a subtraction, meaning that the signal (including noise) present at the first rail is subtracted from the signal (including noise) present at the second rail. If the noise present at the first rail has characteristics substantially similar to the noise present at the second rail (e.g., there is a relatively high correlation), the overall noise is reduced when the subtraction is performed.

In addition to improving the susceptibility to noise, the dual-rail architectures described herein reduce modulation-induced optical loss. Unlike in conventional optical digital communication systems, in which optical modulation is achieved by introducing optical attenuation, optical modulation according to the present architectures involves a rotation of the optical vector (phase and/or polarization). In other words, modulation involves manipulating the relative phase of the optical signals present at the two rails. This results in a substantial reduction of the optical loss.

According to another aspect of the present disclosure, the photonic architectures described herein involve multipliers implemented based on "modulatable detectors." Modulatable detectors are optical detectors having at least one characteristic that can be controlled by a user using one or more electric control signals. These detectors are designed so that application of a control signal (e.g., a voltage or a current) alters a characteristic of the detector, such as the detector's responsivity, gain, impedance, etc. The result is that the detector's photocurrent (the current that the modulatable detector produces in response to light) depends not only on the optical power incident on the detector, but also on the control signal applied to the detector. This may be achieved in any of numerous ways, as described in detail further below. In one example, a modulatable detector is designed to include a control capacitor. The control capacitor is designed so that a change in the voltage applied to it results in a change in the responsivity of the modulatable detector. The control capacitor may be implemented, among other possible configurations, using a pair of electrodes separated by a dielectric material or using a metal-oxide-semiconductor capacitor (MOS cap). In another example, a modulatable detector includes a photodetector and a gain stage coupled to the photodetector. The gain stage may be connected to the photodetector so that a change in the voltage applied to the gain stage produces a change in the photocurrent generated by the modulatable detector. Several examples of controllable gain stages are described in detail further below.

Photonic arrays that use modulatable detector-based multipliers are substantially more compact than other types of photonic arrays. This is because modulatable detectors are far more compact than optical devices traditionally used to perform multiplication in the optical domain, such as phase shifters (e.g., Mach-Zehnder interferometers), attenuators and amplifiers.

II. Dual-Rail Optical Multipliers

FIG. 1A is a block diagram illustrating an optical multiplier implemented based on a dual-rail architecture, in accordance with some embodiments. This optical multiplier includes a light source 10, a differential optical encoder 12, a differential optical multiplier 14, a differential receiver 16 and a controller 17. Controller 17 includes a pair of digital-to-analog converters (D/A) 19 and a numeric value unit 18.

Numeric value unit 18 produces a pair of scalar numeric values: x and m. Numeric value m is also referred to as "weight" or "weight parameter" and numeric value x is also referred to herein as "input data," "input value" or "input parameter". These numeric values may be produced based on data received by the controller, including data obtained from a memory internal to controller 17 and/or data provided to controller 17 from another computing system. These numeric values may be represented using any digital representation, including fixed-point or floating-point representations. The first D/A 19 converts numeric value x to an electric signal representative of x. In this example, the D/A produces a voltage $V_x$. The second D/A 19 converts numeric value m to an electric signal representative of m. In this example, the D/A produces a voltage $V_m$. In some embodiments, $V_x$ is proportional to x. In some embodiments, $V_m$ is proportional to m. The dual-rail optical multiplier of FIG. 1A is configured to multiply these numeric values to one another, thereby producing the result x×m.

Light source 10 may be implemented using a coherent source, e.g., a laser. Alternatively, light source 10 may be implemented using an incoherent source, e.g., a light-emitting diode, a source of amplified spontaneous emission, or a source of stimulated emission having a relatively large linewidth. As used herein, the terms "coherence" and "coherent" refers to temporal coherence. The optical power produced by light source 10 is identified as "$P_{in}$."

Differential optical encoder 12 receives a voltage $V_x$, and in response, produces a pair of optical signals. The labels "$P_t$" and "$P_b$" identify the optical powers of these optical signals, respectively. Differential optical encoder 12 receives voltage $V_x$, and encodes the optical signal received from light source 10 based on $V_x$. More specifically, differential optical encoder 12 produces a pair of optical signals in such a way that the difference between the powers of these optical signals ($P_t$-$P_b$) is proportional to both x and $P_{in}$ (in FIG. 1A, the symbol "∝" means "is proportional to"). It should be appreciated that this architecture is referred to as "dual-rail" in that x is encoded in the difference between two optical signals (the difference in the signal powers as in this example, or in other examples, the difference between the signal amplitudes). Differential optical encoder 12 may be implemented using any suitable optical modulator, including an optical interferometer (such as a tunable directional coupler or a Mach-Zehnder interferometer), a resonant modulator, a Franz-Keldysh modulator, etc. Examples of differential optical encoder 12 are described in detail further below.

As discussed above, $P_t$ identifies the power of the optical signal at the top rail and $P_b$ identifies the power of the optical signal at the bottom rail. In some embodiments, the rails are defined in terms of physical channels. In one example, the top rail is defined in a first optical waveguide and the bottom rail is defined in a second optical waveguide that is physical distinct from the first optical waveguide. In another example, the top rail is defined in a first free-space optical channel and the bottom rail is defined in a second free-space optical channel that is spatially separated from the first free-space optical channel. In other embodiments, however, the top and bottom rails may be defined by a common physical channel. That is, the optical signals generated by differential optical encoder 12 share the same optical waveguide or free-space channel. In these embodiments, the optical signal of each rail is distinguishable from the optical signal of the other rail by a certain optical characteristic, such as by the time bin, polarization or wavelength. In one example, the optical signal at the first rail is defined by a first polarization mode of an optical waveguide (e.g., the optical waveguide's $TE_{00}$-mode) and the optical signal at the second rail is defined by a second polarization mode of the same optical waveguide (e.g., the optical waveguide's $TE_{01}$-mode or $TM_{00}$-mode). In another example, the optical signal at the first rail is defined by a first wavelength and the optical signal at the second rail is defined by a second wavelength.

It should be appreciated that, while FIG. 1A depicts an architecture in which the signals representing the numeric values to be multiplied are voltages ($V_x$ and $V_m$), in other embodiments, the numeric values may be represented using other types of electrical signals, such as electric currents or electric charges.

Differential optical multiplier 14 receives the optical signals produced by differential optical encoder 12 and produces a pair of output optical signals based on the voltage $V_m$. The powers of the output optical signals are labeled "$P_t'$" and "$P_b'$," respectively. The optical signals produced by differential optical multiplier 14 are such that the difference between their powers ($P_t'$-$P_b'$) is proportional to both m and the difference $P_t$-$P_b$. The result is that the quantity $P_t'$-$P_b'$ is proportional to each of m, x and $P_{in}$. Being proportional to both x and m, $P_t'$-$P_b'$, in essence, is encoded with the product of numeric value x times numeric value m.

Differential optical multiplier 14 may be implemented using any suitable photonic device, including any suitable optical interferometer such as an adjustable directional coupler or a Mach-Zehnder interferometer, as described in detail further below.

Differential receiver 16 detects optical signals $P_t'$ and $P_b'$ and, in response, produces a numeric value y that is equal to the product x×m. To perform this operation, receiver 16 may include for example a pair of balanced photodetectors, a differential trans-impedance amplifier configured to generate an output voltage proportional to $P_t'$-$P_b'$, and an analog-to-digital converter configured to convert the output voltage to a numeric value y.

Figure 1B:
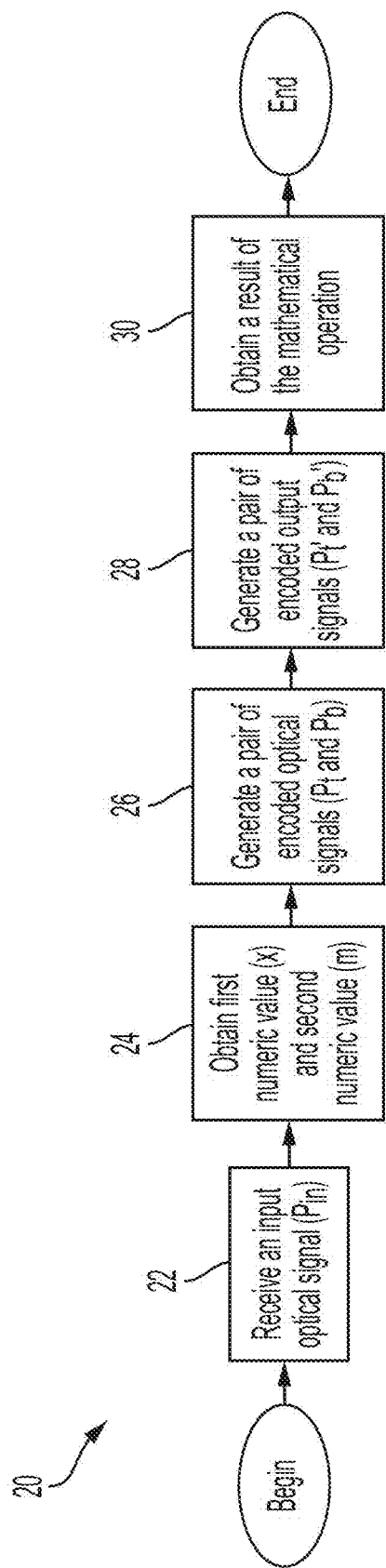
FIG. 1B is a flow chart illustrating a method for performing multiplications using a dual-rail optical multiplier, in accordance with some embodiments.

FIG. 1B is a flow chart illustrating a method for performing mathematical operations (e.g., multiplications), in accordance with some embodiments. Method 20 can be performed using any suitable optical device, including the dual-rail architecture depicted in FIG. 1A. Method 20 begins at step 22, in which an optical device receives an input optical signal. Referring for example to the architecture of FIG. 1A, at step 22, differential optical encoder 12 receives the optical signal $P_{in}$.

At step 24, the photonic device obtains a first numeric value and a second numeric value. These are the numeric values to be multiplied. The numeric values need not be obtained at the same time. Referring for example to the architecture of FIG. 1A, at step 24, numeric value unit 18 generates numeric values x and m based on data stored in a memory of controller 17 and/or on data obtained from another computing system. These numeric values may represent any type of information, such as text, audio, video, etc. The numeric values may be real or complex, positive or negative.

At step 26, the photonic device generates a pair of encoded optical signals by modifying the input optical signal using the first numeric value. In some embodiments, the pair of encoded optical signals are encoded so that the difference between the optical signals (e.g., the difference between the powers of the optical signals or the difference between the amplitudes of the optical signals) is proportional to the first numeric value. Referring for example to the architecture of FIG. 1A, at step 26, differential optical encoder 12 generates optical signals with powers $P_t$ and $P_b$, respectively, based on numeric value x.

At step 28, the photonic device generates a pair of encoded output signals using the second numeric value and the pair of encoded optical signals generated at step 26. In some embodiments, the difference (in terms of power or amplitude) between the first and second encoded output signals is proportional to the difference (again, in terms of power or amplitude) between the first and second encoded input signals. In some such embodiments, the difference between the first and second encoded output signals is proportional to both the second numeric value and the first numeric value. Referring for example to the architecture of FIG. 1A, at step 28, differential optical multiplier 14 generates optical signals with powers $P_t'$ and $P_b'$, respectively, based on numeric value m and $P_t$-$P_b$.

At step 30, the photonic device obtains a result of a mathematical operation (e.g., the product of the first numeric value times the second numeric value) using the pair of encoded output signals. In some embodiments, step 30 involves i) detecting the pair of encoded output signals with a pair of balanced photodetectors to obtain a pair of photocurrents, ii) receiving the photocurrents with a differential trans-impedance amplifier to obtain an output voltage, and iii) converting the output voltage with an analog-to-digital converter to obtain a numeric value representing the result (e.g., the product). Referring for example to the architecture of FIG. 1A, at step 30, differential receiver 16 generates numeric value y, which equals the product of x times m.

As discussed above, differential optical multiplier 14 may be implemented using any suitable optical device. One such device is the tunable directional coupler depicted in FIG. 2A, in accordance with some embodiments. The directional coupler includes a pair of input optical waveguides, where one input optical waveguide receives optical signal $P_t$ and the other input optical waveguide receives optical signal $P_b$. The directional coupler further includes a pair of output optical waveguides, where one output optical waveguide outputs optical signal $P_t'$ and the other output optical waveguide outputs optical signal $P_b'$. The region between the pair of input of optical waveguides and the pair of output optical waveguides is labeled "A." This is the region in which the input optical signals are combined to produce the output optical signals.

Figure 2A:
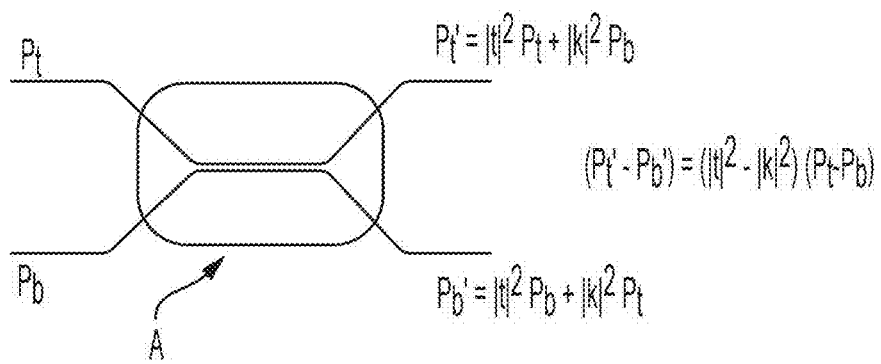
FIG. 2A is a diagram illustrating a tunable directional coupler, in accordance with some embodiments.
Figure 2B:
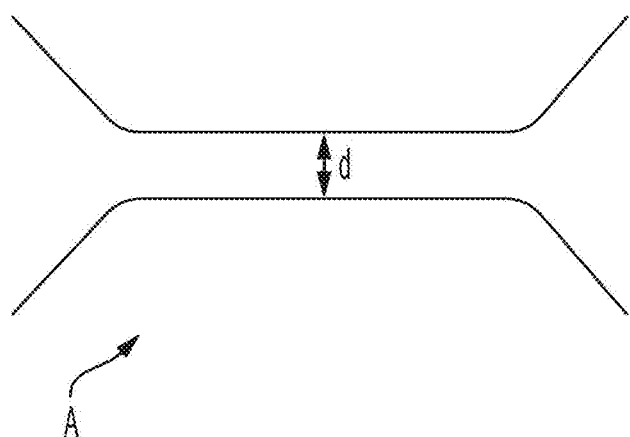
FIG. 2B is a diagram illustrating a portion of the tunable directional coupler of FIG. 2A in additional detail, in accordance with some embodiments.

Region A is depicted in additional detail in FIG. 2B. In this region, the waveguides are sufficiently close to one another to produce evanescent coupling. The coupling coefficient with which the waveguides couple to one another depends, among other parameters, on the spatial distance d between the waveguides. The closer the waveguides, the larger the coupling coefficient. In some embodiments, the directional coupler may be designed so that d is adjustable based on an input signal. This may be achieved using nano-opto-electro-mechanical system (NOEMS) techniques. For example, the waveguides may be suspended in air in the region A, and the position of the suspended waveguides in the lateral direction (the direction in the plane of the waveguides perpendicular to the propagation axis) can be controlled with an external voltage. Referring again to FIG. 1A, voltage $V_m$ may control the distance between the waveguides in region A.

Referring back to FIG. 2A, the letter "t" identifies the transmission coefficient and the letter "k" identifies the cross-coupling coefficient (from one waveguide to the other). The coefficients t and k are expressed in terms of amplitude transmission, and must obey the relationship $|t|^2+|k|^2 \leq 1$ in order to provide for energy conservation. The equality is achieved when the multiplication device is lossless. Coefficients t and k depend on the distance between the waveguides d. Accordingly, voltage $V_m$ controls the coefficients t and k.

The power $P_t'$ is equal to the fraction of $P_t$ that travels on the top waveguide (equal to $|t|^2 P_t$), plus the fraction of $P_b$ that couples to the top waveguide (equal to $|k|^2 P_b$), plus a cross term resulting from the interference of the signal at the top waveguide with the signal at the bottom waveguide. It should be appreciated that the interference term is non-zero if the input optical fields are coherent to one another (in other words, their phases are correlated). However, if the input optical signals are not mutually coherent, the interference term goes to zero. This is because mutually incoherent optical signals, having uncorrelated phases, do not interfere with each other. Therefore, assuming that the signals are not mutually coherent, the output power at the top waveguide is simply given by $|t|^2 P_t + |k|^2 P_b$. Similarly, the power $P_b'$ is equal to the fraction of $P_b$ that travels on the bottom waveguide (equal to $|t|^2 P_b$), plus the fraction of $P_t$ that couples to the bottom waveguide (equal to $|k|^2 P_t$), plus a cross term resulting from the interference of the signal at the bottom waveguide with the signal at the top waveguide. Again, the interference term is non-zero if the input optical fields are coherent to one another. However, if the input optical signals are not mutually coherent, the interference term goes to zero. Therefore, assuming that the signals are not mutually coherent, the output power at the bottom waveguide is simply given by $|t|^2 P_b + |k|^2 P_t$.

As discussed above, in dual-rail architectures of the types described herein, numeric values are encoded in the difference (power difference or amplitude difference) between optical signals. When the input signals are mutually incoherent, the difference $P_t'-P_b'$ is equal to $(|t|^2-|k|^2)(P_t-P_b)$. It should be noted that, when the input signals are mutually incoherent, the directional coupler of FIG. 2A operates as an optical multiplier in that it outputs the product of the quantity $|t|^2-|k|^2$ times the quantity $P_t-P_b$. However, the directional coupler does not output the product if the input signals are mutually coherent. Therefore, it is critical that the input signals be mutually incoherent.

Mutual incoherence may be achieved in a variety of ways. First, mutual incoherence may be achieved by using an incoherent light source, such as an LED, a source of amplified spontaneous emission or a source of stimulated emission with a relatively large linewidth. Second, mutual incoherence may be achieved by allowing one waveguide (e.g., the top waveguide) to travel a distance greater that the distance traveled by the other waveguide (e.g., the bottom waveguide), where the difference between the distances is greater that the coherence length of the light source (as discussed in detail below in connection with FIG. 4C).

Additionally, or alternatively, differential optical encoder 12 may implemented in some embodiments using the directional coupler of FIG. 2A. In such embodiments, the top input waveguide receives $P_{in}$, and the bottom input waveguides receives no optical signal (though the opposite is also possible). The output waveguides output, respectively, $P_t=|t|^2 P_{in}$ and $P_b=|k|^2 P_{in}$, where t and k are controlled using voltage $V_x$ (that is, by controlling distance d).

Figure 3:
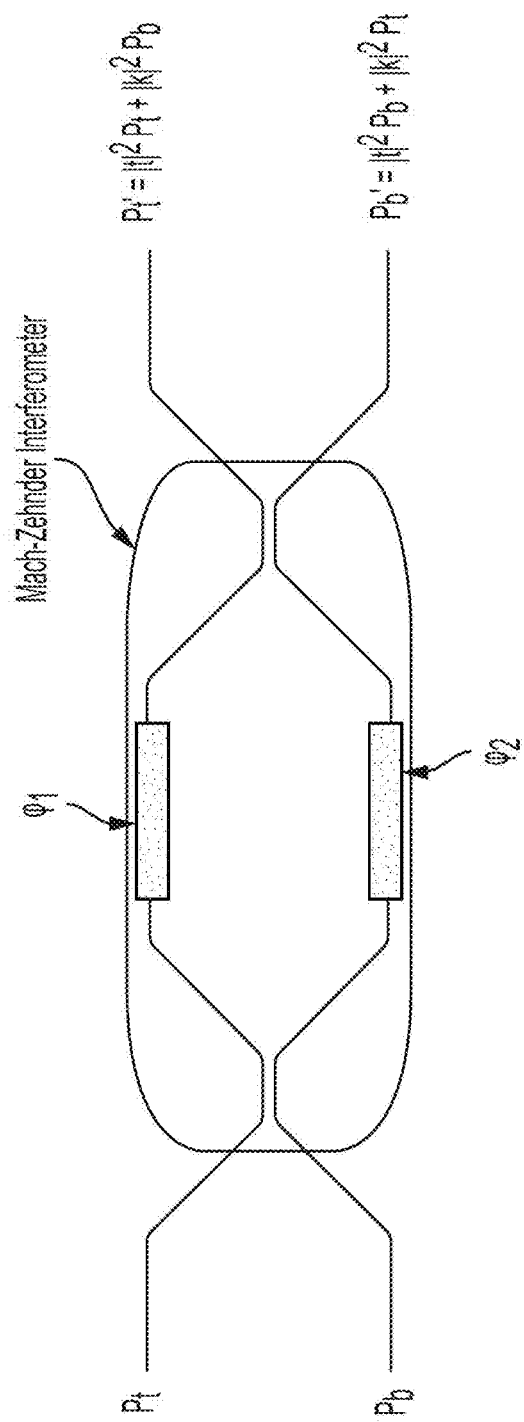
FIG. 3 is a diagram illustrating a Mach-Zehnder interferometer, in accordance with some embodiments.

Another implementation of differential optical multiplier 14 is depicted in FIG. 3, in accordance with some embodiments. This embodiments includes a Mach-Zehnder interferometer. In this example, the coefficients t and k are controlled based on the phases $\varphi_1$ and $\varphi_2$ introduced by the phase shifters (which in turn are controlled based on voltage $V_m$). The differential output optical power is in general given by: $\Delta P \propto \sin(\theta_v) \cos(\theta_w) + 2 \cos\varphi[\cos(\theta_w/2) \sin(\theta_w/2) (\cos^2(\theta_v/2) - \sin^2(\theta_v/2))]$, where $\varphi$ is the difference between $\varphi_1$ and $\varphi_2$. However, when an incoherent light source is used or when the light source has a coherence length shorter than the optical delay line, the phase term $\cos(\varphi)$ time-averages to zero. This leaves $\Delta P \propto \sin(\theta_v) \cos(\theta_w)$. Therefore, the difference between the powers of the output optical signals is proportional to a product.

Both the implementations of FIG. 2A and FIG. 3 produce differential optical multiplication assuming that the input optical signals are mutually incoherent. This is because, when the signals are mutually incoherent, the interference term is zero. It should be noted that there are other ways to cause the interference term to be zero. For example, the interference term can be set to zero by defining the input optical signals on mutually orthogonal polarizations. Additionally, or alternatively, the interference term can be set to zero by defining the input optical signals on non-overlapping time bins. Additionally, or alternatively, the interference term can be set to zero by defining the input optical signals on different carrier frequencies.

Figure 4A:
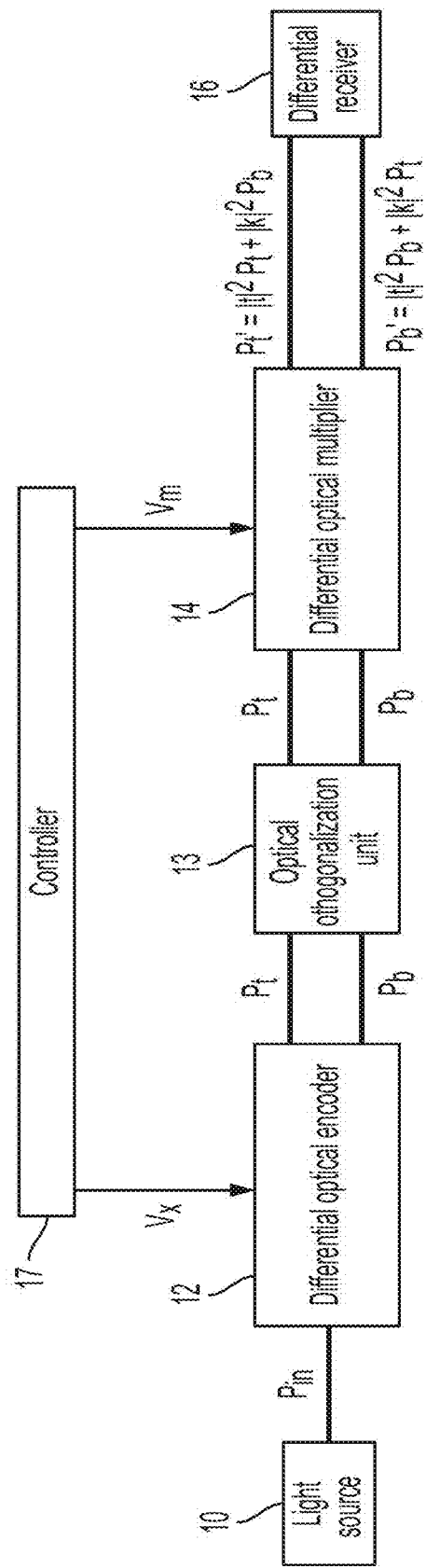
FIG. 4A-4D are block diagrams illustrating additional dual-rail optical multiplier, in accordance with some embodiments.
Figure 4B:
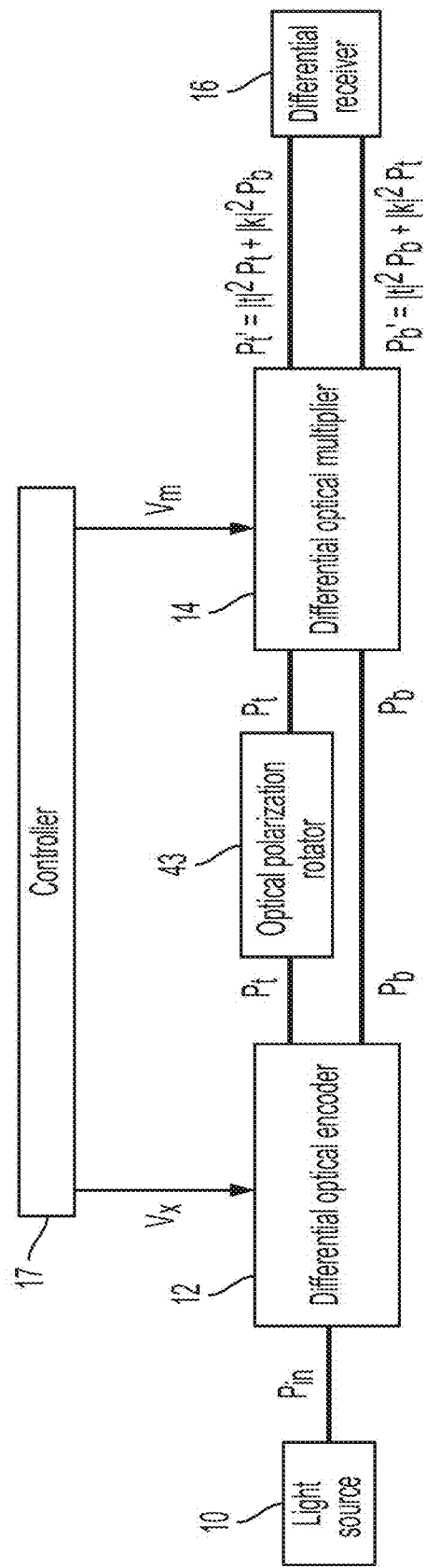

The architecture of FIG. 4A is designed to cause the signals $P_t$ and $P_b$ to be combined to one another so that the interference term is zero. In addition to the architecture of FIG. 1A, this architecture further includes optical orthogonalization unit 13. Optical orthogonalization unit 13 is configured to render signals $P_t$ and $P_b$ orthogonal to one another. Here, two signals are orthogonal if, when the signals are combined, the resulting interference term is substantially zero. In the example of FIG. 4B, optical orthogonalization unit 13 includes optical polarization rotator 43. In this example, optical signals $P_t$ and $P_b$ are orthogonal in that they are defined on orthogonal polarizations.

Figure 4C:
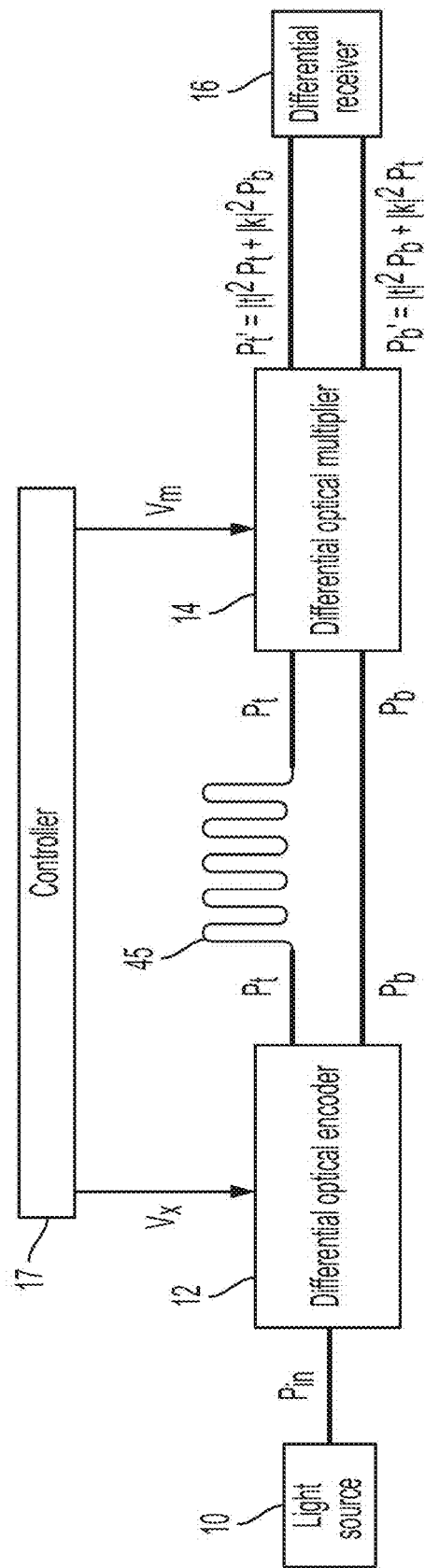

In the example of FIG. 4C, optical orthogonalization unit 13 includes an optical delay line 45 (e.g., a serpentine-shaped waveguide). Here, the optical delay line is introduced to delay signal $P_t$ relative to signal $P_b$ by a sufficient amount to render the phases of the signals mutually uncorrelated. To achieve this result, the additional path introduced by optical delay line 45 must be greater than the coherence length of the light source. In some embodiments, the optical delay line may be sized to provide a constant quadrature phase difference.

Alternatively, or additionally, the optical delay line is introduced to delay signal $P_t$ relative to signal $P_b$ by a sufficient amount so that the signals do not overlap in time (are defined in different time bins). To achieve this result, the additional delay introduced by optical delay line 45 must be greater than the duration of the signal pulses.

In another example, optical orthogonalization unit 13 includes a device for defining the first rail on one carrier frequency and the second rail on another carrier frequency. This may be achieved, in some embodiments, using an optical non-linear medium. Alternatively, distinct carrier frequencies may be obtained by using two distinct lasers that emit at different wavelengths. The first laser emits at a first wavelength and supports the first rail, the second laser emits at a second wavelength and supports the second rail.

Figure 4D:
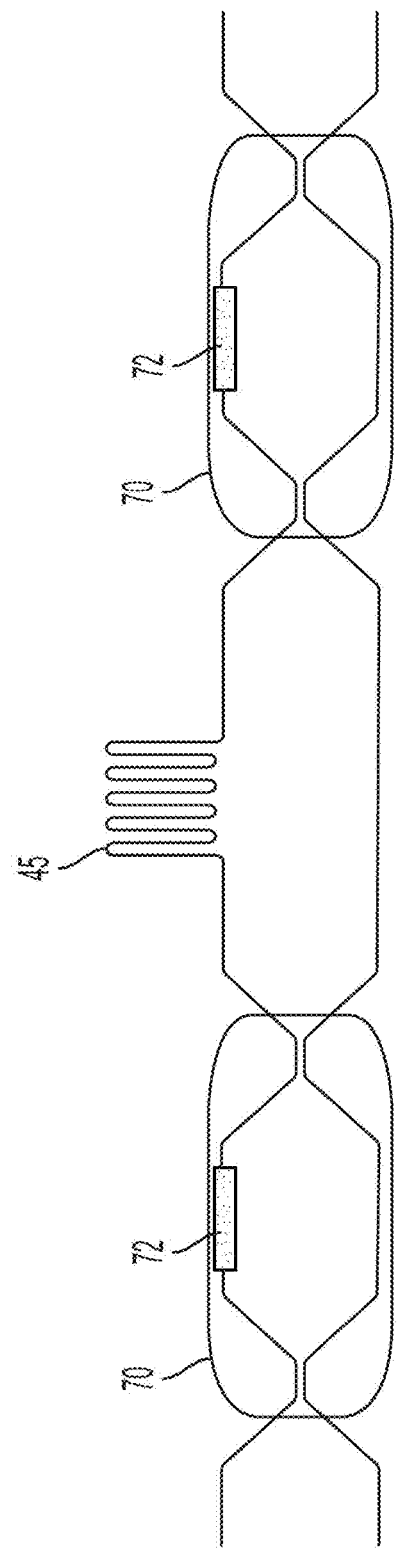

FIG. 4D depicts an implementation of the architecture of FIG. 4C, in accordance with some embodiments. Here, both differential optical encoder 12 and differential optical multiplier 14 are implemented using Mach-Zehnder interferometers 70. Each Mach-Zehnder interferometer includes a phase shifter 72. The phase shifter of differential optical encoder 12 is controlled using voltage $V_x$ and the phase shifter of differential optical multiplier 14 is controlled using voltage $V_m$.

III. Photonic Processors Using Dual-Rail Multipliers

Figure 5:
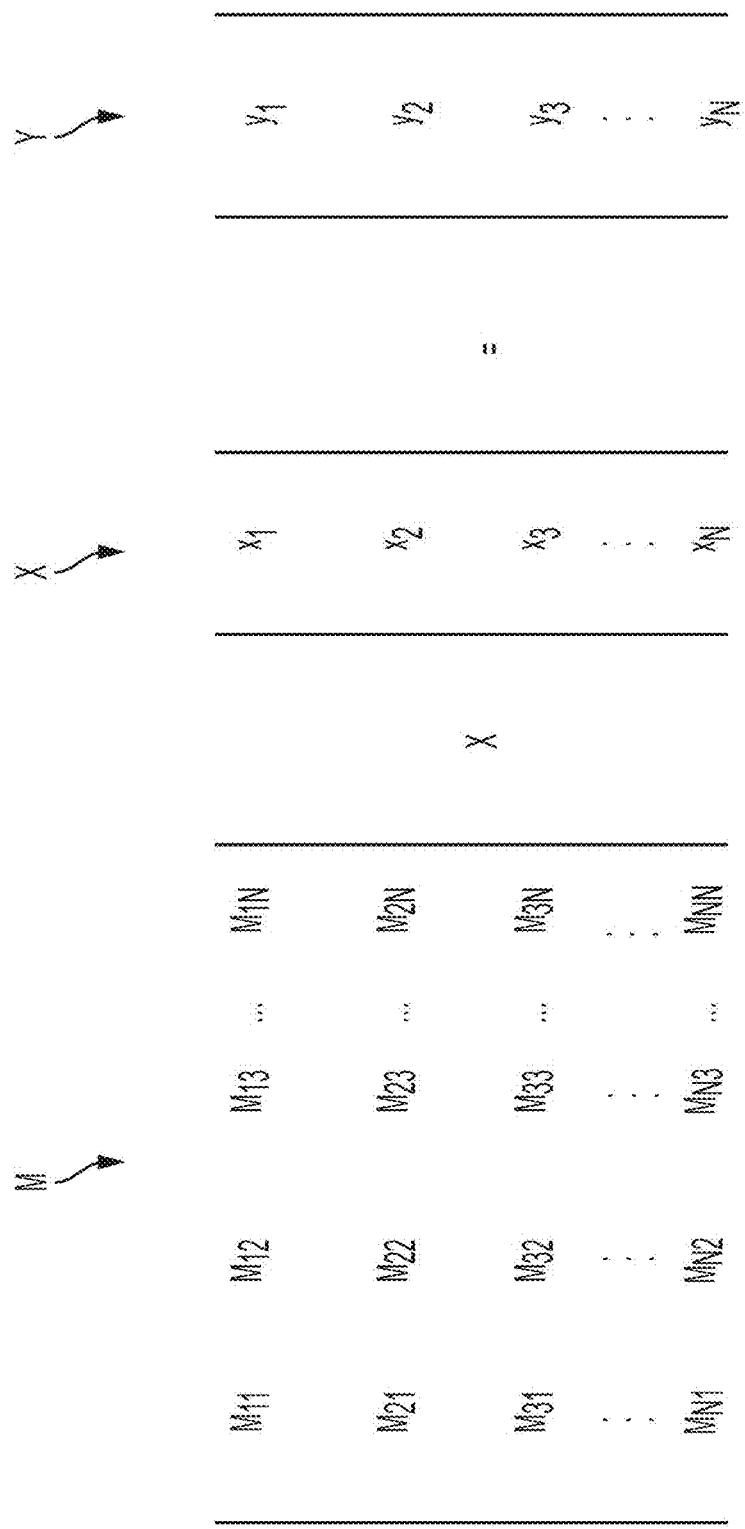
FIG. 5 is a representation of a matrix-vector multiplication, in accordance with some embodiments.

The dual-rail multiplier of FIG. 1A performs scalar multiplications (x times m). However, many machine learning algorithms rely on matrix-matrix (e.g., matrix-vector) multiplication. Some embodiments relate to photonic processors configured to perform matrix-matrix (e.g., matrix-vector) multiplications using the dual-rail optical multipliers described above. These photonic processors are configured to multiply a matrix M by a vector X to produce a vector Y. Matrix M is also referred to herein as "weight matrix," vector X is also referred to herein as "input vector" and vector Y is also referred to herein as "output vector." FIG. 5 illustrates an example of such a multiplication. In this example, M is an N×N matrix, though embodiments of the present application are not limited to square matrices or to any specific dimension.

Figure 6:
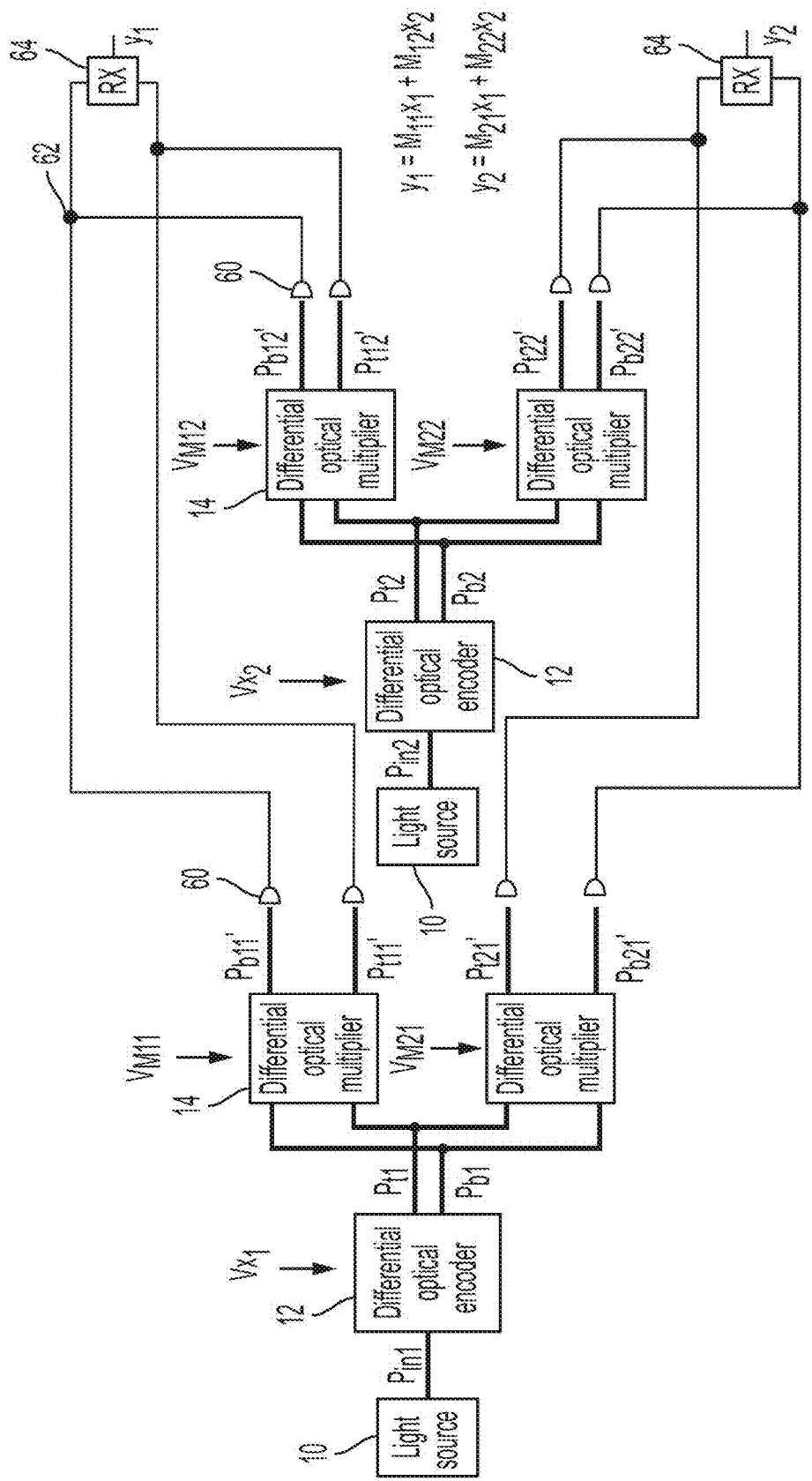
FIG. 6 is a block diagram of a photonic processor arranged according to a 2×2 configuration, in accordance with some embodiments.

An example of a dual-rail photonic processor is depicted in FIG. 6, in accordance with some embodiments. In this implementation, the photonic processor is configured to multiply a 2×2 matrix (M) by a 2×1 input vector (X) to obtain a 2×1 output vector (Y). A first light source 10 provides an input optical signal having power $P_{in1}$ and a second light source 10 provides an input optical signal having power $P_{in2}$ (although the same light source may be used in some embodiments). Pine may be equal to or different from $P_{in1}$. Each light source is followed by a differential optical encoder 12, which operates in the manner described in connection with the differential optical encoder of FIG. 1A. The first differential optical encoder receives voltage $V_{x1}$, which is representative of numeric value $x_1$. This differential optical encoder encodes the received input optical signal using voltage $V_{x1}$ to generate a pair of encoded optical signals having powers $P_{t1}$ and $P_{b1}$. These optical signals are provided as inputs to two differential optical multipliers 14. The top differential optical multiplier receives voltage $V_{M11}$, which represents numeric value $M_{11}$. The bottom differential optical multiplier receives voltage $V_{M21}$, which represents numeric value $M_{21}$. Both differential optical multipliers operate in the manner described in connection with the differential optical multiplier of FIG. 1A. The top differential optical multiplier outputs optical signals $Pb_{11}'$ and $Pt_{11}'$, and the bottom differential optical multiplier outputs optical signals $Pb_{21}'$ and $Pt_{21}'$. The difference between $Pb_{11}'$ and $Pt_{11}'$ is proportional to both $M_{11}$ and the difference between $Pb_1$ and $Pt_1$, and accordingly, is proportional to the product $M_{11}x_1$. Similarly, the difference between $Pb_{21}'$ and $Pt_{21}'$ is proportional to both $M_{21}$ and the difference between $Pb_1$ and $Pt_1$, and accordingly, is proportional to the product $M_{21}x_1$. The four output optical signals are detected using respective photodetectors 60.

The second differential optical encoder receives voltage $V_{x2}$, which is representative of numeric value $x_2$. This differential optical encoder encodes the received input optical signal using voltage $V_{x2}$ to generate a pair of encoded optical signals having powers $P_{t2}$ and $P_{b2}$. These optical signals are provided as inputs to two differential optical multipliers 14. The top differential optical multiplier receives voltage $V_{M12}$, which represents numeric value $M_{12}$. The bottom differential optical multiplier receives voltage $V_{M22}$, which represents numeric value $M_{22}$. Both differential optical multipliers operate in the manner described in connection with the differential optical multiplier of FIG. 1A. The top differential optical multiplier outputs optical signals $Pb_{12}'$ and $Pt_{12}'$, and the bottom differential optical multiplier outputs optical signals $Pb_{22}'$ and $Pt_{22}'$. The difference between $Pb_{12}'$ and $Pt_{12}'$ is proportional to both Mu and the difference between $Pb_2$ and $Pt_2$, and accordingly, is proportional to the product $M_{12}x_2$. Similarly, the difference between $Pb_{22}'$ and $Pt_{22}'$ is proportional to both $M_{22}$ and the difference between $Pb_2$ and $Pt_2$, and accordingly, is proportional to the product $M_{22}x_2$. The four output optical signals are detected using respective photodetectors 60.

As shown in FIG. 6, the outputs of the photodetectors are combined (see, e.g., node 62), thereby allowing the photocurrents to be added to one another. Receivers 64 receive the photocurrents produced by detectors 60. Receivers 64 include a differential trans-impedance amplifier (or other circuits for subtracting the first input current from the second input current) and an analog-to-digital converter. The top receiver 64 outputs numeric value $y_1 = M_{11}x_1 + M_{12}x_2$. The bottom receiver 64 outputs numeric value $y_2 = M_{21}x_1 + M_{22}x_2$.

Figure 7A:
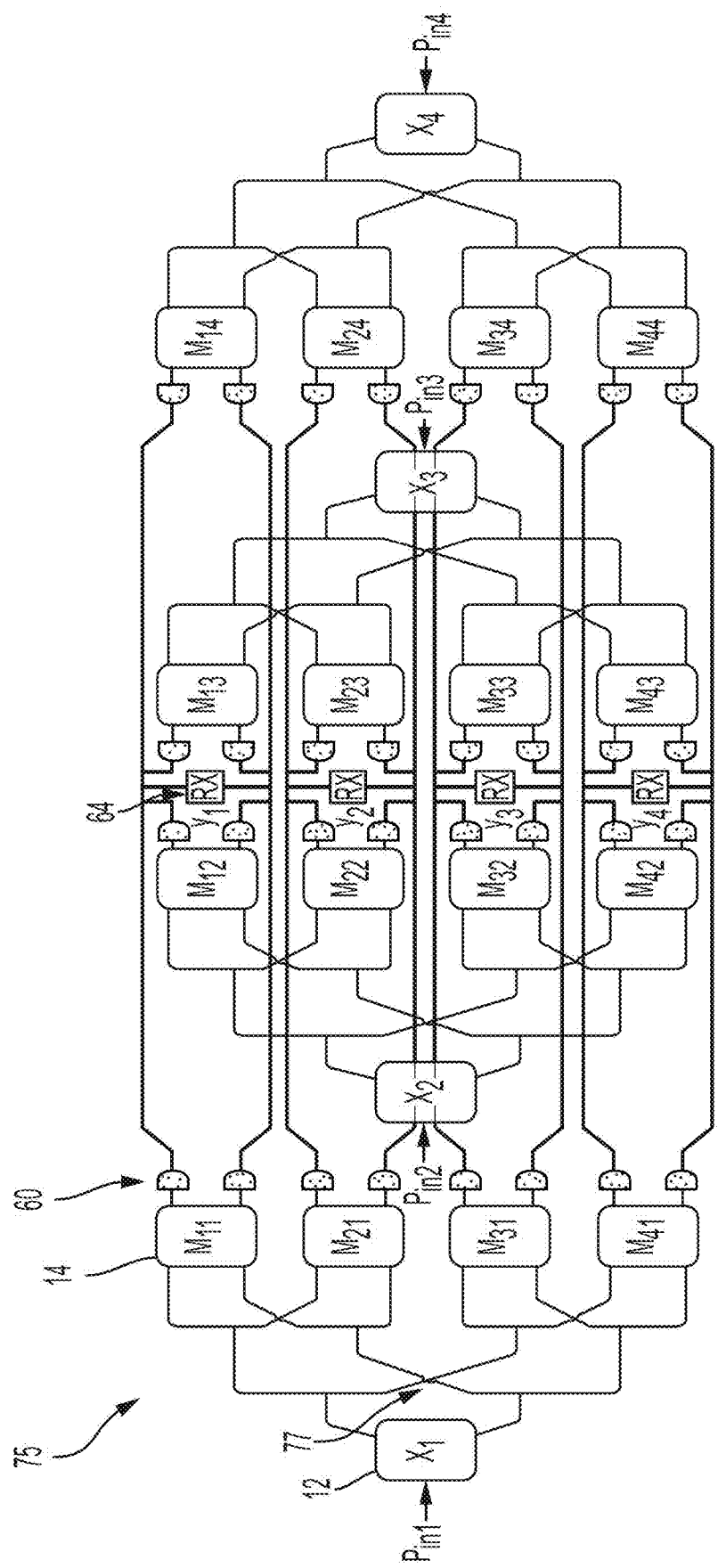
FIG. 7A is a block diagram of a photonic processor arranged according to a 4×4 configuration, in accordance with some embodiments.

An example of a 4×4 dual-rail photonic processor is illustrated in FIG. 7A. This processor includes four light sources 10 (not shown), four differential encoders 12 (which encode numeric values $x_1$, $x_2$, $x_3$ and $x_4$ into respective pairs of dual-rail optical signals), four optical splitter trees 75 (shown in additional detail in FIG. 7B), sixteen differential optical multipliers 14 (which multiply the respective inputs by $M_{11}$, $M_{21}$, $M_{31}$, $M_{41}$, $M_{12}$, $M_{22}$, $M_{32}$, $M_{42}$, $M_{13}$, $M_{23}$, $M_{33}$, $M_{43}$, $M_{14}$, $M_{24}$, $M_{34}$ and $M_{44}$), thirty-two detectors 60 and four receivers 64.

Figure 7B:
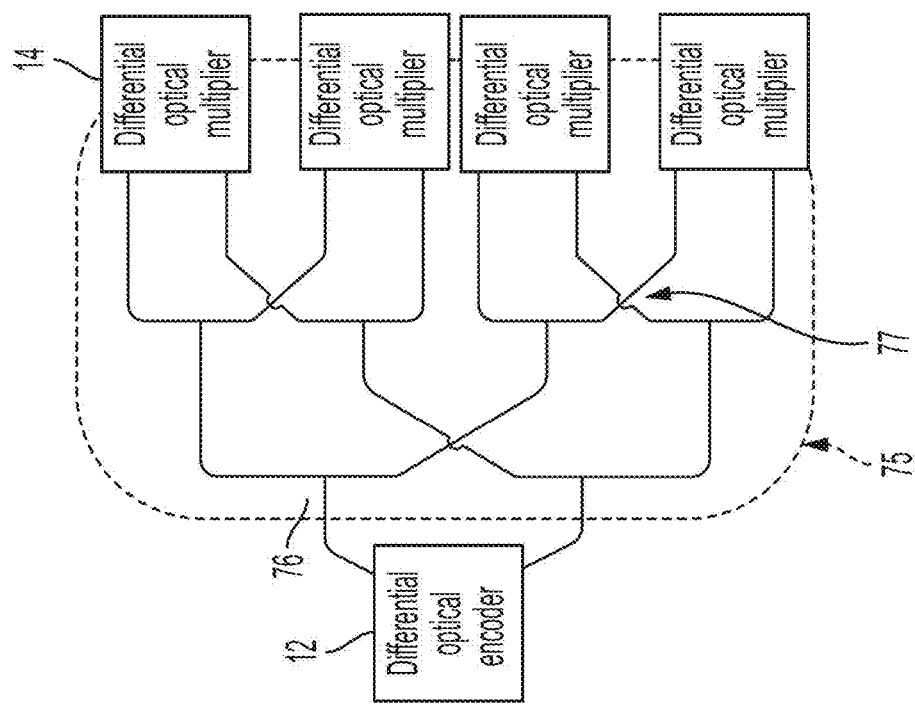
FIG. 7B is a diagram illustrating an optical splitter tree, in accordance with some embodiments.

FIG. 7B illustrates a portion of the photonic processor of FIG. 7A in additional detail. More specifically, FIG. 7B illustrates an optical splitter tree 75. Optical splitter tree 75 delivers the optical signals produced by a differential optical encoder 12 to multiple differential optical multipliers 14. In this implementation, the optical splitter tree includes multiple 3 db optical splitters 76 and multiple optical waveguide crossings 77. Each crossing may be implemented using two levels of waveguides. For example, one waveguide level (e.g., the bottom level) may be made of silicon and another waveguide level (e.g., the top level) may be made of silicon nitride.

Figure 8:
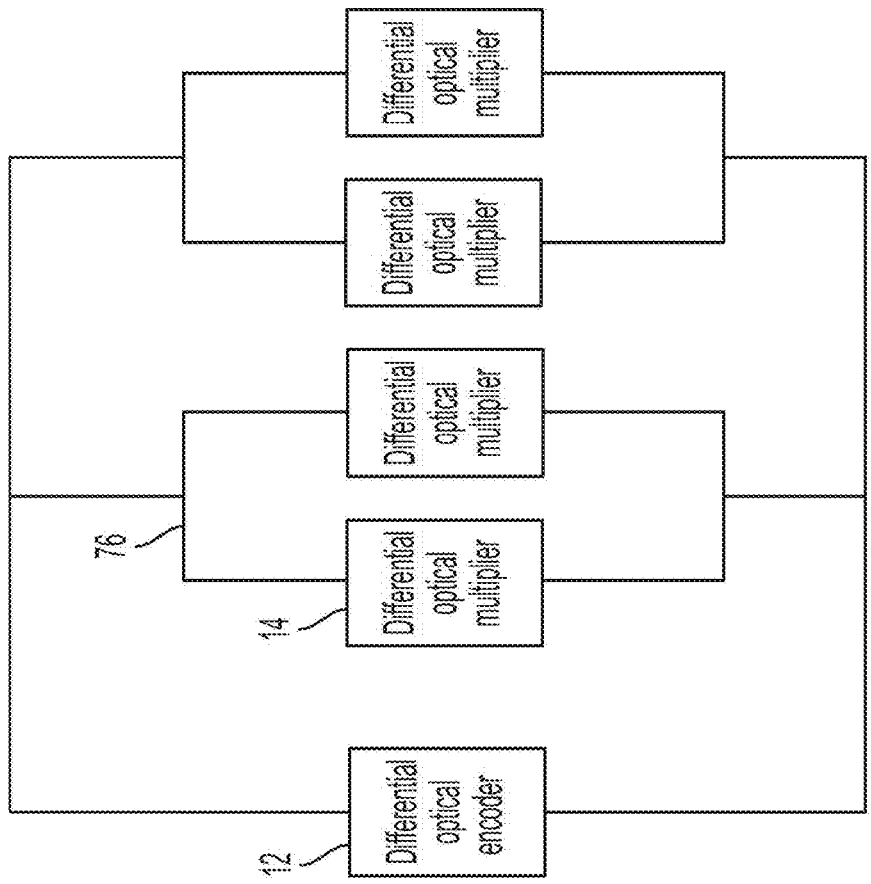
FIG. 8 is a diagram illustrating another optical splitter tree, in accordance with some embodiments.

FIG. 8 illustrates an alternative optical splitter tree that does not include optical waveguide crossings. The inventors have recognized that passing light through a waveguide crossing leads to optical loss, thereby negatively affecting the overall performance of the photonic processor. The tree of FIG. 8 improves the performance of the photonic processor because waveguide crossings are omitted (another example of such an optical splitter tree is described below in connection with FIG. 12C).

IV. Optical Multipliers and Processors Based on Modulatable Detectors

The inventors have appreciated that some optical multipliers occupy substantial chip real estate due to the presence of lengthy optical interferometers. This limits the number of multipliers that can be integrated on a single chip, thus limiting the computational capabilities of photonic processors that employ these multipliers. Some embodiments relate to compact optical multipliers that are based on modulatable detectors. Modulatable detectors are optical detectors having at least one characteristic that can be controlled by a user using an electric control signal. These detectors are designed so that varying the magnitude of a control signal (e.g., a voltage or a current) alters a characteristic of the detector, such as the detector's responsivity, gain, impedance, conductance, etc. The result is that the detector's photocurrent depends not only on the optical power that the detector receives, but also on the control signal applied to the detector. Optical multipliers based on modulatable detectors are designed so that one of the factors to be multiplied modulates the modulatable characteristic. For example, in some of the embodiments in which the modulatable characteristic is the detector's responsivity, the responsivity may be controlled based on a weight parameter m.

Figure 9B:
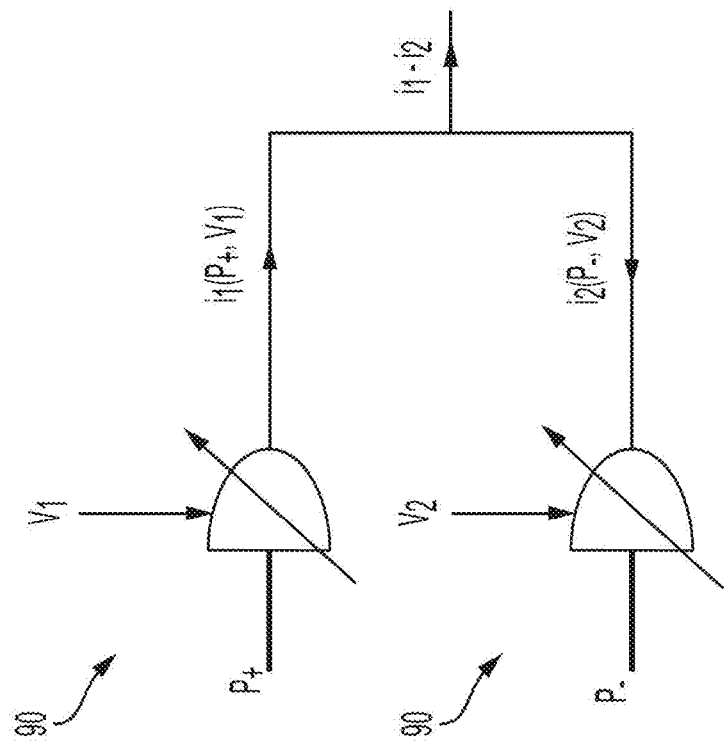
FIG. 9B is a block diagram illustrating a pair of modulatable detectors arranged differentially, in accordance with some embodiments.
Figure 9A:
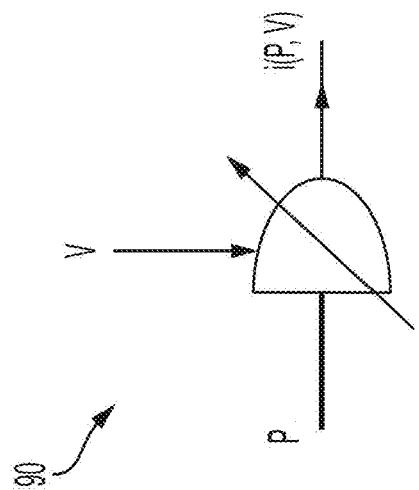
FIG. 9A is a block diagram illustrating a modulatable detector, in accordance with some embodiments.

FIG. 9A is a block diagram illustrating a modulatable detector, in accordance with some embodiments. Modulatable detector 90 receives as input an optical signal having power P, and in response, produces a photocurrent i (the dark current of the modulatable detector will be neglected from this discussion). The photocurrent i is related to the input optical power by the following expression: i=P/R, where R is the responsivity of the modulatable detector. In addition to being dependent upon power P, the photocurrent is also dependent upon control voltage V (or, in other embodiments, another type of electric signal such a control current). This detector is preceded by the term "modulatable" to indicate that the photocurrent can be modulated through the application of a control electric signal. Example implementations of modulatable detector 90 are described in detail further below.

FIG. 9B is a block diagram illustrating a pair of modulatable detectors arranged according to a dual-rail architecture, in accordance with some embodiments. The top modulatable detector receives optical power $P_+$ and control voltage $V_1$. Photocurrent $i_1$ depends upon optical power $P_+$ and control voltage $V_1$. Similarly, the bottom modulatable detector receives optical power $P_-$ and control voltage $V_2$. Photocurrent $i_2$ depends upon optical power $P_-$ and control voltage $V_2$.

Figure 9C:
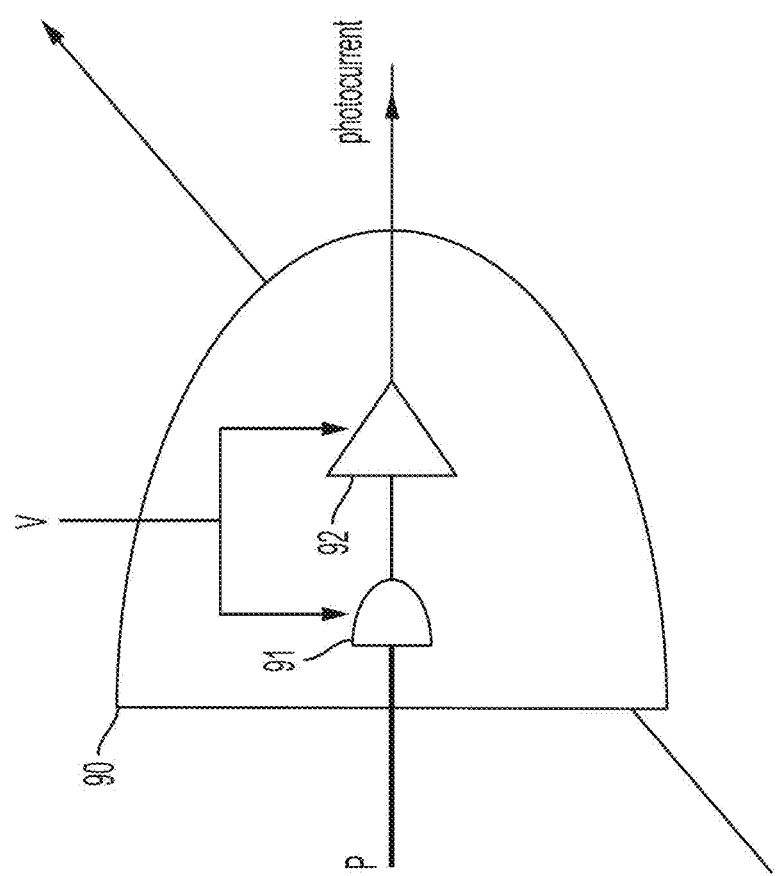
FIG. 9C-9D are block diagrams illustrating the interior of modulatable detectors, in accordance with some embodiments.
Figure 9D:
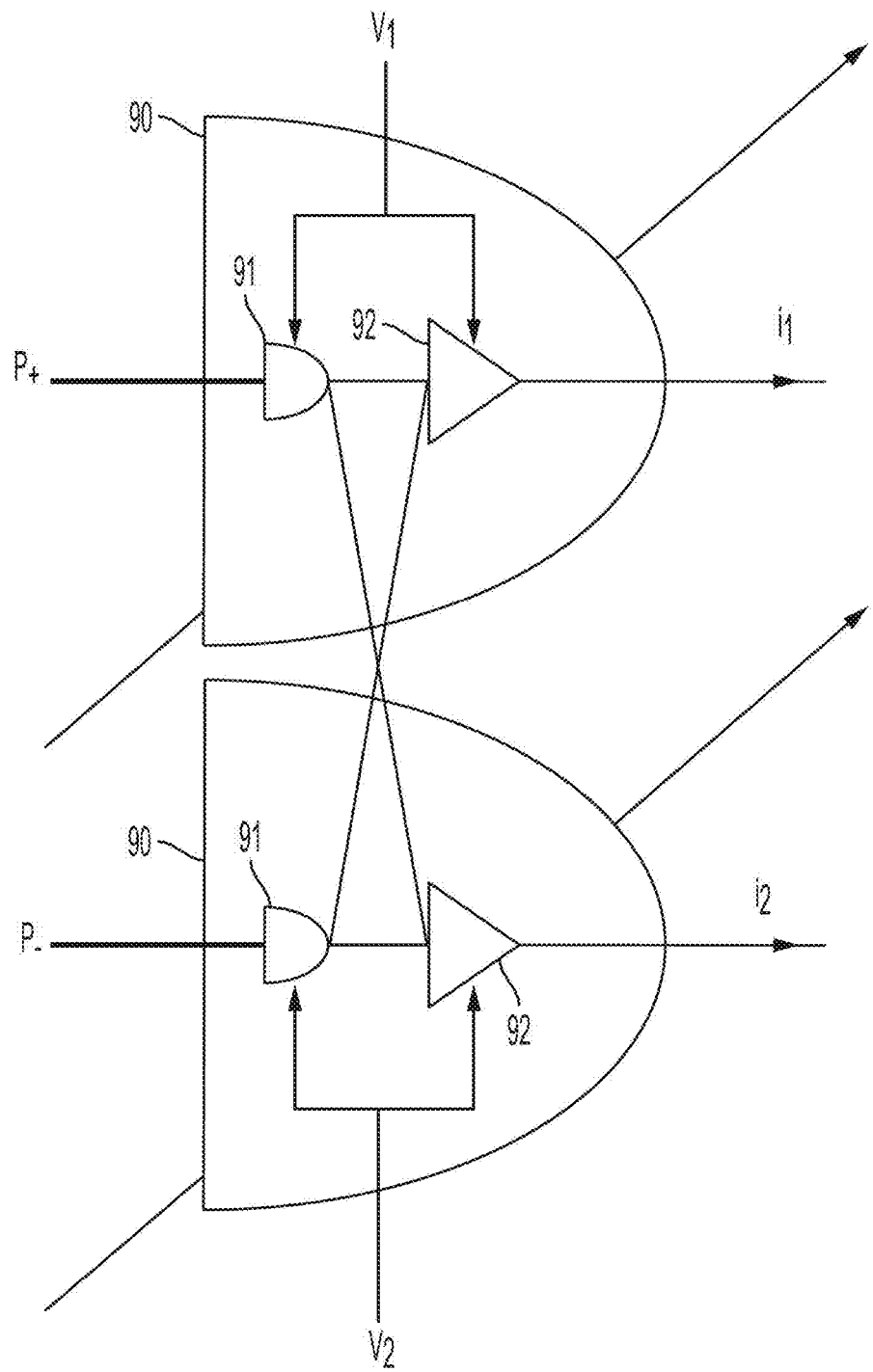

FIG. 9C is a block diagram illustrating the interior of a modulatable detector, in accordance with some embodiments. Modulatable detector 90 includes a photodetector 91 and a gain stage 92. Photodetector 91 may be implemented using a photoconductor, a photodiode, an avalanche photodiode, a phototransistor, a photomultiplier (e.g., a tube), a superconducting detector, a graphene-based detector, or any other suitable type of photo-sensitive device. Gain stage 92 can include, for example, a current amplifier for amplifying the current generated by photodetector 91. In some embodiments, modulating a characteristic of modulatable detector 90 may involve modulating, using voltage V (or using a control current), the responsivity of photodetector 91 and/or the gain (e.g., current gain) or impedance of gain stage 92. FIG. 9D is similar to the diagram of FIG. 9C, but illustrates a pair of modulatable detectors arranged in a dual-rail configuration. As shown, each photodetector 91 is coupled to both gain stages 92.

Figure 10A:
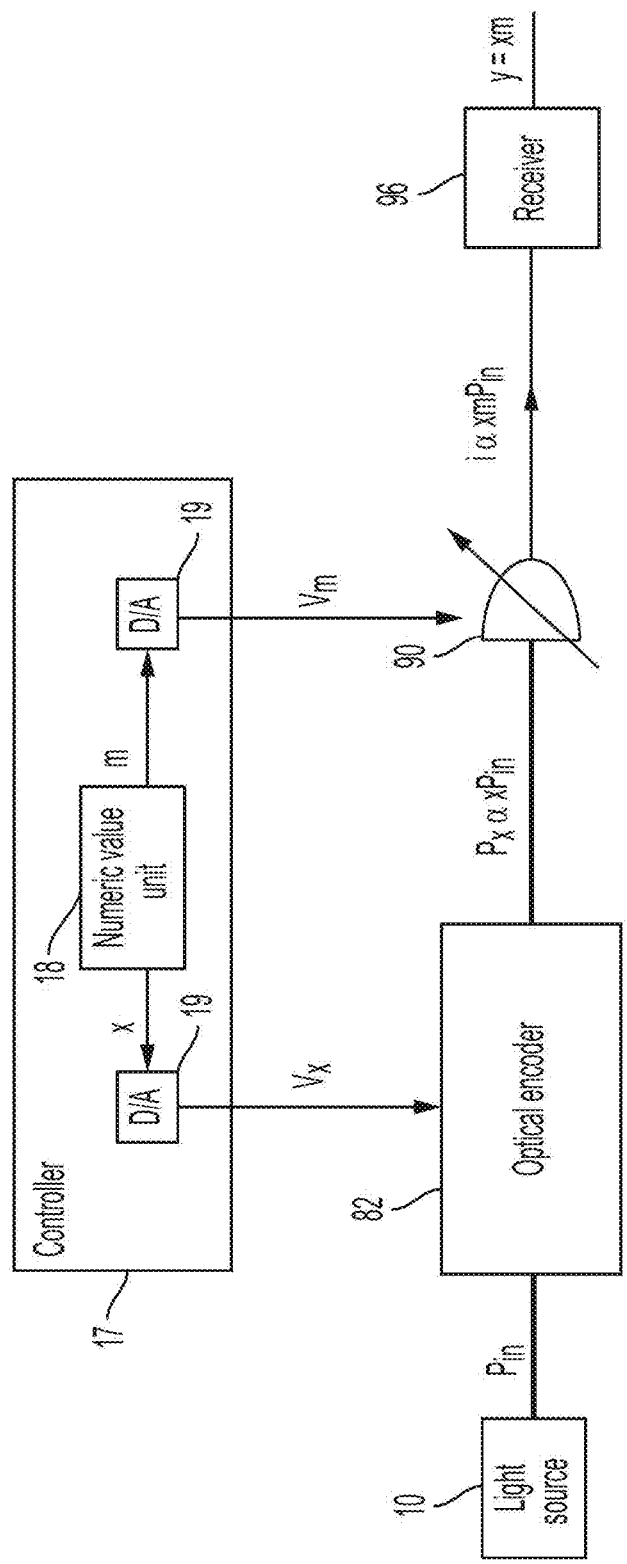
FIG. 10A is a block diagram illustrating an optical multiplier including the modulatable detector of FIG. 9A, in accordance with some embodiments.

FIG. 10A is a block diagram illustrating an optical multiplier based on a modulatable detector, in accordance with some embodiments. Just like the multiplier of FIG. 1A, this multiplier includes a light source 10 and a controller 17, which includes a pair of D/As 19 and a numeric value unit 18.

Optical encoder 82 generates an encoded optical signal having power $P_x$ that is proportional to both numeric value x and input power $P_{in}$. Optical encoder 82 may be implemented using any optical modulator, including an optical interferometer (e.g., a tunable directional coupler or a Mach-Zehnder interferometer), a resonant modulator, a Franz-Keldysh modulator, etc.

Modulatable detector 90 multiplies numeric value x by numeric value m. This is achieved by producing a photocurrent i that is proportional to both $P_x$ and m (by way of voltage $V_m$), and accordingly, is proportional to $P_{in}$, x and m. Receiver 96 includes a trans-impedance amplifier and an analog-to-digital converter. Receiver 96 produces an output numeric value y that is equal to the product of x times m.

Figure 10B:
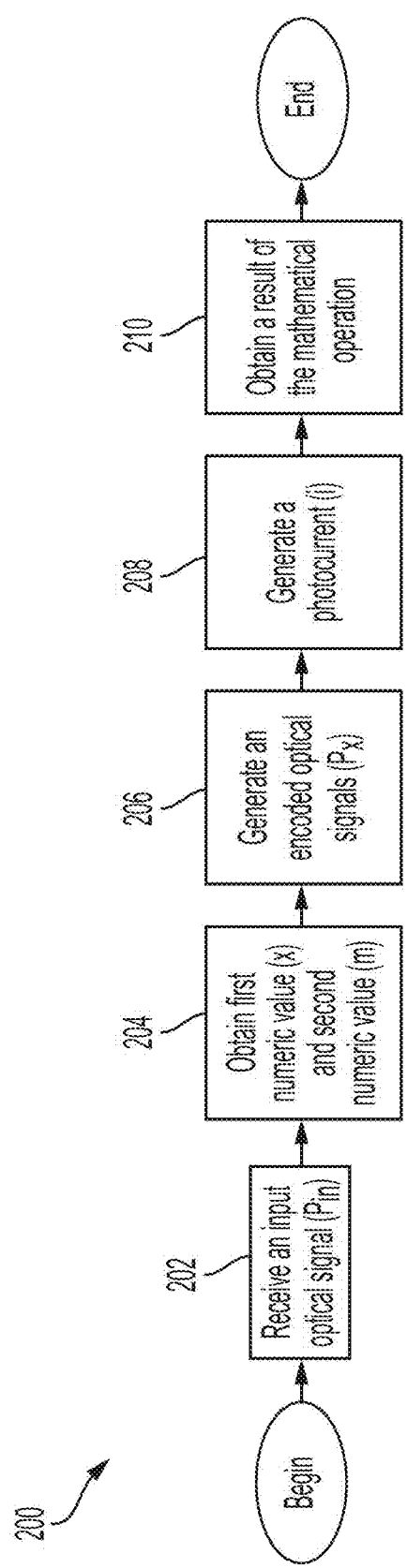
FIG. 10B is a flow chart illustrating a method for performing multiplications, in accordance with some embodiments.

FIG. 10B is a flow chart illustrating a method for performing mathematical operations (e.g., multiplications), in accordance with some embodiments. Method 200 can be performed using any suitable optical device, including the modulatable detector-based optical multiplier depicted in FIG. 10A.

Method 200 begins at step 202, in which an optical device receives an input optical signal. Referring for example to the architecture of FIG. 10A, at step 202, optical encoder 82 receives optical signal $P_{in}$.

At step 204, the photonic device obtains a first numeric value and a second numeric value. These are the numeric values to be multiplied. The numeric values need not be obtained at the same time. Referring for example to the multiplier of FIG. 10A, at step 204, numeric value unit 18 generates numeric values x and m based on data stored in a memory of controller 17 and/or on data obtained from another computing system. These numeric values may represent any type of information, such as text, audio, video, etc. The numeric value may be real or complex, positive or negative.

At step 206, the photonic device generates an encoded optical signal by modifying the input optical signal using the first numeric value. Referring for example to the multiplier of FIG. 10A, at step 206, optical encoder 82 produces an encoded optical signal having a power proportional to both $P_{in}$ and x.

At step 208, the photonic device generates a photocurrent. The generation involves detecting the encoded signal using a modulatable detector and setting a characteristic of the modulatable detector based on the second numeric value. Referring for example to the multiplier of FIG. 10A, at step 208, modulatable detector 90 produces photocurrent i, which involves detecting optical signal $P_x$ and setting a characteristic of the modulatable detector based on voltage $V_m$.

At step 210, the photonic device obtains a result of the mathematical operation using the photocurrent. In some embodiments, the result represents the product of the first numeric value times the second numeric value. In some embodiments, this step involves generating a voltage based on the photocurrent generated at step 208, and converting the voltage to the digital domain. Referring for example to the multiplier of FIG. 10A, step 210 may be performed using receiver 96.

The optical multiplier of FIG. 10A is based on a single-rail architecture. In some embodiments, however, modulatable detector-based optical multipliers are arranged in accordance with a dual-rail architecture. In this way, the multiplier further leverages the benefits described above in connection with FIG. 1A, including increased immunity to noise and reduced optical loss.

Figure 11:
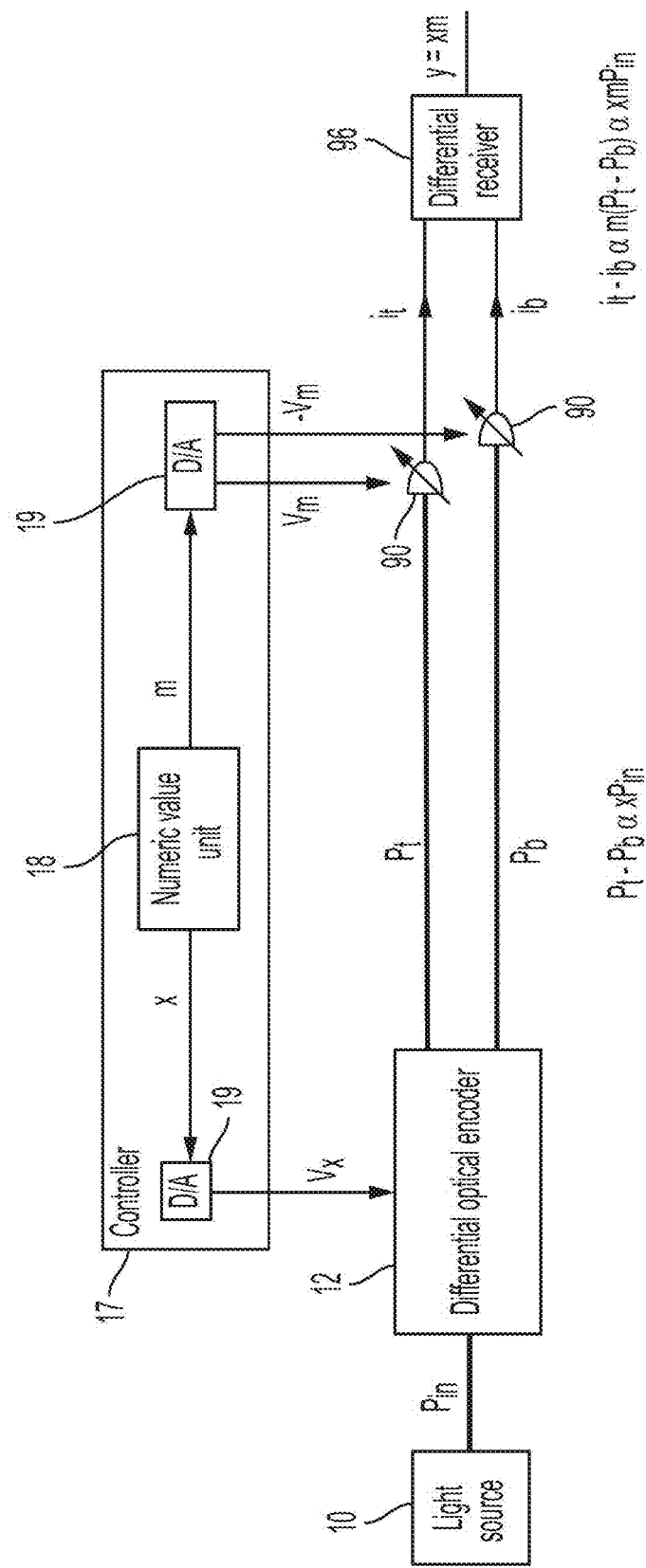
FIG. 11 is a block diagram illustrating a differential optical multiplier including the modulatable detectors of FIG. 9B, in accordance with some embodiments.

FIG. 11 is a block diagram of a dual-rail modulatable detector-based optical multiplier, in accordance with some embodiments. This optical multiplier combines the architecture of FIG. 1A with the architecture of FIG. 10A. Differential optical encoder 12 produces a pair of encoded optical signals having powers $P_t$ and $P_b$, respectively. The difference between the optical signals (e.g., the difference in signal power or signal amplitude) is proportional to both numeric value x and input power $P_{in}$. This optical multiplier includes a pair of modulatable detectors 90. The top modulatable detector produces a photocurrent $i_t$, the bottom modulatable detector produces a photocurrent $i_b$. Photocurrent $i_t$ depends on both optical power $P_t$ and voltage $V_m$. Similarly, photocurrent $i_b$ depends on both optical power $P_b$ and voltage $-V_m$. The difference between $i_t$ and $i_b$ is proportional to both m and $V_t$-$V_b$, and accordingly, is proportional to $P_{in}$, x and m. In some embodiments, the two modulatable detectors can be coupled together as described in FIG. 9D such that both photocurrents it and $i_b$ depend on both optical powers Pt and Pb and Vm. In this configuration, the modulatable detectors steer the photocurrents to the right output rail to maintain the large photocurrents generated at the detectors themselves. Differential receiver 96 includes a differential trans-impedance amplifier (or other circuits for subtracting the first photocurrent from the second photocurrent) and an analog-to-digital converter.

The modulatable detector-based multipliers of FIG. 10A and FIG. 11 perform scalar multiplications (x times m). However, some embodiments relate to photonic processors including modulatable detectors designed to compute matrix-matrix (e.g., matrix-vector) multiplications. These photonic processors may be implemented using single-rail or dual-rail architectures.

Figure 12A:
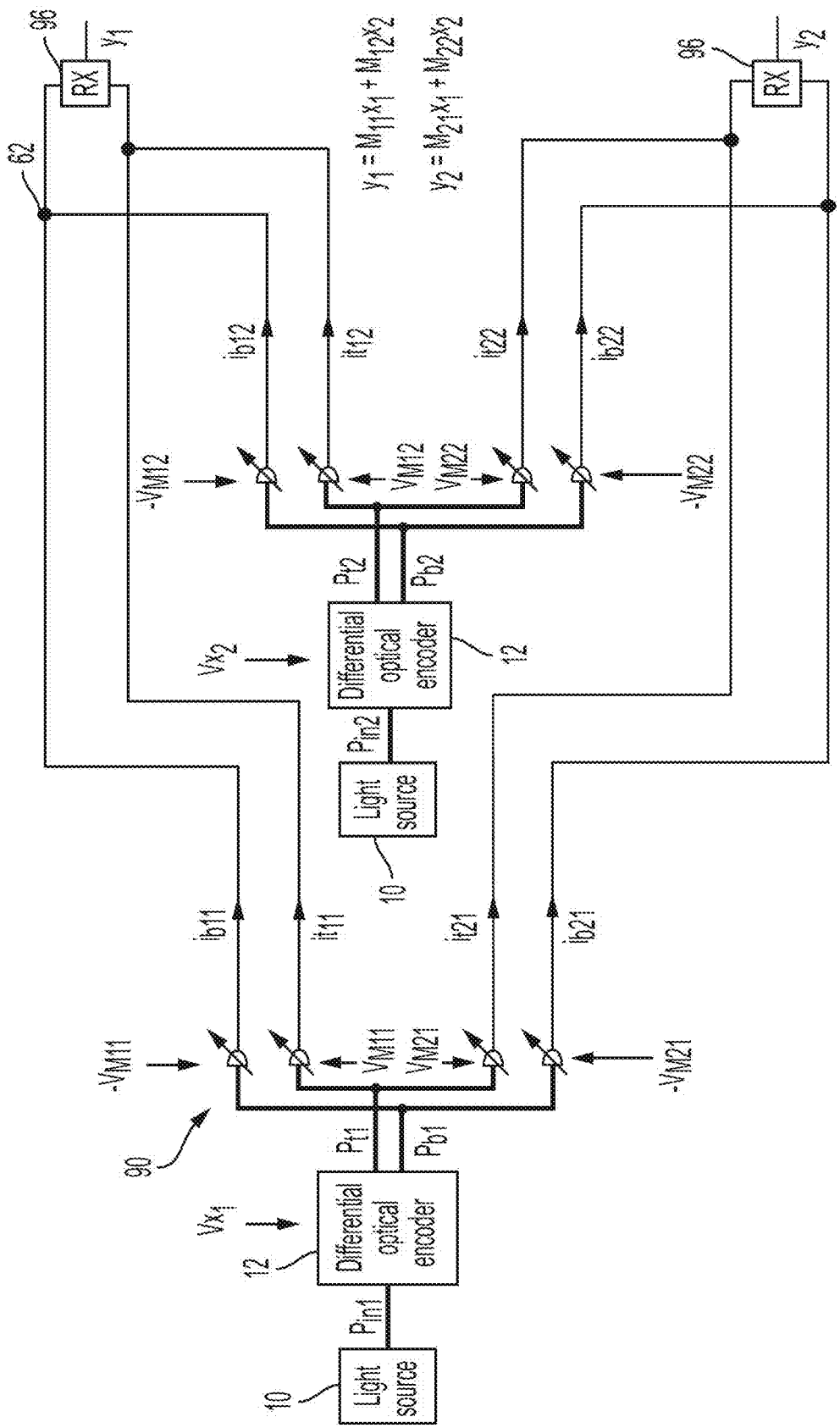
FIG. 12A is a block diagram of another photonic processor arranged according to a 2×2 configuration, in accordance with some embodiments.

An example of a modulatable detector-based dual-rail photonic processor is depicted in FIG. 12A, in accordance with some embodiments. In this implementation, the photonic processor is configured to multiply a 2×2 matrix (M) by a 2×1 input vector (X) to obtain a 2×1 output vector (Y). This processor operates in a manner similar to the multiplier described in connection with FIG. 11. A first light source 10 provides an input optical signal having power $P_{in1}$ and a second light source 10 provides an input optical signal having power $P_{in2}$ (although the same light source may be used in some embodiments). $P_{in2}$ may be equal to or different from $P_{in1}$. Each light source is followed by a differential optical encoder 12, which operates in the manner described in connection with the differential optical encoder of FIG. 11. The first differential optical encoder receives voltage $V_{x1}$, which is representative of numeric value $x_1$. This differential optical encoder encodes the received input optical signal using voltage $V_{x1}$ to generate a pair of encoded optical signals having powers $P_{t1}$ and $P_{b1}$. These optical signals are provided as inputs to a set of modulatable detectors 90. The top pair of modulatable detectors receives voltages $V_{M11}$ and $-V_{M11}$, which represent numeric value $M_{11}$. The bottom pair of modulatable detectors receives voltages $V_{M21}$ and $-V_{M21}$, which represent numeric value Mal. Both differential pairs of modulatable detectors operate in the manner described in connection with FIG. 11. The top pair of modulatable detectors outputs photocurrents $i_{b11}$ and $i_{t11}$, and the bottom pair of modulatable detectors outputs photocurrents $i_{b21}$ and $i_{t21}$. The difference between $i_{b11}$ and $i_{t11}$ is proportional to both $M_1$ and the difference between $Pb_1$ and $Pt_1$, and accordingly, is proportional to the product $M_{11}x_1$. Similarly, the difference between $i_{b21}$ and $i_{t21}$ is proportional to both $M_{21}$ and the difference between $P_{b1}$ and $P_{t1}$, and accordingly, is proportional to the product $M_{21}x_1$.

The second differential optical encoder receives voltage $V_{x1}$, which is representative of numeric value $x_2$. This differential optical encoder encodes the received input optical signal using voltage $V_{x2}$ to generate a pair of encoded optical signals having powers $P_{t2}$ and $P_{b2}$. These optical signals are provided as inputs to a set of modulatable detectors 90. The top pair of modulatable detectors receives voltages $V_{M12}$ and $-V_{M12}$, which represent numeric value Mu. The bottom pair of modulatable detectors receives voltages $V_{M22}$ and $-V_{M22}$, which represent numeric value $M_{22}$. The top pair of modulatable detectors outputs photocurrents $i_{b12}$ and $i_{t12}$, and the bottom pair of modulatable detectors outputs photocurrents $i_{b22}$ and $i_{t22}$. The difference between $i_{b12}$ and $i_{t12}$ is proportional to both $M_{12}$ and the difference between $Pb_2$ and $Pt_2$, and accordingly, is proportional to the product $M_{12}x_2$. Similarly, the difference between $i_{b22}$ and $i_{t22}$ is proportional to both $M_{22}$ and the difference between $P_{b2}$ and $P_{t2}$, and accordingly, is proportional to the product $M_{22}x_2$.

The outputs of the photodetectors are combined (see, e.g., node 62), thereby allowing the photocurrents to be added to one another. Receivers 96 receive the photocurrents produced by detectors 90. Receivers 96 include a differential trans-impedance amplifier (or other circuits for subtracting the first input current from the second input current) and an analog-to-digital converter. The top receiver 96 outputs numeric value $y_1 = M_{11}x_1 + M_{12}x_2$. The bottom receiver 96 outputs numeric value $y_2 = M_{21}x_1 + M_{22}x_2$.

Figure 12B:
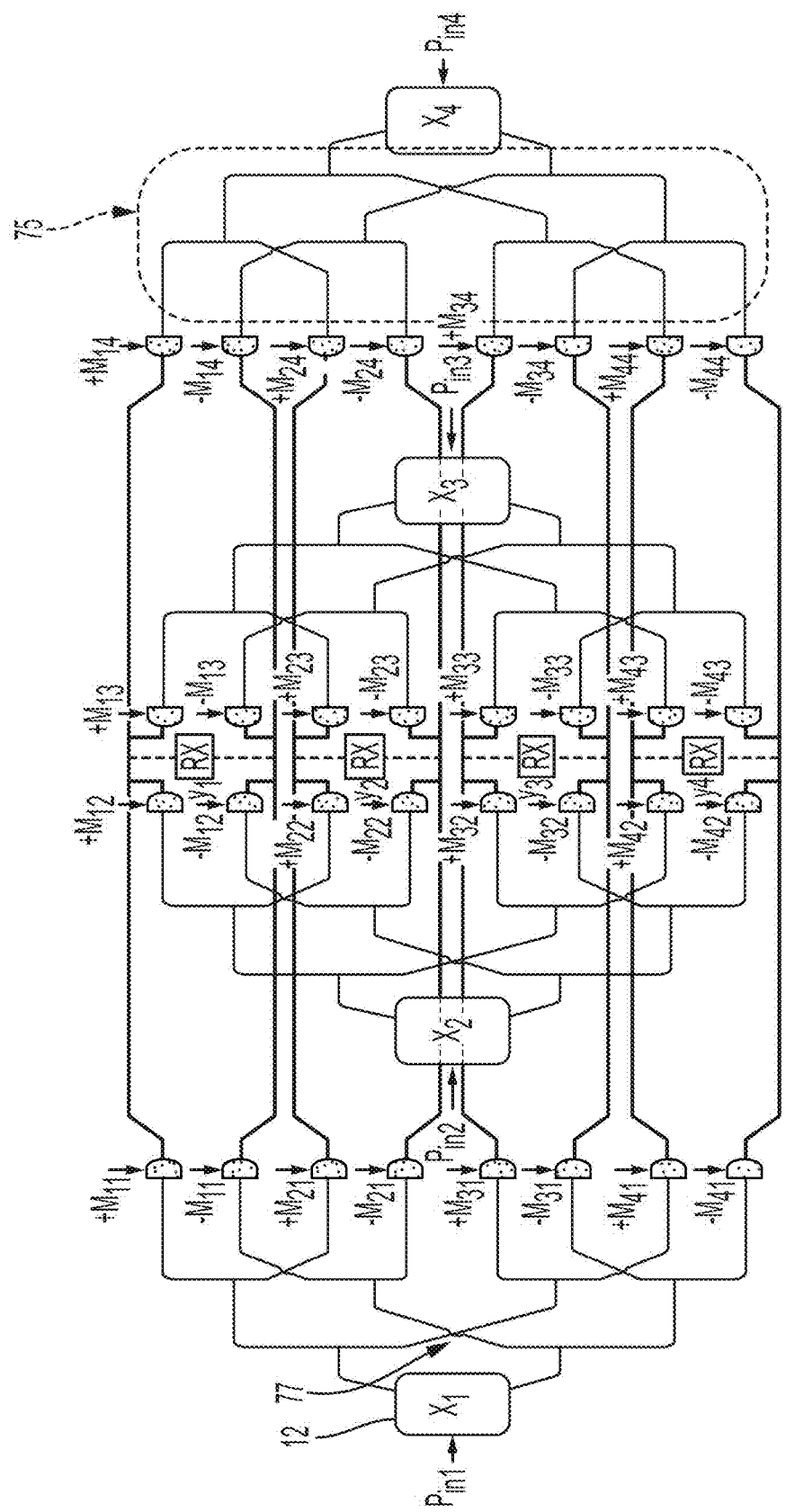
FIG. 12B is a block diagram of another photonic processor arranged according to a 4×4 configuration, in accordance with some embodiments.

An example of a 4×4 modulatable detector-based dual-rail photonic processor is illustrated in FIG. 12B. This processor includes four light sources 10 (not shown), four differential encoders 12 (which encode numeric values $x_1$, $x_2$, $x_3$ and $x_4$ into respective pairs of dual-rail optical signals), four optical splitter trees 75, thirty-two modulatable detectors 90 (which multiply the respective inputs by $M_{11}$, $M_{21}$, $M_{31}$, $M_{41}$, $M_{11}$, $M_{22}$, $M_{32}$, $M_{42}$, $M_{13}$, $M_{23}$, $M_{33}$, $M_{43}$, $M_{14}$, $M_{24}$, $M_{34}$ and $M_{44}$), and four receivers 96.

Although not expressly illustrated in FIGS. 11, 12A and 12B, modulatable detectors 90 may be arranged according to the scheme depicted in FIG. 9D. Accordingly, the photodetector 91 of a pair of modulatable detectors control both the gain stage that is directly coupled to the photodetector and the gain stage that is directly coupled to the other photodetector of the pair.

Figure 12C:
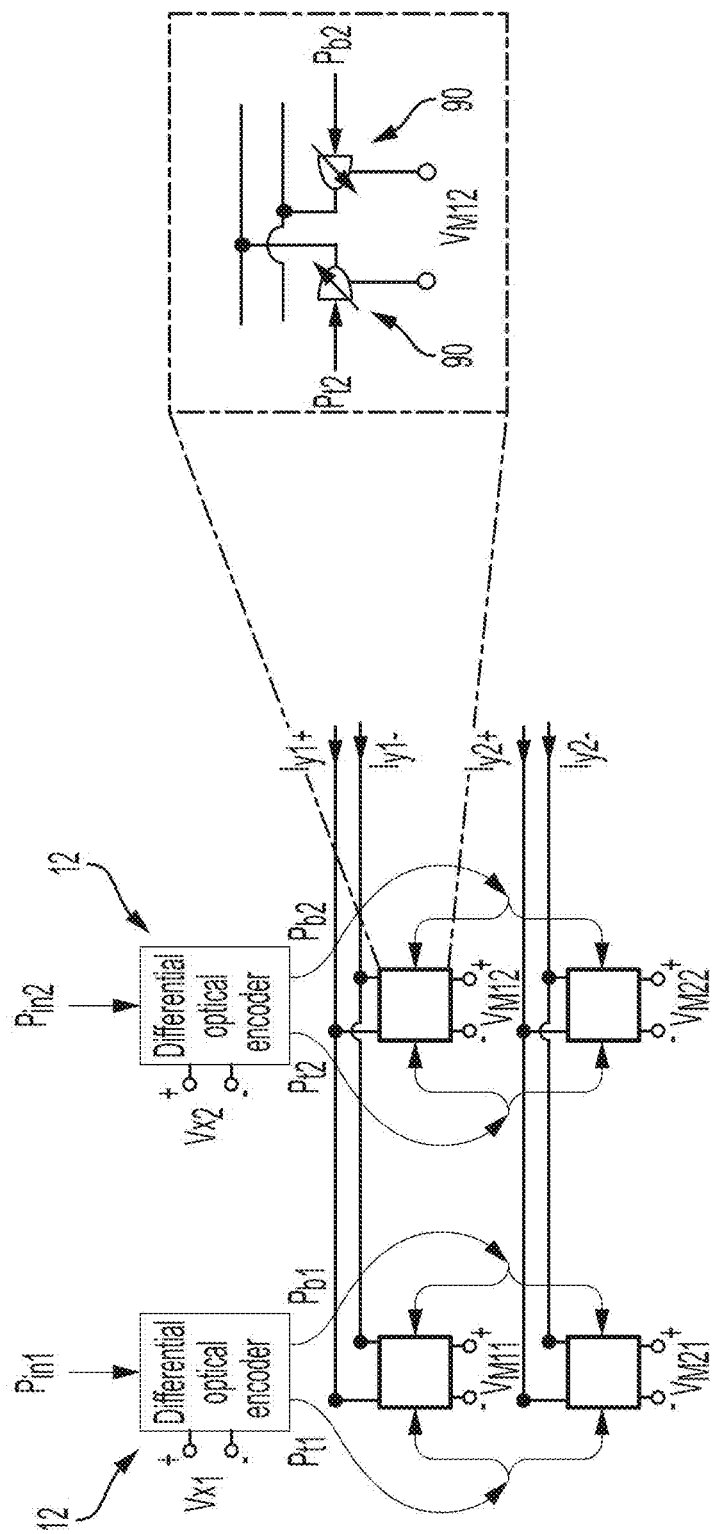
FIG. 12C is a diagram illustrating an optical splitter tree, in accordance with some embodiments.

FIG. 12C illustrates an alternative optical splitter tree that does not include optical waveguide crossings 77. As in the tree of FIG. 12A, each differential optical encoder feeds four modulatable detectors. In the tree of FIG. 12A, these four modulatable detectors 90 are all oriented in the same direction. To the contrary, in the tree of FIG. 12C, half of the modulatable detectors 90 are oriented in one direction and half of the modulatable detectors 90 are oriented in another direction (e.g., the opposite direction). The arrangement with modulatable detectors oriented in opposite directions is shown in the inset of FIG. 12C. Having sets of modulatable detectors oriented in different directions allows for optical splitter trees that omit waveguide crossings, and as a result, reduces optical loss.

It should be noted that the photonic processors described in connection with FIGS. 12A-12B have relatively short optical paths, especially if compared to the photonic processors of FIGS. 6 and 7A. Compare for example the photonic processor of FIG. 12A with the photonic processor of FIG. 6. In the photonic processor of FIG. 12A, the optical paths extend only from the light sources to the modulatable detectors. By contrast, the photonic processor of FIG. 6 has longer optical paths which encompass, in addition to the optical paths of FIG. 12A, the differential optical amplifiers.

Despite the shorter optical paths, the photonic processor of FIG. 12A takes substantial advantage of the physical nature of optical signal processing. The inventors have appreciated that analog accelerators that are implemented to operate entirely in the electrical domain suffer from unwanted coupling between the different stages of the accelerator. In analog electronic accelerators, in addition to the forward electrical path, there is an unwanted backward path that couples electrical signals in the backward direction. This results in a variety of negative effects, including noise increase and speed decrease. By contrast, optical signals by nature travel only in one direction, the forward direction. Accordingly, there are generally no optical signals traveling in the backward direction which may otherwise negatively affect the performance of the photonic processor (although there may be optical back-reflections in some embodiments, the extent of these reflections can be reduced substantially using proper optical terminations). The inventors have appreciated that encoding numeric values in the optical domain as for example shown in FIG. 12A effectively isolates the encoder from the multiplier, thereby avoiding the negative effects that exist in fully-electrical accelerators.

V. Examples of Modulatable Detectors

As discussed above, modulatable detectors of the types described herein are optical detectors having at least one characteristic that can be controlled by a user using one or more electric control signals. Therefore, modulatable detectors have at least one electrical control terminal. These detectors are designed so that application of a control signal (e.g., a voltage, current or charge) alters a characteristic of the detector, such as the detector's responsivity, gain, impedance, etc. The result is that the detector's photocurrent depends not only on the optical power incident on the detector, but also on the control signal applied to the detector.

Figure 13:
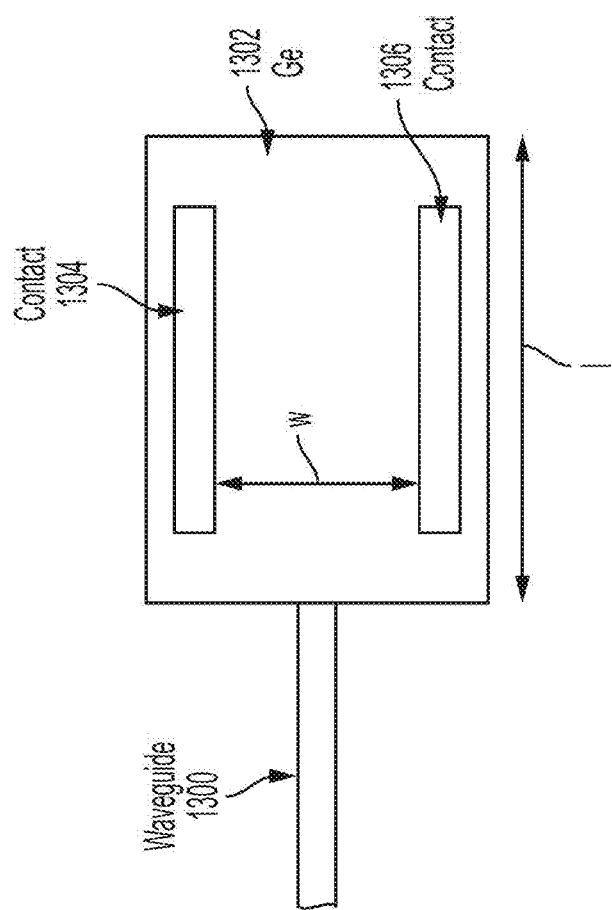
FIG. 13 is a diagram illustrating a photoconductor, in accordance with some embodiments.

As discussed above in connection with FIG. 9C-9D, in some embodiments, modulating a characteristic of a modulatable detector may involve modulating the responsivity of one or more photodetectors 91. FIG. 13 illustrates an example of a photodetector 91, in accordance with some embodiments. This photodetector is configured to operate as a photoconductor-incident light produces electron-hole pairs which cause current to flow under the presence of an electric field. The photoconductor includes an optical waveguide 1300 (e.g., a silicon waveguide), a photo-absorption region 1302 including germanium (though absorbing materials other than germanium may be used in some embodiments), and electrodes 1304 and 1306. Optical waveguide 1300 provides light to germanium region 1302. Assuming that the wavelength is below the germanium's absorption cut-off wavelength (about 1.9 μm in some embodiments), the incident light is absorbed by the germanium and electron-hole pairs are generated. If a voltage is applied between electrodes 1304 and 1306, an electric field is established that sweeps the photogenerated carriers out of the germanium region, thereby giving rise to a photocurrent. In this implementation, the modulatable characteristic is the photoconductor's responsivity. The inventors have appreciated, in fact, that the responsivity R (measured in amperes per watts) of this photoconductor depends on the voltage V applied to the electrodes. In particular, the responsivity is given by the following expression:

$$R = \frac{q}{h\nu} \frac{\tau_n \mu_n V}{w^2} \eta_i (1 - e^{-\alpha l})$$

where $\tau_n$ is the electron recombination time, $\mu_n$ is the electron mobility, w is the device electrode spacing, $\eta_i$ is the intrinsic quantum efficiency, α is the absorption coefficient of the detector material, ν is the frequency of the incident light and l is the device depth in the longitudinal direction with respect to the light propagation direction. It should be noted that, because the responsivity R is proportional to voltage V, the photocurrent is also proportional to V. Therefore, the photocurrent can be controlled by varying V.

FIGS. 14A-14B illustrate another example of a photodetector 91, in accordance with some embodiments. FIG. 14A is a top view and FIG. 14B is a cross sectional view taken along the BB line of FIG. 14A. This photodetector includes a waveguide 100 (e.g., a silicon or silicon nitride waveguide), a highly doped n region (n+ region) 102, an intrinsic region (i region) 103, a p region 104, an oxide layer (e.g., silicon dioxide) 105, a poly-silicon layer (or a layer made of another conductive material) 106, an intrinsic region (i region) 107, a photo-absorption region 108 including germanium (or including another absorbing material) and a highly doped p region (p+ region) 110. In some embodiments, the germanium region is also shaped to form an optical waveguide.

Waveguide 100 abuts against germanium region 108. In this way, light traveling down waveguide 100 is transmitted to germanium region 108, and as a result, is absorbed. Germanium region 108 is positioned on top of intrinsic region 107. For example, germanium region 108 is grown epitaxially on silicon. The highly doped regions 102 and 110 are connected to respective electrodes. P region 104 is positioned adjacent to germanium region 108. Oxide layer 105 is positioned on top of p region 104, and poly-silicon layer 106 is positioned on top of oxide layer 105.

Collectively, p region 104, oxide layer 105 and poly-silicon layer 106 form a metal-oxide-semiconductor capacitor (MOS cap). It should be appreciated that control capacitors other than the MOS cap may be used in some embodiments, including for example a Shottky junction-capacitor or a graphene-based capacitor. FIG. 14C illustrates the energy band diagram of the photodetector of FIG. 14B along the CC line. The diagram illustrates four bands. The top bands represent the conduction band when a low bias voltage is applied to the MOS cap and the conduction band when a large bias voltage is applied to the MOS cap. The bottom bands represent the valance band when a low bias voltage is applied to the MOS cap and the valence band when of large a bias voltage is applied to the MOS cap.

The voltage applied between the n+ and p+ regions controls the electric field along the x-axis. In the diagram of FIG. 14C, this voltage produces a reverse bias. The reverse bias, in turn, produces an electric field oriented along the x-axis. This electric field sweeps photogenerated carriers away from the germanium region, assuming that the photocarriers have sufficient energy to overcome the energy barrier existing at the interface between the Ge region 108 and the p region 104.

The voltage applied to the MOS cap or other control capacitors (referred to as the gate voltage) determines the extent of the electron and hole energy barriers at the interface between the Ge region 108 and the p region 104. When the bias voltage applied to the MOS cap is low, both the electron and the hole energy barriers are relatively large. Under these conditions, carriers photogenerated in the germanium region are blocked, and as a result, do not produce a significant photocurrent. To the contrary, when the bias voltage applied to the MOS cap is large, both the electron and the hole energy barriers are relatively low. Under these conditions, carriers photogenerated in the germanium region have sufficient energy to overcome the respective barriers, and as a result, produce a photocurrent. Thus, the voltage applied to the MOS cap controls the responsivity of the photodetector.

In some embodiments, a photodetector includes an avalanche region in which photogenerated carriers experience impact ionization, thereby producing gain. In the example of FIGS. 14A-14B, i region 103 forms an avalanche region. In other embodiments, the avalanche region may include a quasi-i region (e.g., a region with doping concentration less than $10^{-14}$ cm$^{-3}$). Impact ionization occurs in the avalanche region, which amplifies the photocurrent. Thus, the presence of the avalanche region increases the sensitivity of the photodetector. In some embodiments, the responsivity of the photodetector may be modulated by controlling the gain associated with the avalanche region.

Figure 15A:
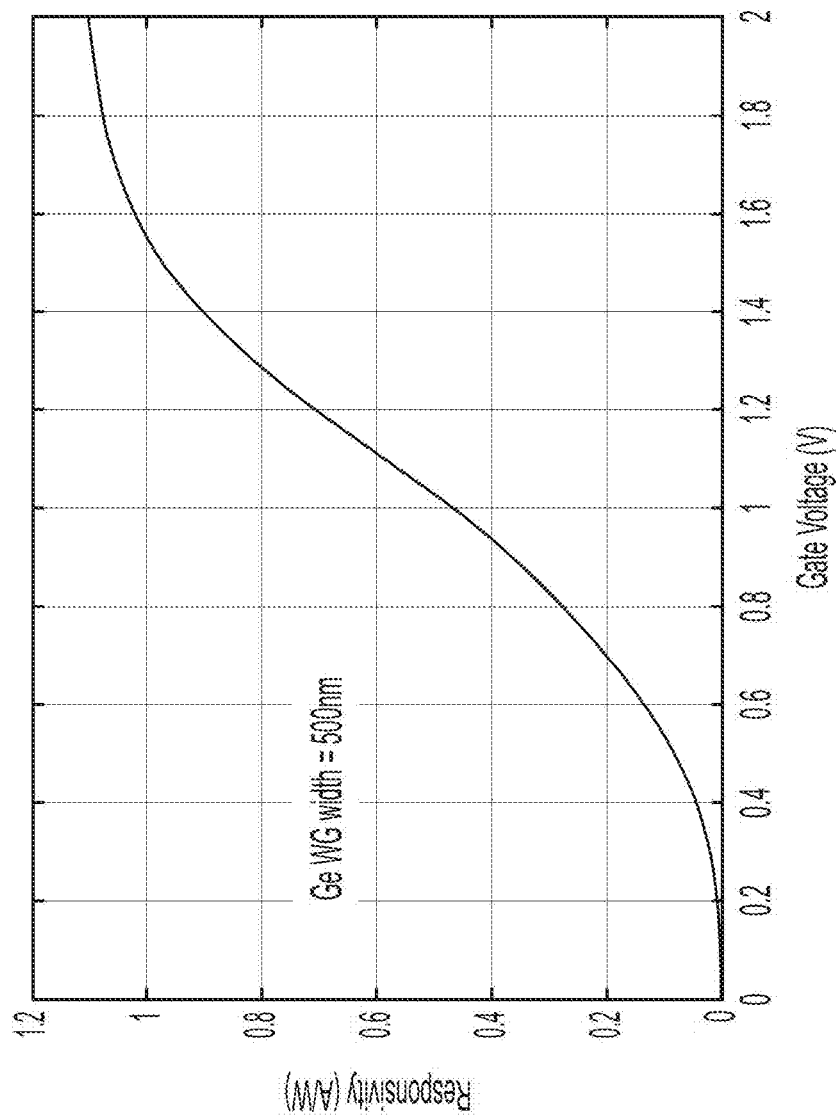
FIGS. 15A-15E are plots illustrating example responsivities for the modulatable detector of FIG. 14A, in accordance with some embodiments.

FIG. 15A is a plot illustrating the responsivity of a photodetector of the type depicted in FIGS. 14A-14B. In this example, the germanium region has a width (measured in the direction parallel to the x-axis) of 500 nm. As shown, varying the voltage applied to the MOS cap (the gate voltage) results in a change in the responsivity of the photodetector. As discussed above, this change in responsivity occurs because the voltage controls the extent of the energy barriers.

Figure 15B:
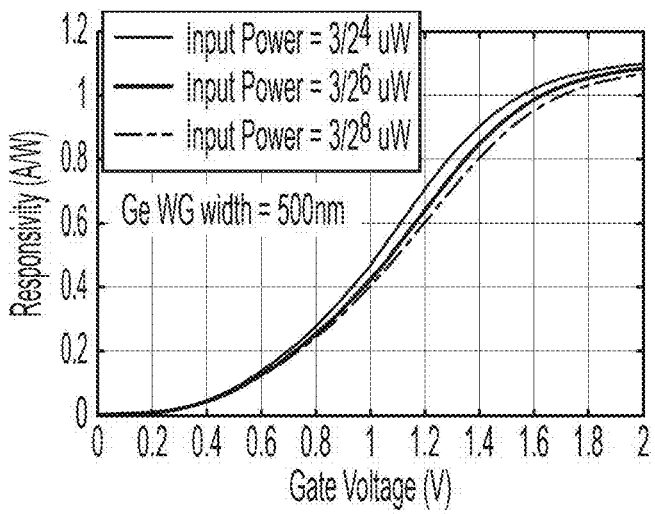
Figure 15C:
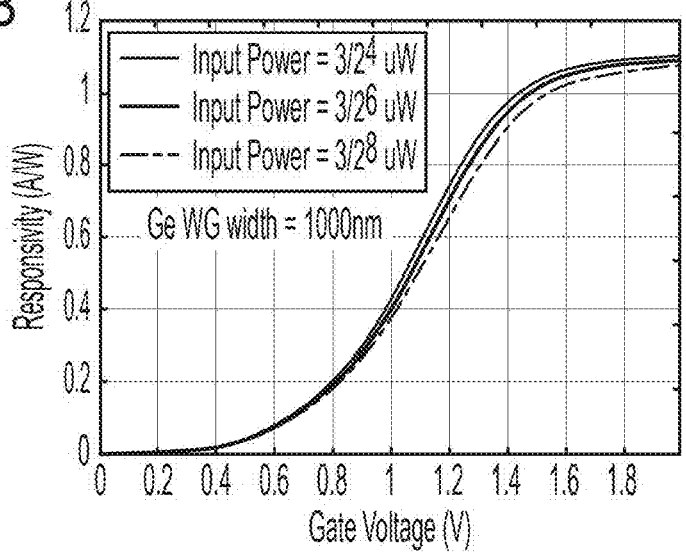
Figure 15D:
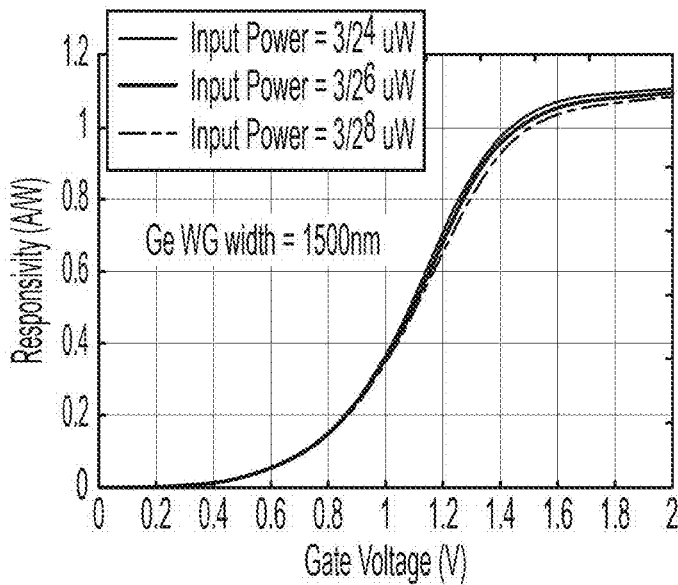

FIG. 15B is another plot illustrating the responsivity of a photodetector of the type depicted in FIGS. 14A-14B. Again, the width of the germanium region is 500 nm. In this case, the power of the input optical signal is also varied. As shown, varying the input power also causes a change in the responsivity, which is undesirable because it negatively effects the linearity of the photodetector. FIGS. 15C and 15D illustrate similar plots. In the plot of FIG. 15C, the width of the germanium region is 1000 nm. In the plot of FIG. 15D, the width of the germanium region is 1500 nm. These plots illustrate that the responsivity's dependence upon the input power can be mitigated by properly selecting the width of the germanium region.

Figure 15E:
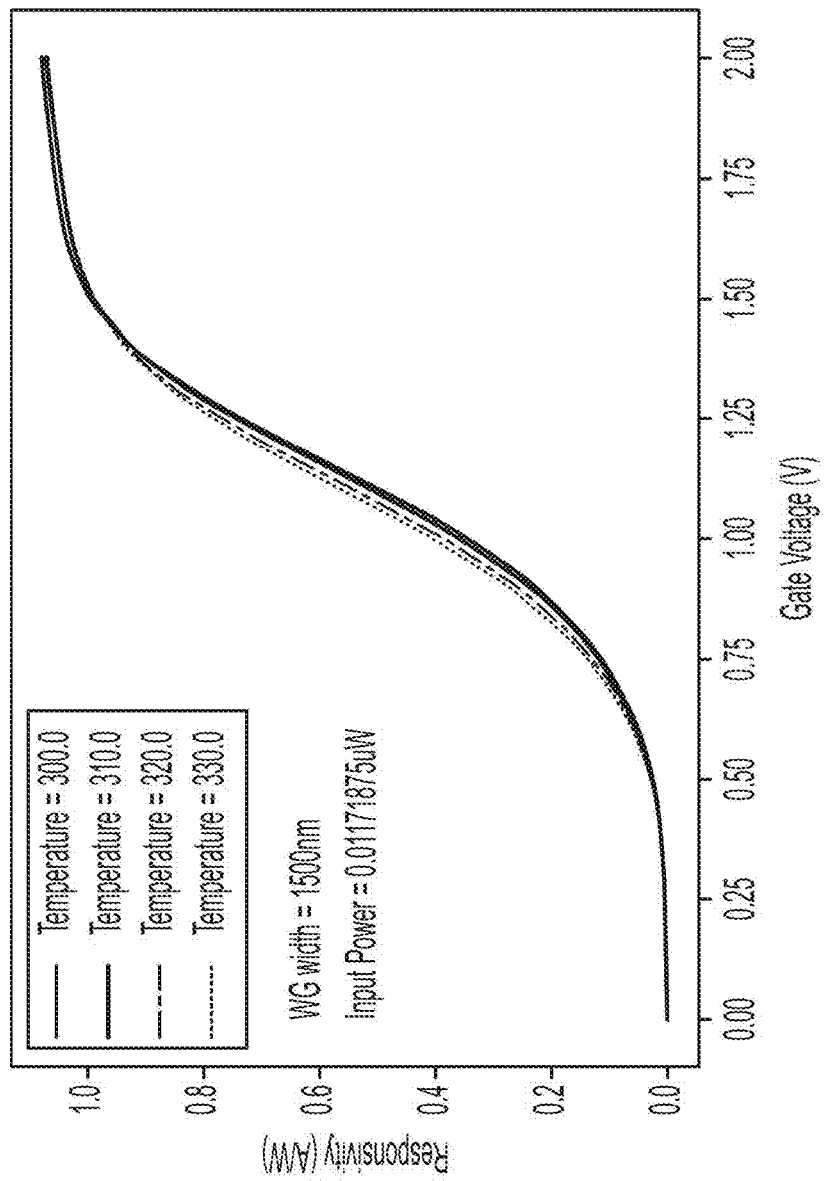

FIG. 15E further illustrates that the responsivity exhibits a weak temperature-dependence. As for the power-dependence, the temperature-dependence may be mitigated by properly selecting the width of the germanium region.

The inventors have appreciated that the speed of the photodetector of FIGS. 14A-14B depends upon the gate voltage applied to the MOS cap. When the gate voltage is high enough to drive the MOS cap into inversion, the photogenerated carriers are quickly swept away from the germanium region. When no gate voltage is applied, the photogenerated carriers are stored in germanium region due to the presence of the energy barrier, and largely decay by carrier recombination processes.

Figure 16A:
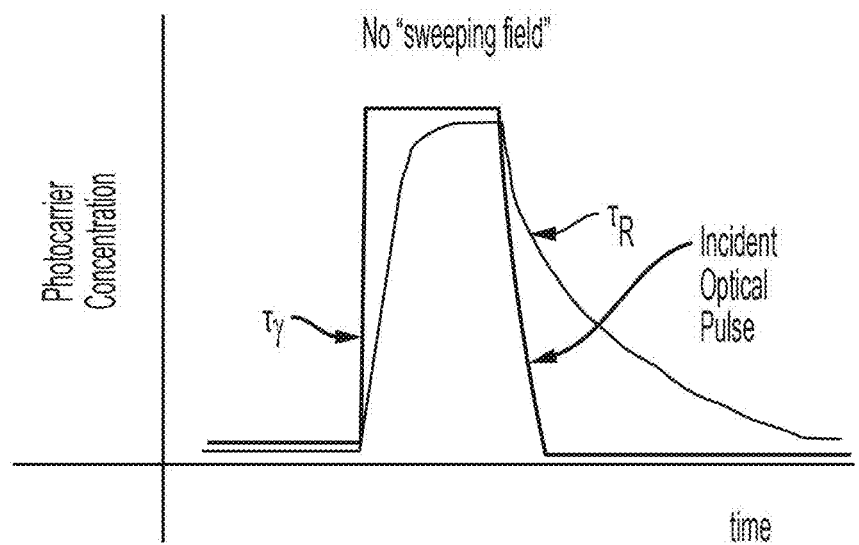
FIGS. 16A-16B are plots illustrating photocarrier concentration over time, in accordance with some embodiments.
Figure 16B:
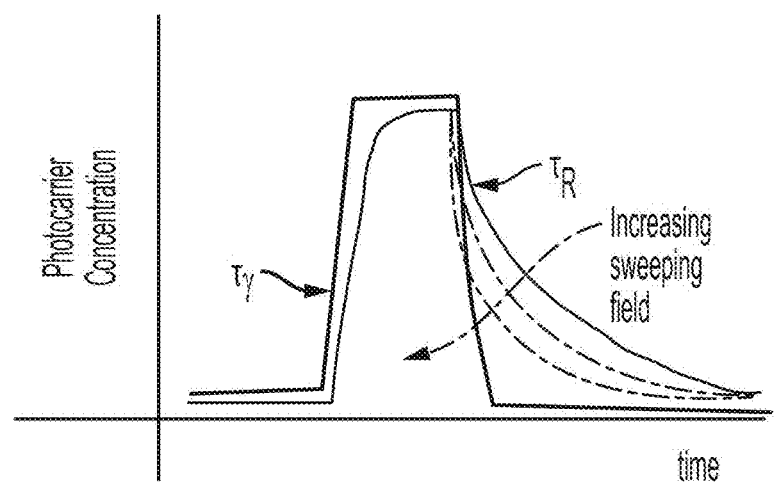

FIG. 16A shows the photocarrier concentration as a function of time for a temporally narrow incident optical pulse. As shown, there are two time constants associated with the photocarriers: one associated with the rise time (Ty) and another associated with the fall time ($\tau_R$). The rise time is associated with the creation of photogenerated carriers. The fall time, in the absence of a photocarrier sweeping field, is associated with carrier recombination processes (which are typically on the order of nanoseconds in imperfect semiconductors). This can be significantly sped up by introducing a "sweeping field". The sweeping field can be applied periodically to remove photogenerated carriers and effectively increase the bandwidth of the device as shown in FIG. 16B. One possible implementation of the sweeping field would be to apply a high voltage pulse to the MOS cap.

Figure 17:
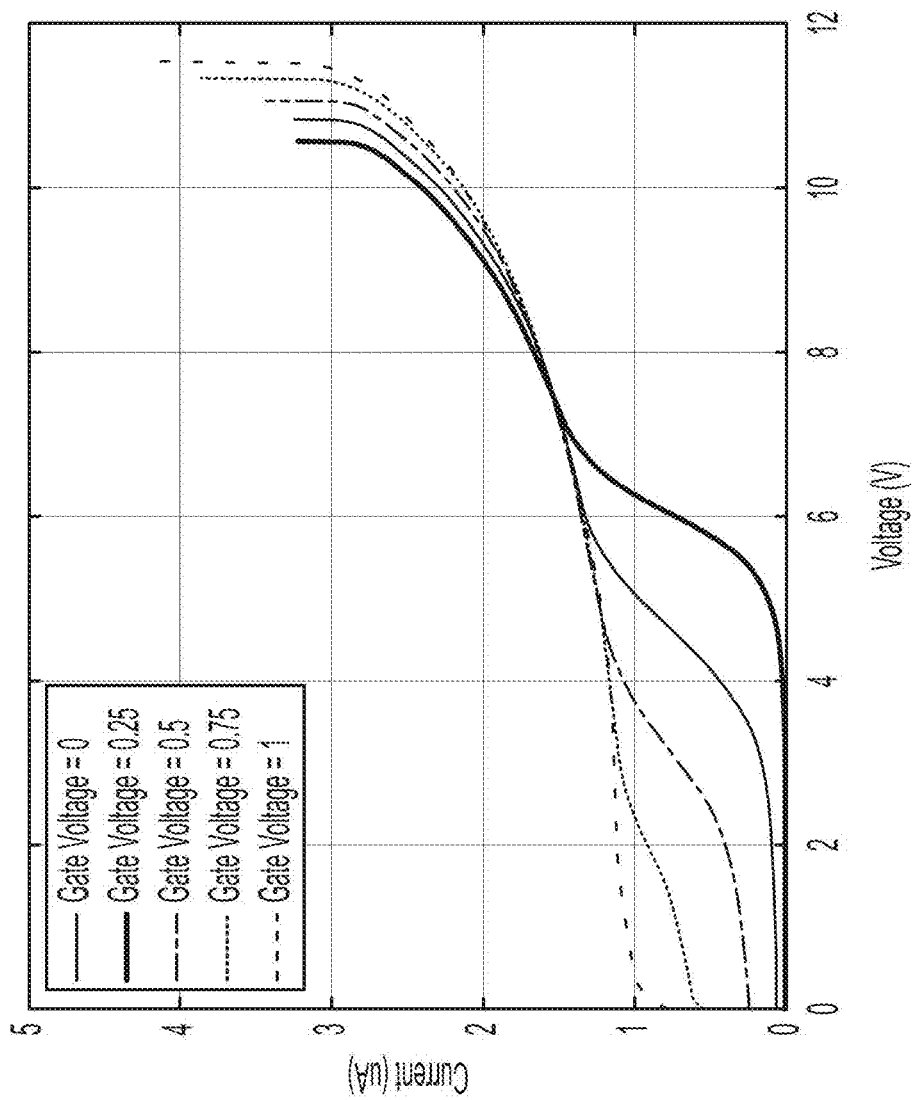
FIG. 17 is a plot illustrating example current/voltage characteristics of a modulatable detector, in accordance with some embodiments.

As discussed above, the inventors have appreciated that the photodetector may be designed to exhibit avalanche multiplication when an avalanche region is included between the p region 104 and the n+ region 102, as shown in FIG. 14B. FIG. 17 depicts the I-V characteristics in reverse bias of a representative photodetector with varying gate voltage. As shown, avalanche multiplication kicks in at around 10 V in this example.

As discussed above in connection with FIG. 9C-9D, in some embodiments, modulating a characteristic of a modulatable detector may involve modulating the current gain of one or more gain stages 92. FIGS. 18A-18H are circuit diagrams of various modulatable detectors having gain stages characterized by modulatable current gains, in accordance with some embodiments. In these modulatable detectors, gain stage 92 is implemented using transistors. Further, in these modulatable detectors, optical power $P_x$ (and optionally, voltage $-P_x$) is encoded with numeric value x; voltage $V_m$ (and optionally, voltage $-V_m$) is encoded with numeric value m and modulates the current gain; and photocurrent $i_{xm}$ (and optionally, current $-i_{xm}$) represents the product of numeric value x times numeric value m. It should be appreciated that, while these figures illustrate gain stages formed using MOS transistors, any other suitable type of transistor may be used, including bipolar junction transistors (BJTs) and junction field effect transistors (JFETs). Thus, as used herein, the term "gate" indicates the gate of a field effect transistor or the base of a bipolar transistor, the term "source" indicates the source of a field effect transistor or the emitter of a bipolar transistor and the term "drain" indicates the drain of a field effect transistor or the collector of a bipolar transistor. It should also be noted that the drain and source of a transistor may be interchangeable. Accordingly, in some embodiments, when the drain of a transistor is described as being coupled to a certain terminal, this includes the configuration in which the source of the transistor is coupled to the terminal (and vice versa).

The modulatable detectors of FIGS. 18A-18H allow for encoding of signed numeric values. In these embodiments, in fact, the sign of a numeric value (positive or negative) is represented based on the direction of the photocurrent(s).

Figure 18D:
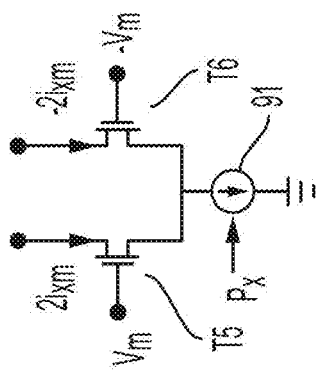
FIGS. 18A-18H are circuit diagrams illustrating additional modulatable detectors, in accordance with some embodiments.
Figure 18C:
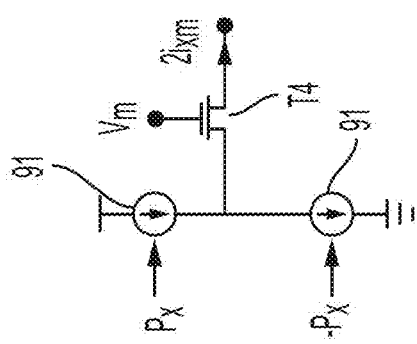
Figure 18B:
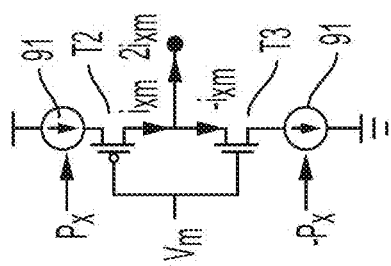
Figure 18A:
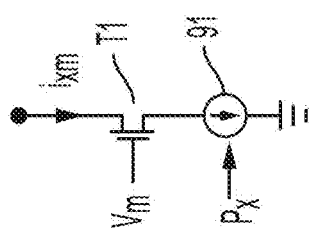

The modulatable detector of FIG. 18A includes a photodetector 91 and a transistor T1 serving as gain stage 92. Photodetector 91 detects an optical signal $P_x$. The source of transistor T1 is coupled to photodetector 91. The gate of transistor T1 receives a voltage $V_m$. Voltage $V_m$ controls transistor T1's gate-source voltage, and as a result, the current gain provided by the transistor. Photocurrent $i_{xm}$ is proportional to both numeric value x and numeric value m, thereby representing the product of these numeric values. The inventors have appreciated that such a single-ended/unbalanced circuit has three limitations. First, this single-ended circuit is susceptible to common-mode and power-supply noise, both of which degrade the performance of the modulatable detector. Second, a low magnitude voltage $V_m$ turns off transistor T1, thus severely limiting the transistor's speed. Third, blocking of some or all the photocurrent results in charge buildup that is dependent on optical power, resulting in an effective responsivity that is dependent not only on the applied voltage $V_m$ but also on the input optical power.

FIG. 18B illustrates another modulatable detector, in accordance with some embodiments. This modulatable detector includes two photodetectors 91 to provide balanced detection of the differential optical input signal $P_x$ with enhanced common-mode rejection ratio (CMRR) on the $P_x$ inputs. The gain stage 92 includes a complementary MOS (CMOS) inverter—a p-type (PMOS) transistor T2 and an n-type (NMOS) transistor T3 enable modulation via a single-ended voltage $V_m$. The photocurrent $2i_{xm}$ represents the product of numeric value x times numeric value m. However, the inventors have appreciated that this modulatable detector suffers from poor CMRR on the $V_m$ input. For the circuit to operate properly, the PMOS and NMOS transistors need to be sized properly to provide equal drive strength. Any process variation between the PMOS and NMOS transistors results in systematic offset error, thereby negatively affecting the circuit's ability to provide equal drive strength. Further, this modulatable detector suffers from the second and third problems described above in connection with the modulatable detector of FIG. 18A.

FIG. 18C illustrates another modulatable detector, in accordance with some embodiments. This embodiment involves balanced detection (see detectors 91) and single-ended modulation (see transistor T4, which serves as gain stage 92). The photocurrent $2i_{xm}$ represents the product of numeric value x times numeric value m. However, the inventors have appreciated that this modulatable detector suffers from the same drawbacks described above in connection with the modulatable detector of FIG. 18B.

FIG. 18D illustrates another modulatable detector, in accordance with some embodiments. This modulatable detector includes a gain stage with two transistors (T5 and T6) arranged in a differential pair configuration to provide differential modulation. The inventors have appreciated that this configuration leads to a large CMRR on the $V_m$ input. Further, this modulatable detector circumvents the speed limitation described in connection with FIGS. 18A-18C. Due to the differential nature of the modulating electrical input signal $V_m$, at least one of the transistors is always turned on, thus enabling high speed operation. In addition, because a current flows continuously through the gain stage, the optical power-dependent charge buildup is negligible. As a result, the overall responsivity of the modulatable detector does not depend on the optical power. However, the inventors have appreciated that this modulatable detector suffers from low CMRR on the $P_x$ input.

Figure 18E:
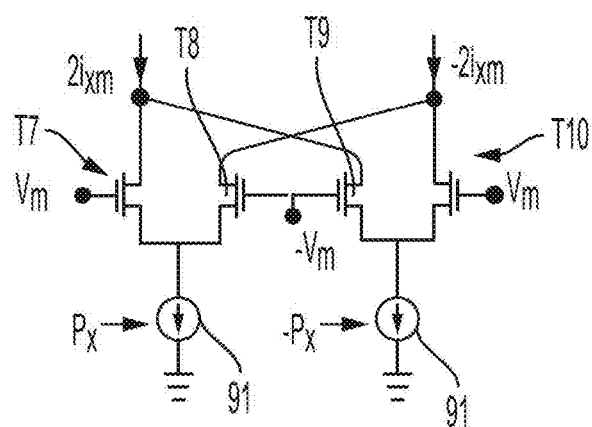

The modulatable detectors of FIGS. 18E-18H provide fully differential modulation and balanced detection and address the problems described in connection with FIGS. 18A-18D. FIG. 18E illustrates another modulatable detector, in accordance with some embodiments. This modulatable detector includes a gain stage with two differential pairs (see transistor pair T7-T8 and transistor pair T9-T10) with cross-coupled connections. The drain of transistor T7 is coupled to the drain of transistor T9, and the drain of transistor T8 is coupled to the drain of transistor T10. Photodetectors 91 are coupled to the sources of transistors T7-T10. Voltages $V_m$ and $-V_m$ control the current gain of the gain stage, and photocurrents $2i_{xm}$ and $-2i_{xm}$ represent the product of numeric value x times numeric value m. The modulatable detector of FIG. 18E provides high speed operation, optical-power-independent overall responsivity, robustness to process variation and mismatch, and large CMRR on both $P_x$ and $V_m$ inputs.

Figure 18F:
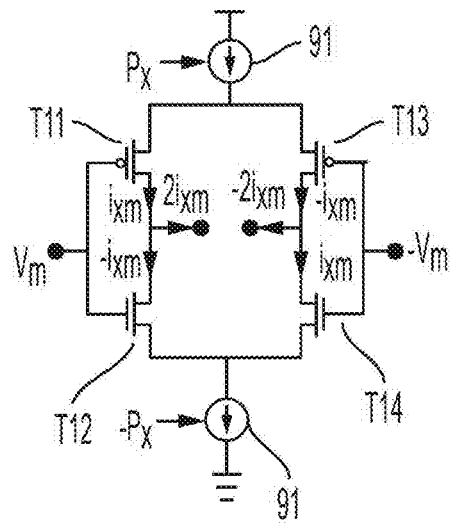

FIG. 18F illustrates another modulatable detector, in accordance with some embodiments. This modulatable detector is similar to the modulatable detector of FIG. 18E. However, this modulatable detector includes a gain stage having CMOS inverters with differential pairs of transistors. PMOS transistor T11 and NMOS transistor T12 have drains that are coupled to one another. Similarly, PMOS transistor T13 and NMOS transistor T14 have drains that are coupled to one another. One photodetector 91 is coupled to the sources of transistors T12 and T14. One photodetector 91 is coupled to the sources of transistors T11 and T13. This modulatable detector can be viewed as the differential version of the modulatable detector of FIG. 18B.

Figure 18G:
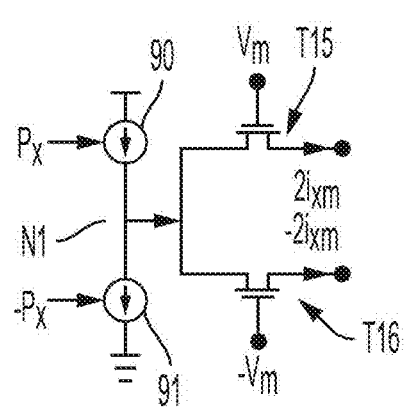

FIG. 18G illustrates another modulatable detector, in accordance with some embodiments. This modulatable detector is similar to the modulatable detector of FIG. 18E, but it includes a gain stage with one differential pair of transistors T15-T16. This modulatable detector includes a node N1, which is coupled to both photodetectors 91 and to the sources of transistors T15 and T16. This modulatable detector can be viewed as the fully differential version of the modulatable detector of FIG. 18C.

Figure 18H:
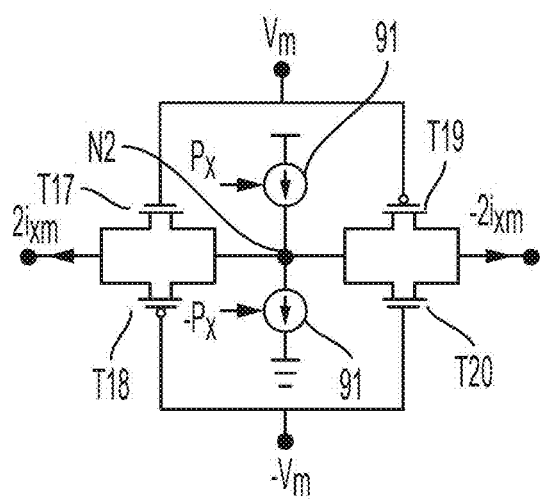

FIG. 18H illustrates another modulatable detector, in accordance with some embodiments. This modulatable detector includes a gain stage with two CMOS transmission gates. The drains of transistors T17 and T18 are coupled to each other and the sources of transistors T17 and T18 are also coupled to each other. Similarly, the drains of transistors T19 and T20 are coupled to each other and the sources of transistors T19 and T20 are also coupled to each other. NMOS transistor T17 and PMOS transistor T18 form a first complementary transmission gate. NMOS transistor T20 and PMOS transistor T19 form a second complementary transmission gate. Node N2 is coupled to both complementary transmission gates and to both photodetectors 91.

Figure 19A:
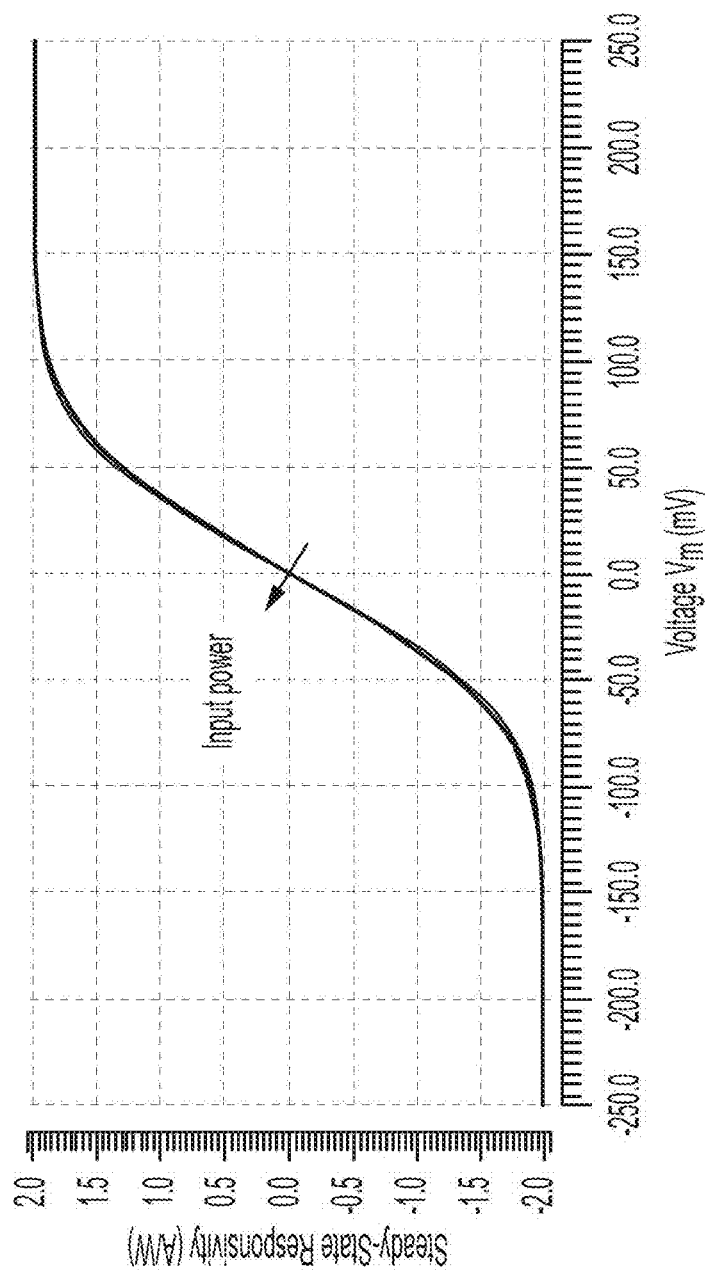
FIGS. 19A-19B are plots illustrating example responsivities associated with the modulatable detector of FIG. 18E, in accordance with some embodiments.
Figure 19B:
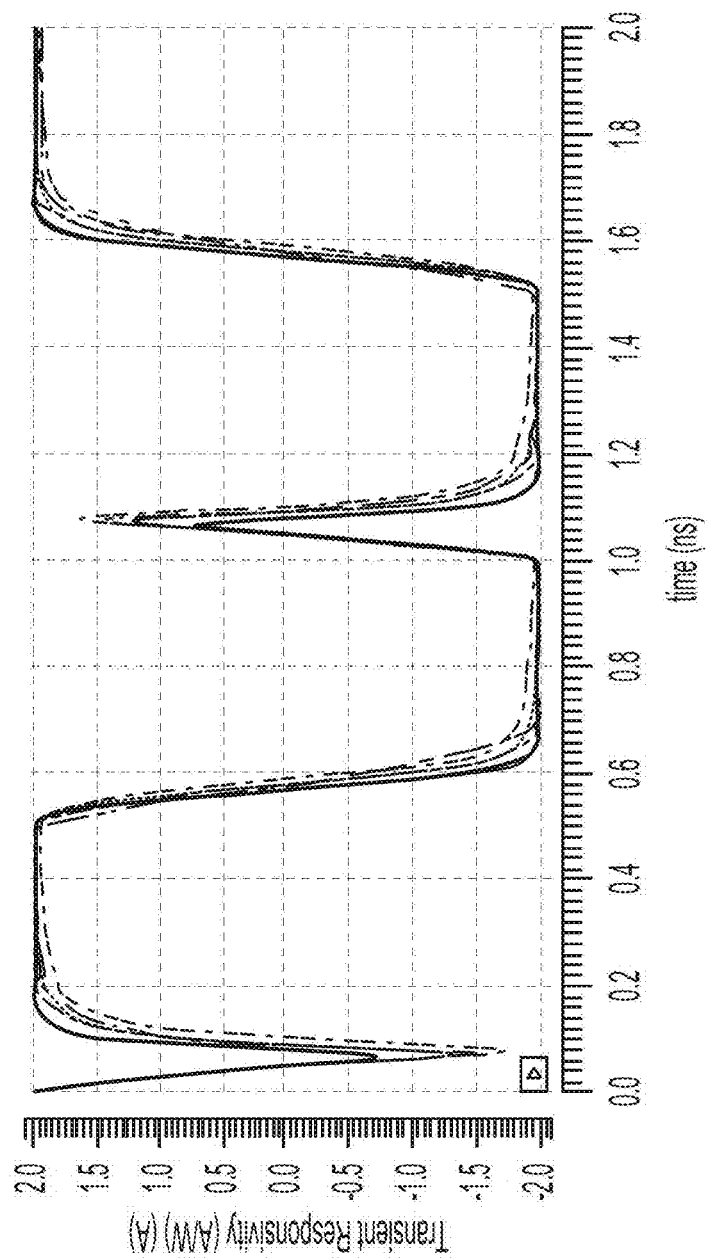

FIG. 19A illustrates the steady-state overall responsivity (measured in terms of photocurrent $2i_{xm}$ and input power $P_x$) for the modulatable detector FIG. 18E plotted as a function of voltage $V_m$. The other modulatable detectors have similar responses. This plots reflects the fact that voltage $V_m$ modulates the current gain provided collectively by transistors T7-T10. It should be noted that the overall responsivity is nearly independent of the input optical power. FIG. 19B illustrates the transient overall responsivity as a function of time. The transient response exhibits a settling time of less than 500 ps, thus indicating high-speed operation in the gigahertz range.

Photonic processors of the types described herein may include tens if not hundreds of thousands of modulatable detectors. For example, a photonic processor configured to perform multiplications on 256×256 matrices may include, in some embodiments, as many as 131,072 modulatable detectors. The inventors have appreciated that it would be desirable to integrate the photonic processor on a single chip in order to reduce manufacturing costs, increase speed of operation and limit power consumption. Because the photonic processors of the types described herein include both photonic and electronic circuits, integrating a photonic processor on a single chip involves electronic-photonic co-integration. This may be achieved at least in two ways.

The first way involves forming transistors and silicon photonics on the same silicon substrate. For example, silicon photonics and transistors may be formed on the same silicon layer. A representative arrangement is depicted in FIG. 20A, in accordance with some embodiments. In this case, both the transistors and the silicon photonics are formed on substrate 300 (e.g., a silicon bulk substrate or a silicon-on-insulator substrate). A cladding 302 (e.g., silicon dioxide layer) is formed between the substrate's handle and silicon layer 304. Transistors 306 (which include, among others, the transistors used in any of the arrangements of FIGS. 18A-18H and, optionally, the transistors that constitute controller 17) are patterned on silicon layer 304. Similarly, silicon photonics 308 (which include, among others, the optical encoders, optical multipliers, splitter trees described above) are also patterned on silicon layer 304. Germanium region 310 (which may be used to form any of the photodetectors described above) is formed on top of silicon layer 304, for example via epitaxial growth.

The second way involves forming the silicon photonics and the transistors on separate substrates and bonding the substrates together. A representative arrangement is depicted in FIG. 20B, in accordance with some embodiments. Here, transistors 306 are formed on substrate 300 and silicon photonics 308 on substrate 400. As in the previous example, silicon photonics 308 are formed on a silicon layer (404), and germanium region 310 is formed on top of silicon layer 404. Substrates 300 and 400 are bonded to one another using flip-chip bonding techniques. For example, the substrates may be placed in electrical communication using through-oxide vias (as shown in FIG. 20B) passing through cladding 414 and/or using through-silicon vias (not shown in FIG. 20B).

VI. Conclusion

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A photonic processor comprising:
    a plurality of differential optical encoders including first and second differential optical encoders;
    a first set of differential multipliers coupled to the first differential optical encoder;
    a second set of differential multipliers coupled to the second differential optical encoder;
    a first receiver coupled to the first set of differential multipliers; and
    a second receiver coupled to the second set of differential multipliers.

2. The photonic processor of claim 1, wherein at least one of the plurality of differential encoders comprises an optical modulator having a pair of optical output ports.

3. The photonic processor of claim 1, wherein at least one differential multiplier of the first and second sets of differential multipliers comprises an optical modulator having a pair of optical output ports.

4. The photonic processor of claim 1, wherein the first and second sets of differential multipliers comprise modulatable detectors.

5. The photonic processor of claim 1, further comprising an optical orthogonalization unit placed between the first differential optical encoder and the first set of differential multipliers.

6. The photonic processor of claim 5, wherein the optical orthogonalization unit comprises a serpentine-shaped optical waveguide.

7. The photonic processor of claim 5, wherein the optical orthogonalization unit comprises an optical polarization rotator.

8. The photonic processor of claim 1, further comprising a light source and an optical splitter tree coupling the light source to the first set of differential multipliers.

9. The photonic processor of claim 8, wherein the optical splitter tree lacks waveguide crossings.

10. The photonic processor of claim 1, further comprising a controller configured to control the plurality of differential optical encoders, wherein the controller comprises a plurality of transistors, and wherein the plurality of transistors and the plurality of differential optical encoders share at least one layer of a semiconductor substrate.

11. A method for fabricating a photonic processor comprising:
    obtaining a semiconductor substrate;
    forming, on the semiconductor substrate:
        a plurality of differential optical encoders including first and second differential optical encoders;
        a first set of differential multipliers coupled to the first differential optical encoder;
        a second set of differential multipliers coupled to the second differential optical encoder;
        a first receiver coupled to the first set of differential multipliers; and
        a second receiver coupled to the second set of differential multipliers.

12. The method of claim 11, wherein forming the plurality of differential encoders comprises forming a plurality of optical modulators each having a pair of optical output ports.

13. The method of claim 11, further comprising forming a plurality of transistors on the semiconductor substrate.

14. The method of claim 13, wherein the plurality of transistors and the plurality of differential optical encoders share at least one layer of the semiconductor substrate.

* * * * *